United States Patent
Boyapati et al.

(10) Patent No.: US 12,440,561 B2
(45) Date of Patent: Oct. 14, 2025

(54) METHOD OF DIAGNOSIS AND TREATMENT OF RHEUMATOID ARTHRITIS

(71) Applicants: Sanofi Biotechnology, Paris (FR); Regeneron Pharmaceuticals, Inc., Tarrytown, NY (US)

(72) Inventors: Anita Boyapati, Chappaqua, NY (US); Jérôme Msihid, Antony (FR); Moshe E. Zilberstein, North Caldwell, NJ (US)

(73) Assignees: SANOFI BIOTECHNOLOGY, Gentilly (FR); REGENERON PHARMACEUTICALS, INC., Tarrytown, NY (US)

( * ) Notice: Subject to any disclaimer, the term of this patent is extended or adjusted under 35 U.S.C. 154(b) by 131 days.

(21) Appl. No.: 16/858,301

(22) Filed: Apr. 24, 2020

(65) Prior Publication Data
US 2020/0405851 A1 Dec. 31, 2020

Related U.S. Application Data

(60) Provisional application No. 62/837,793, filed on Apr. 24, 2019.

(30) Foreign Application Priority Data

Feb. 27, 2020 (EP) ..................................... 20305193

(51) Int. Cl.
| | |
|---|---|
| A61K 39/395 | (2006.01) |
| A61B 5/00 | (2006.01) |
| A61K 9/08 | (2006.01) |
| A61K 31/519 | (2006.01) |
| A61P 19/02 | (2006.01) |
| C07K 16/28 | (2006.01) |

(52) U.S. Cl.
CPC ........ *A61K 39/3955* (2013.01); *A61B 5/4848* (2013.01); *A61K 9/08* (2013.01); *A61K 31/519* (2013.01); *A61P 19/02* (2018.01); *C07K 16/2866* (2013.01); *C07K 2317/51* (2013.01); *C07K 2317/515* (2013.01)

(58) Field of Classification Search
CPC .............. A61K 39/3955; A61K 39/395; C07K 16/2866; C07K 16/28; A61P 19/02; A61B 5/4848
See application file for complete search history.

(56) References Cited

U.S. PATENT DOCUMENTS

| | | | |
|---|---|---|---|
| 4,997,423 A | 3/1991 | Okuda et al. | |
| 5,016,784 A | 5/1991 | Batson | |
| 5,215,534 A | 6/1993 | De Harde et al. | |
| 5,480,796 A | 1/1996 | Kishimoto | |
| 5,605,690 A | 2/1997 | Jacobs et al. | |
| 5,670,373 A | 9/1997 | Kishimoto | |
| 5,723,120 A | 3/1998 | Brakenhoff et al. | |
| 5,795,965 A | 8/1998 | Tsuchiya et al. | |
| 5,817,790 A | 10/1998 | Tsuchiya et al. | |
| 5,888,510 A | 3/1999 | Kishimoto et al. | |
| 5,888,511 A | 3/1999 | Skurkovich et al. | |
| 5,908,686 A | 6/1999 | Sudo et al. | |
| 6,046,223 A | 4/2000 | Sponsel et al. | |
| 6,086,874 A | 7/2000 | Yoshida et al. | |
| 6,261,560 B1 | 7/2001 | Tsujinaka et al. | |
| 6,286,699 B1 | 9/2001 | Sudo | |
| 6,410,691 B1 | 6/2002 | Kishimoto et al. | |
| 6,629,949 B1 | 10/2003 | Douglas | |
| 6,632,927 B2 | 10/2003 | Adair et al. | |
| 6,645,635 B2 | 11/2003 | Murakai | |
| 6,659,982 B2 | 12/2003 | Douglas et al. | |
| 6,670,373 B1 | 12/2003 | Bonjouklian et al. | |
| 6,692,742 B1 | 2/2004 | Nakamura et al. | |
| 6,723,319 B1 | 4/2004 | Ito et al. | |
| 7,226,554 B2 | 6/2007 | Sudo et al. | |
| 7,320,792 B2 | 1/2008 | Ito et al. | |
| 7,479,543 B2 | 1/2009 | Tsuchiya et al. | |
| 7,521,052 B2 | 4/2009 | Okuda et al. | |
| 7,582,298 B2 | 9/2009 | Stevens et al. | |
| 8,043,617 B2 | 10/2011 | Stevens et al. | |
| 8,080,248 B2 | 12/2011 | Radin et al. | |
| 8,183,014 B2 | 5/2012 | Stevens et al. | |
| 8,192,741 B2 | 6/2012 | Radin et al. | |
| 8,440,890 B1 | 5/2013 | Carlone, Jr. et al. | |
| 8,568,721 B2 | 10/2013 | Radin et al. | |
| 8,709,409 B2 | 4/2014 | Okuda et al. | |
| 8,869,904 B2 | 10/2014 | Jani | |
| 8,895,521 B2 | 11/2014 | Klinman et al. | |
| 9,139,646 B2 | 9/2015 | Solinger et al. | |

(Continued)

FOREIGN PATENT DOCUMENTS

| | | |
|---|---|---|
| BR | PI0712224 A2 | 1/2012 |
| CN | 102869346 A | 1/2013 |

(Continued)

OTHER PUBLICATIONS

Yoo et al., Arthritis Res. Ther., 2017, vol. 19(1):119.*
"Highlights of Prescribing Information" for Kevzara (sarilumab), Reference ID: 4101405—Accessdata.fda.gov, May 2017.*
Gabay et al., RMD Open, 2018, vol. 4:e000607.*
Angal, et al., "A Single Amino Acid Substitution Abolishes the Heterogeneity of Chimeric Mouse/Human (IgG4) Antibody", Molecular Immunology, vol. 30, No. 1, pp. 105-108. Jan. 1993.
Boyapati, et al., "Sarilumab Plus Methotrexate Suppresses Circulating Biomarkers of Bone Resorption and Synovial Damage in Patients with Rheumatoid Arthritis and Inadequate Response to Methotrexate: A Biomarker Study of Mobility", Arthritis Research & Therapy, vol. 18, Article No. 225, pp. 1-12, Dec. 1, 2016.

(Continued)

*Primary Examiner* — Xiaozhen Xie
(74) *Attorney, Agent, or Firm* — LATHROP GPM LLP; James H. Velema, Esq.; Judith L. Stone-Hulslander, Esq.

(57) ABSTRACT

The present disclosure relates to the use of an anti-IL6 receptor antibody for treating rheumatoid arthritis in subjects with serum concentrations of certain biomarkers.

27 Claims, 14 Drawing Sheets

Specification includes a Sequence Listing.

(56) References Cited

U.S. PATENT DOCUMENTS

| | | |
|---|---|---|
| 9,173,880 B2 | 11/2015 | Dix et al. |
| 9,248,242 B2 | 2/2016 | Verespej et al. |
| 9,308,256 B2 | 4/2016 | Radin et al. |
| 9,427,531 B2 | 8/2016 | Hourmand et al. |
| 9,566,395 B2 | 2/2017 | Denny et al. |
| 9,884,916 B2 | 2/2018 | Stevens et al. |
| 9,943,594 B2 | 4/2018 | Jasson et al. |
| 9,951,130 B2 | 4/2018 | Schmidt et al. |
| 10,072,086 B2 | 9/2018 | Dix et al. |
| 10,927,435 B2 | 2/2021 | Huang et al. |
| 10,968,278 B2 | 4/2021 | Sridhara Sundaram et al. |
| 11,498,969 B2 | 11/2022 | Baret-Cormel et al. |
| 2002/0187150 A1 | 12/2002 | Mihara et al. |
| 2003/0092606 A1 | 5/2003 | L'Italien et al. |
| 2003/0113316 A1 | 6/2003 | Kaisheva et al. |
| 2003/0190316 A1 | 10/2003 | Kaisha |
| 2004/0071706 A1 | 4/2004 | Ito et al. |
| 2004/0115197 A1 | 6/2004 | Yoshizaki et al. |
| 2004/0197324 A1 | 10/2004 | Liu et al. |
| 2004/0202658 A1 | 10/2004 | Benyunes |
| 2004/0219156 A1 | 11/2004 | Goldenberg et al. |
| 2005/0142635 A1 | 6/2005 | Tsuchiya et al. |
| 2005/0238644 A1 | 10/2005 | Mihara et al. |
| 2006/0078531 A1 | 4/2006 | Sota |
| 2006/0078532 A1 | 4/2006 | Omoigui |
| 2006/0078533 A1 | 4/2006 | Omoigui |
| 2006/0177436 A1 | 8/2006 | Ghilardi et al. |
| 2006/0251653 A1 | 11/2006 | Okuda et al. |
| 2006/0275294 A1 | 12/2006 | Omoigui |
| 2006/0292147 A1 | 12/2006 | Yoshizaki et al. |
| 2007/0036785 A1 | 2/2007 | Saito et al. |
| 2007/0036788 A1 | 2/2007 | Sheriff et al. |
| 2007/0098714 A1 | 5/2007 | Nishimoto et al. |
| 2007/0143168 A1 | 6/2007 | Stevens et al. |
| 2007/0148169 A1 | 6/2007 | Yoshizaki et al. |
| 2007/0280945 A1 | 12/2007 | Stevens et al. |
| 2008/0124325 A1 | 5/2008 | Ito et al. |
| 2008/0131374 A1 | 6/2008 | Medich et al. |
| 2008/0145367 A1 | 6/2008 | Bove et al. |
| 2008/0269467 A1 | 10/2008 | Allan et al. |
| 2009/0082288 A1 | 3/2009 | Klinman et al. |
| 2010/0316627 A1 | 12/2010 | Stevens et al. |
| 2010/0316636 A1 | 12/2010 | Radin et al. |
| 2011/0098450 A1 | 4/2011 | Igawa et al. |
| 2011/0171241 A1 | 7/2011 | Dix et al. |
| 2011/0245473 A1 | 10/2011 | Igawa et al. |
| 2012/0003697 A1 | 1/2012 | Stevens et al. |
| 2012/0171123 A1 | 7/2012 | Medich et al. |
| 2012/0258098 A1 | 10/2012 | Radin et al. |
| 2013/0014958 A1 | 1/2013 | Jani |
| 2013/0149310 A1 | 6/2013 | Jasson et al. |
| 2014/0255390 A1 | 9/2014 | Radin et al. |
| 2014/0302053 A1 | 10/2014 | Huang et al. |
| 2015/0050277 A1 | 2/2015 | Peters et al. |
| 2016/0002341 A1 | 1/2016 | Dix et al. |
| 2016/0220675 A1 | 8/2016 | Abrahmson |
| 2016/0229916 A1 | 8/2016 | Stevens et al. |
| 2016/0280782 A1 | 9/2016 | Huang et al. |
| 2016/0281106 A1 | 9/2016 | Kim et al. |
| 2017/0166646 A1 | 6/2017 | Sridhara Sundaram et al. |
| 2017/0198045 A1 | 7/2017 | Johnson et al. |
| 2017/0252434 A1 | 9/2017 | Joseph et al. |
| 2017/0360807 A1 | 12/2017 | Zhang et al. |
| 2018/0296670 A1 | 10/2018 | Jasson et al. |
| 2019/0002574 A1 | 1/2019 | Dix et al. |
| 2019/0100585 A1 | 4/2019 | Bauer et al. |
| 2020/0047029 A1 | 2/2020 | Bentley et al. |
| 2020/0339693 A1 | 10/2020 | Baret-Cormel et al. |
| 2020/0399380 A1 | 12/2020 | Boklage et al. |
| 2020/0405851 A1 | 12/2020 | Boyapati et al. |
| 2021/0230719 A1 | 7/2021 | Huang et al. |
| 2021/0240369 A1 | 8/2021 | Cain |
| 2021/0301027 A1 | 9/2021 | Sridhara Sundaram et al. |
| 2022/0242959 A1 | 8/2022 | Chen et al. |
| 2023/0127528 A1 | 4/2023 | Baret-Cormel et al. |
| 2023/0174657 A1 | 6/2023 | Albrecht et al. |
| 2023/0193871 A1 | 6/2023 | Ford et al. |

FOREIGN PATENT DOCUMENTS

| | | |
|---|---|---|
| CN | 103476793 A | 12/2013 |
| CN | 104105505 A | 10/2014 |
| CN | 104903349 A | 9/2015 |
| EA | 014226 B1 | 10/2010 |
| EA | 014298 B1 | 10/2010 |
| EP | 0628639 A1 | 12/1994 |
| EP | 0409607 B1 | 10/1996 |
| EP | 0783893 A1 | 7/1997 |
| EP | 0800829 A1 | 10/1997 |
| EP | 0811384 A1 | 12/1997 |
| EP | 0923941 A2 | 6/1999 |
| EP | 1004315 A1 | 5/2000 |
| EP | 1074268 A1 | 2/2001 |
| EP | 1108435 A1 | 6/2001 |
| EP | 1314437 A1 | 5/2003 |
| EP | 1327681 A1 | 7/2003 |
| EP | 1475100 A1 | 11/2004 |
| EP | 1475101 A1 | 11/2004 |
| EP | 0413908 B2 | 8/2005 |
| EP | 1810980 A1 | 7/2007 |
| EP | 1334731 B1 | 2/2008 |
| EP | 2451438 B1 | 2/2014 |
| EP | 2766039 A1 | 8/2014 |
| EP | 3071230 A1 | 9/2016 |
| EP | 3193934 A1 | 7/2017 |
| EP | 3371224 A1 | 9/2018 |
| EP | 3426295 A1 | 1/2019 |
| EP | 3770173 A1 | 1/2021 |
| EP | 3983071 A1 | 4/2022 |
| FR | 2694767 A1 | 2/1994 |
| JP | 2009-539349 A | 11/2009 |
| JP | 2014-530226 A | 11/2014 |
| JP | 61-22018 B2 | 4/2017 |
| JP | 2017-137338 A | 8/2017 |
| JP | 63-36171 B2 | 5/2018 |
| JP | 2020-045351 A | 3/2020 |
| KR | 10-2008-0011665 A | 2/2008 |
| RU | 2358762 C2 | 6/2009 |
| TW | 201141518 A | 12/2011 |
| WO | WO 1992/016553 A1 | 10/1992 |
| WO | WO 1992/019759 A1 | 11/1992 |
| WO | WO 1994/006476 A1 | 3/1994 |
| WO | WO 1995/009873 A1 | 4/1995 |
| WO | WO 1996/011020 A1 | 4/1996 |
| WO | WO 2002/100330 A2 | 12/2002 |
| WO | WO 2003/009817 A2 | 2/2003 |
| WO | WO 2004/039826 A1 | 5/2004 |
| WO | WO 2004/091658 A1 | 10/2004 |
| WO | WO 2004/096273 A1 | 11/2004 |
| WO | WO 2005/028514 A1 | 3/2005 |
| WO | WO 2005/058365 A1 | 6/2005 |
| WO | WO 2005/016280 A2 | 2/2006 |
| WO | WO 2006/033702 A2 | 3/2006 |
| WO | WO 2006/125229 A2 | 11/2006 |
| WO | WO 2007/062040 A1 | 5/2007 |
| WO | WO 2007/070750 A1 | 6/2007 |
| WO | WO 2007/143168 A2 | 12/2007 |
| WO | WO 2007/147001 A2 | 12/2007 |
| WO | WO 2008/020079 A1 | 2/2008 |
| WO | WO 2007/143168 A3 | 4/2008 |
| WO | WO 2008/049897 A1 | 5/2008 |
| WO | WO 2008/145142 A1 | 12/2008 |
| WO | WO 2009/095489 A2 | 8/2009 |
| WO | WO 2009/109584 A1 | 9/2009 |
| WO | WO 2009/125825 A1 | 10/2009 |
| WO | WO 2009/140348 A2 | 11/2009 |
| WO | WO 2010/035769 A1 | 4/2010 |
| WO | WO 2010/106812 A1 | 9/2010 |
| WO | WO 2010/149771 A1 | 12/2010 |
| WO | WO 2011/085158 A2 | 7/2011 |
| WO | WO 2012/064627 A2 | 5/2012 |
| WO | WO 2013/053751 A1 | 4/2013 |
| WO | WO 2013/056751 A1 | 4/2013 |

(56) References Cited

FOREIGN PATENT DOCUMENTS

| WO | WO 2015/077582 A1 | 5/2015 | |
|---|---|---|---|
| WO | WO 2015/148790 A1 | 10/2015 | |
| WO | WO-2016044343 A1 * | 3/2016 | ............ A61K 31/42 |
| WO | WO 2017/038986 A1 | 3/2017 | |
| WO | WO 2017/079443 A1 | 5/2017 | |
| WO | WO 2017/106312 A1 | 6/2017 | |
| WO | WO 2017/155990 A1 | 9/2017 | |
| WO | WO 2017/194779 A1 | 11/2017 | |
| WO | WO 2018/007442 A1 | 1/2018 | |
| WO | WO 2020/047029 A1 | 3/2020 | |
| WO | WO 2020/160465 A1 | 8/2020 | |
| WO | WO 2020/219960 A1 | 10/2020 | |
| WO | WO 2020/247461 A1 | 12/2020 | |
| WO | WO 2020/252214 A1 | 12/2020 | |
| WO | WO 2021/240436 A1 | 12/2021 | |

OTHER PUBLICATIONS

Burmester, et al., "Efficacy and Safety of Sarilumab Monotherapy Versus Adalimumab Monotherapy for The Treatment of Patients With Active Rheumatoid Arthritis (Monarch): A Randomised, Double-Blind, Parallel-Group Phase III Trial", Annals of the Rheumatic Diseases, vol. 76, No. 5, pp. 840-847, Nov. 2016.

Burmester, et al., "Unique Changes in Hemoglobin with Sarilumab Versus Adalimumab are Independent of Better Disease Control in Patients with Rheumatoid Arthritis (RA)", Arthritis & Rheumatology, vol. 70, Supplement 10, Abstract 1528, 2018.

Calabrese, et al., "IL-6 Biology: Implications for Clinical Targeting in Rheumatic Disease", Nature Reviews Rheumatology, vol. 10, No. 12, pp. 720-727, Dec. 2014.

Choy, Ernest, "Understanding the Dynamics: Pathways Involved in the Pathogenesis of Rheumatoid Arthritis", Rheumatology, vol. 51, Supplement 5, pp. v3-v11, Jul. 1, 2012.

Choy, et al., "Cardiovascular Risk in Rheumatoid Arthritis: Recent Advances in the Understanding of the Pivotal Role of Inflammation", Risk Predictors and the Impact of Treatment Rheumatology, vol. 53, pp. 2143-2154, Dec. 1, 2014.

Choy, et al., "Neuroendocrine and Neurophysiological Effects of Interleukin 6 in Rheumatoid Arthritis", Rheumatology, vol. 57, pp. 1885-1895, Nov. 1, 2018.

Curtis, et al. "Reanalysis of the Multi-Biomarker Disease Activity Score for Assessing Disease Activity in the Abatacept Versus Adalimumab Comparison in Biologic-Naive Rheumatoid Arthritis Subjects with Background Methotrexate Study: Comment on the Article by Fleischmann", Arthritis & Rheumatology, vol. 69, No. 4, pp. 863-872, Apr. 2017.

Dennis Jr., et al., "Synovial Phenotypes in Rheumatoid Arthritis Correlate with Response to Biologic Therapeutics", Arthritis Research & Therapy, vol. 16, Article No. R90, pp. 1-18, Apr. 2014.

Fleischmann, et al., "Estimating Disease Activity using Multi-Biomarker Disease Activity Scores in Rheumatoid Arthritis Patients Treated with Abatacept or Adalimumab", Arthritis & Rheumatology, vol. 68, No. 9, pp. 2083-2089, Sep. 2016.

Fleischmann, et al., "Sarilumab and Nonbiologic Disease-Modifying Antirheumatic Drugs in Patients with Active Rheumatoid Arthritis and Inadequate Response or Intolerance to Tumor Necrosis Factor Inhibitors", Arthritis & Rheumatology, vol. 69, No. 2, pp. 277-290, Feb. 2017.

Gabay, et al., "Comparison of Lipid and Lipid-Associated Cardiovascular Risk Marker Changes After Treatment With Tocilizumab or Adalimumab in Patients with Rheumatoid Arthritis", Annals of the Rheumatic Diseases, vol. 75, pp. 1806-1812, Oct. 1, 2016.

Gabay, et al., "Effect of Sarilumab on Circulating Biomarkers of Bone and Joint Destruction in Patients with Rheumatoid Arthritis with Inadequate Response to Methotrexate", Arthritis & Rheumatology, vol. 68, Supplement 10, p. 3091, Oct. 2016.

Gabay, et al., "Identification of Sarilumab Pharmacodynamic and Predictive Markers in Patients with Inadequate Response to TNF Inhibition: A Biomarker Substudy of the Phase 3 Target Study", Rheumatic & Musculoskeletal Diseases Open, vol. 4, e000607, pp. 1-11, Mar. 1, 2018.

Gavrilă, et al., "Biomarkers in Rheumatoid Arthritis, What is New?", Journal of Medicine and Life, vol. 9, Issue 2, pp. 144-148, Apr.-Jun. 2016.

Genbank, "*H. sapiens* Serum Amyloid A Protein mRNA", Complete cds, Genbank Accession No. M81349.1, Retrieved from: <<https://www.ncbi.nlm.nih.gov/nuccore/M81349.1>>, 1 Page.

Genbank, "*Homo sapiens* C-Reactive Protein (CRP)", RefSeqGene on Chromosome 1, Genbank Accession No. NG_013007.1, Retrieved from: <<https://www.ncbi.nlm.nih.gov/nuccore/NG_013007.1>>, pp. 1-4.

Genbank, "*Homo sapiens* C—X—C Motif Chemokine Ligand 13 (CXCL13)", Transcript Variant 1, mRNA, Genbank Accession No. NM_006419.2, Retrieved from: <<https://www.ncbi.nlm.nih.gov/nuccore/NM_006419.2>>, pp. 1-4., Jul. 31, 2008.

Genbank, "*Homo sapiens* Intercellular Adhesion Molecule 1 (ICAM1)", mRNA, Genbank Accession No. NM_000201.3, Retrieved from: <<https://www.ncbi.nlm.nih.gov/nuccore/NM_000201.3>>, pp. 1-5., Nov. 23, 2018.

Genbank, *Homo sapiens* Matrix Metallopeptidase 3 (MMP3), mRNA, Genbank Accession No. NM_002422.5, Retrieved from: <<https://www.ncbi.nlm.nih.gov/nuccore/NM_002422.5>>, pp. 1-4, Nov. 22, 2018.

Genovese, et al., "Sarilumab Plus Methotrexate in Patients With Active Rheumatoid Arthritis and Inadequate Response to Methotrexate: Results of a Phase III Study", Arthritis & Rheumatology, vol. 67, No. 6, pp. 1424-1437, Jun. 2015.

Humira® (Adalimumab) Injection, for Subcutaneous Use, Highlights of Prescribing Information, United States Food and Drug Administration, Retrieved from: <<https://www.accessdata.fda.gov/drugsatfda_docs/label/2018/125057s410lbl.pdf>>, 104 Pages, Dec. 2018.

Hunter, et al., "IL-6 as a Keystone Cytokine in Health and Disease", Nature Immunology, vol. 16, No. 5, pp. 448-457, May 2015.

International Search Report and Written Opinion received for PCT Patent Application No. PCT/US2020/029930, mailed on Oct. 8, 2020, 27 Pages.

Karmakar, et al., "Bone Damage in Rheumatoid Arthritis—Mechanistic Insights and Approaches to Prevention", Rheumatic Diseases Clinics of North America, vol. 36, No. 2, 19 Pages, May 1, 2010.

Kringelbach, et al., "Identification of New Biomarkers to Promote Personalised Treatment of Patients with Inflammatory Rheumatic Disease: Protocol for an Open Cohort Study", British Medical Journal Open, vol. 8, e019325, pp. 1-8., Feb. 1, 2018.

McInnes, et al., "Cytokines in the Pathogenesis of Rheumatoid Arthritis", Nature Reviews, Immunology, vol. 7, pp. 429-442, Jun. 2007.

NCBI, C-Reactive Protein Isoform 1 Precursor [*Homo sapiens*], NCBI Reference Sequence: NP_001315986.1, Retrieved from: <<https://www.ncbi.nlm.nih.gov/protein/NP_001315986.1>>, pp. 1-3, Jun. 29, 2016.

NCBI, C-X-C Motif Chemokine 13 Precursor [*Homo sapiens*], NCBI Reference Sequence: NP_006410.1, Retrieved from: <<https://www.ncbi.nlm.nih.gov/protein/NP_006410.1>>, pp. 1-3.

NCBI, Intercellular Adhesion Molecule 1 Precursor [*Homo sapiens*], NCBI Reference Sequence: NP_000192.2, Retrieved from: <<https://www.ncbi.nlm.nih.gov/protein/NP_000192.2>>, pp. 1-4, Feb. 8, 2008.

NCBI, Matrix Metallopeptidase 3 (Stromelysin 1, Progelatinase) [*Homo sapiens*], NCBI Reference Sequence: EAW67032.1, Retrieved from: <<https://www.ncbi.nlm.nih.gov/protein/EAW67032.1>>, pp. 1-2.

NCBI, Serum Amyloid A [*Homo sapiens*], NCBI Reference Sequence: AAB24060.1, Retrieved from: <<https://www.ncbi.nlm.nih.gov/protein/AAB24060.1>>, 1 Page.

Raimondo, et al., "Profile of Sarilumab and its Potential in the Treatment of Rheumatoid Arthritis", Drug Design, Development and Therapy, vol. 11, pp. 1593-1603, 2017.

(56) References Cited

OTHER PUBLICATIONS

Schett, et al., "Bone Erosion in Rheumatoid Arthritis: Mechanisms, Diagnosis and Treatment", Nature Reviews Rheumatology, vol. 8, No. 11, 22 Pages, Nov. 2012.

Schett, Georg, "Physiological Effects of Modulating the Interleukin-6 Axis", Rheumatology, vol. 57, Supplement 2, pp. ii43-ii50, Feb. 1, 2018.

Sechidis, et al., "Distinguishing Prognostic and Predictive Biomarkers: An Information Theoretic Approach", Bioinformatics, vol. 34, No. 19, pp. 3365-3376, Oct. 1, 2018.

Smolen, et al., "The Assessment of Disease Activity in Rheumatoid Arthritis", Clinical and Experimental Rheumatology, vol. 28, Supplement 59, pp. S18-S27, May 1, 2010.

Solomon, et al., "Patterns of Cardiovascular Risk in Rheumatoid Arthritis", Annals of the Rheumatic Diseases, vol. 65, pp. 1608-1612, Dec. 1, 2006.

Song, et al., "Comparative Evaluation of the Effects of Treatment With Tocilizumab and TNF-α Inhibitors on Serum Hepcidin, Anemia Response and Disease Activity in Rheumatoid Arthritis Patients", Arthritis Research & Therapy, vol. 15, Article No. R141, pp. 1-10, Oct. 1, 2013.

Strand, et al., "Patient-Reported Outcomes from a Randomized Phase III Trial of Sarilumab Monotherapy Versus Adalimumab Monotherapy in Patients With Rheumatoid Arthritis", Arthritis Research & Therapy, vol. 20, Article No. 129, pp. 1-12, Dec. 1, 2018.

Taylor, et al., "A Transgenic Mouse That Expresses a Diversity of Human Sequence Heavy and Light Chain Immunoglobulins", Nucleic Acids Research, vol. 20, No. 23, pp. 6287-6295, Dec. 11, 1992.

(2011) International Nonproprietary Names (INN) for Pharmaceutical Substances, World Health Organization, vol. 25, No. 4, 53 Pages.

(Apr. 13, 2015) Phase II Study to Analyze Sarilumab in Non-Infectious Uveitis, NCT01900431 on Apr. 13, 2015, ClinicalTrials. gov Archive, URL: https://clinicaltrials.gov/archive/NCT01900431.

(Oct. 29, 2010) Study of the Safety, Tolerability, and Bioactivity of Tocilizumab on Patients with Non-infectious Uveitis: The STOP-Uveitis Study (STOP-Uveitis), Available at: https://clinicaltrials.gov/ct2/show/NCT01717170.

(Oct. 29, 2012) Study of the Safety, Tolerability, and Bioactivity of Tocilizumab on Patients with Non-infectious Uveitis, The STOP-Uveitis Study, ClinicalTrials.gov Archive.

Adan, et al. (Jul. 27, 2013) "Tocilizumab Treatment for Refractory Uveitis-Related Cystoid Macular Edema", Graefes Archive for Clinical and Experimental Ophthalmology, vol. 251, No. 11, pp. 2627-2632.

Aletaha, et al. (Sep. 2010) "Rheumatoid Arthritis Classification Criteria: An American College of Rheumatology/European League Against Rheumatism Collaborative Initiative", Arthritis and Rheumatology, vol. 62, No. 9, pp. 2569-2581.

Amit, et al. (Aug. 15, 1986) "Three-Dimensional Structure of an Antigen-Antibody Complex at 2.8 A Resolution", Science, vol. 233, No. 4765, pp. 747-753.

An, et al. (Jan. 2010) "The Addition of Tocilizumab to DMARD Therapy for Rheumatoid Arthritis: A Meta-Analysis of Randomized Controlled Trials", European Journal of Clinical Pharmacology, vol. 66, No. 1, pp. 49-59.

Angal et al., "A single amino acid substitution abolishes the heterogeneity of chimeric mouse/human (IgG4) antibody", Molecular Immunology, Jan. 1993, 30(1): 105-108.

Arevalo, J Fernando, (Nov. 25, 2014) "Tocilizumab Shows Promise for Refractory Uveitis-Related Macular Edema", URL: https://www.aao.org/editors-choice/tocilizumab-shows-promise-refractory-uveitisrelate.

Barry, et al. (Sep. 1, 2014) "Pharmacotherapy for Uveitis: Current Management and Emerging Therapy", Clinical Ophthalmology, vol. 8, pp. 1891-1911.

Bresnick, George H. (Jul. 1986) "Diabetic Macular Edema. A Review.", Ophthalmology, vol. 93, Issue 7, pp. 989-997.

Burmester et al., "Efficacy and safety of sarilumab monotherapy versus adalimumab monotherapy for the treatment of patients with active rheumatoid arthritis (MONARCH): a randomised, double-blind, parallel-group phase III trial", Ann Rheum Dis., 2017, 76(5): 840-847.

Burmester et al., "Rheumatoid Arthritis—Sarilumab more effective than adalimumab", Nature Reviews, Rheumatology, Research Highlights, Published online Dec. 8, 2016.

Burmester et al., "Safety and efficacy of switching from adalimumab to sarilumab in patients with rheumatoid arthritis in the ongoing MONARCH open-label extentsion", RMD Open, Rheumatic and Musculoskeletal Diseases, 2019, 5: e001017.

Burmester, et al. (Jan. 2014) "A Randomised, Double-Blind, Parallel-Group Study of the Safety and Efficacy of Subcutaneous Tocilizumab Versus Intravenous Tocilizumab in Combination with Traditional Disease-Modifying Antirheumatic Drugs in Patients with Moderate to Severe Rheumatoid Arth", Annals of the Rheumatic Diseases, vol. 73, No. 1, pp. 69-74.

Bykerk et al., "Impact of Sarilumab on Unacceptable Pain and Inflammation Control in Moderately-to-Severely Active Rheumatoid Arthritis (RA) Patients in 3 Phase 3 Studies", Arthritis & Rheumatology (Hoboken), Oct. 1, 2019, 71(S10): Abstract No. 1393.

Bykerk et al., "Impact of sarilumab on unacceptable pain and inflammation control in moderately-to-severely active rheumatoid arthritis (RA) patients in 3 Phase 3 studies", Rheumatology, Apr. 20, 2020, 59(2): EP25.

Bykerk et al., "Impact of Sarilumab on Unacceptable Pain and Inflammation Control in Moderately-to-Severely Active Rheumatoid Arthritis Patients in 3 Phase 3 Studies", Sep. 11, 2020, retrieved from url: https://pheedloop.s3.amazonaws.com/media/events/EVEVLUEFMPIXU/files/822199_Bykerk-Vivian-RA-Unacceptable%20Pain.pdf.

Cao, et al. (Jun. 2013) "Pharmacological Blockade of Interleukin 6 Receptor (IL-6R) Inhibits the Development of Ocular Inflammation in the Murine Model of Experimental Autoimmune Uveitis (EAU)", Investigative Ophthalmology & Visual Science, vol. 54, Issued 15, 5193 Page.

Chester (Jul. 24, 2017) E-mail: "<External> CAS Registry No. RN1189541-98-7".

Chichasova, et al. (2010) "Treatment of Rheumatoid Arthritis: Tactical Issues in the Practice of the Clinician", The Attending Physician, No. 7/10.

Choy et al., "Indirect Treatment Comparison of the Efficacy and Safety of Sarilumab Monotherapy in Rheumatoid Arthritis Patients with Inadequate Response to Conventional Disease-Modifying Antirheumatic Drugs", Advances in Therapy, Mar. 12, 2019, 36(4): 817-827.

ClinicalTrials.gov, "Efficacy and Safety of Sarilumab and Adalimumab Monotherapy in Patients With Rheumatoid Arthritis (SARIL-RA-MONARCH)", ClinicalTrials.gov Identifier NCT02332590, Jan. 7, 2015.

ClinicalTrials.gov, "Evaluation of Sarilumab (SAR153191/REGN88) on Top of Methotrexate in Rheumatoid Arthritis Patients (RA-MOBILITY)", ClinicalTrials.gov Identifier NCT01061736, Feb. 3, 2010.

ClinicalTrials.gov, "To Evaluate the Effect of SAR153191 (REGN88) Added to Other RA Drugs in Patients With RA Who are Not Responding to or Intolerant of Anti-TNF Therapy (SARIL-RA-TARGET)", ClinicalTrials.gov Identifier NCT01709578, Oct. 18, 2012.

Corevitas, Rheumatoid Arthritis Registry, Available from: https://www.corevitas.com/registry/rheumatoid-arthritis, Accessed on Aug. 26, 2022.

Curtis et al., "Determining the minimally important difference in the clinical disease activity index for improvement and worsening in early rheumatoid arthritis patients", Arthritis Care Res (Hoboken), 2015, 67(10): 1345-1353.

Daugherty et al., "Formulation and delivery issues for monoclonal antibody therapeutics," Adv. Drug Delivery Reviews, 58:686-706, (2006).

(56) References Cited

OTHER PUBLICATIONS

Davis, et al. (Nov. 2010) "Scale for Photographic Grading of Vitreous Haze in Uveitis", American Journal of Ophthalmology, vol. 150, No. 5, pp. 637-641. Pharmacology of TNF blockade.
De Benedetti et al., "FRI0549—Sarilumab, a Human Monoclonal Antibody to the Interleukin-6 (IL-6) Receptor, In Polyarticular-Course Juvenile Idiopathic Arthritis (pcJIA): A 12-Week Multinational Open-Label Dose-Finding Study", Annals of the Rheumatic Diseases, Jun. 2019, 78(Suppl 2): 969-970.
De Benedetti et al., "Sarilumab, a Human Monoclonal Antibody to the Interleukin-6 Receptor, in Polyarticular-course Juvenile Idiopathic Arthritis: A 12-week, Multinational, Open-label, Dose-Finding Study", Meeting: 2019 ACR/ARP Annual Meeting, American College of Rheumatology, Abstract No. 2710, Nov. 12, 2019.
Durrani, et al. (Sep. 2004) "Degree, Duration, and Causes of Visual Loss in Uveitis", British Journal of Ophthalmology, vol. 88, No. 9, pp. 1159-1162.
Emery, et al. (Nov. 2008) "IL-6 Receptor Inhibition with Tocilizumab Improves Treatment Outcomes in Patients with Rheumatoid Arthritis Refractory to Anti-Tumour Necrosis Factor Biologicals: Results From a 24-Week Multicentre Randomised Placebo-Controlled Trial", Annals of the Rheumatic Diseases, vol. 67, No. 11, pp. 1516-1523.
European Medicines Agency, Committee for Medicinal Products for Human Use (CHMP), Assessment Report, Apr. 21, 2017, EMA/292840/2017, retrieved from url: https://www.ema.europa.eu/en/documents/assessment-report/kevzara-epar-public-assessment-report_en.pdf.
Fleischmann, et al. (Oct. 2014) "Comparable Efficacy with Sarilumab Plus Methotrexate in Biologic-Experienced and Biologic-Naïve Patients with Moderate-to-Severe Rheumatoid Arthritis from a Phase 3, Randomized, Double-Blind, Placebo-Controlled, International Study", Arthritis & Rheumatology, vol. 66, No. S10, pp. S1232.
Fransen et al., "The Disease Activity Score and the EULAR response criteria", Clinical and Experimental Rheumatology, Aug. 31, 2005, 23(5 Suppl 39): S93-99).
Gabay et al., "Tocilizumab monotherapy versus adalimumab monotherapy for treatment of rheumatoid arthritis (ADACTA): a randomised, double-blind, controlled phase 4 trial", Lancet, 2013, 381(9877): 1541-1550.
Gandek, et al. (Summer 2004) "Psychometric Evaluation of the SF-36® Health Survey in Medicare Managed Care", Health Care Financing Review, vol. 25, No. 4, pp. 5-25.
Genentech, et al. (2014) "ACTEMRA Subcutaneous Dosing & Administration Pocket Guide", pp. 1-40.
Genovese, et al. (Jun. 2015) "Sarilumab Plus Methotrexate in Patients with Active Rheumatoid Arthritis and Inadequate Response to Methotrexate: Results of a Phase III Study", Arthritis & Rheumatology, vol. 67, No. 6, pp. 1424-1437.
Gordon, et al. (Jul. 1998) "pANCA Antibodies in Patients with Anterior Uveitis: Identification of a Marker Antibody Usually Associated with Ulcerative Colitis", Journal of Clinical Immunology, vol. 18, No. 4, pp. 264-271.
HAQ (Jul. 30, 2019) "Scleroderma Study Conference", English Translation, Retrieved from URL: <<http://derma.w3.kanazawa-u.ac.jp/SSc/pamphret/HAQ.html >>, 6 Pages (4 Pages of English Translation & 2 Pages of Official Copy).
Hennigan, et al. (Aug. 2008) "Interleukin-6 Inhibitors in the Treatment of Rheumatoid Arthritis", Therapeutics and clinical risk management, vol. 4, No. 4, pp. 767-775.
Hirata, et al. (Nov. 1, 1989) "Characterization of IL-6 Receptor Expression by Monoclonal and Polyclonal Antibodies", The Journal of Immunology, vol. 143, No. 9, pp. 2900-2906.
Huizinga, et al. (Sep. 2014) "Sarilumab, A Fully Human Monoclonal Antibody Against IL-6Rα in Patients with Rheumatoid Arthritis and an Inadequate Response to Methotrexate: Efficacy and Safety Results from the randomised SARIL-RA-MOBILITY Part A Trial", Annals of the Rheumatic Diseases, vol. 73, No. 9, pp. 1626-1629.

Imagawa et al., "Safety and efficacy of tocilizumab, an anti-IL-6-receptor monoclonal antibody, in patients with polyarticular-course juvenile idiopathic arthritis", Modern Rheumatology, Jun. 12, 2011, 22(1): 109-115.
International Search report and Written Opinion for PCT International Patent Application No. PCT/US2020/035871, 13 pages.
International Search Report and Written Opinion for PCT International Patent Application No. PCT/US2020/016203, mailed Jul. 14, 2020.
International Search Report and Written Opinion received for PCT Patent Application No. PCT/EP2012/070052, mailed on Jan. 10, 2013, 10 Pages.
International Search Report and Written Opinion received for PCT Patent Application No. PCT/US2014/066856, mailed on Apr. 2, 2015, 11 Pages.
International Search Report and Written Opinion received for PCT Patent Application No. PCT/US2015/050291, mailed on Dec. 1, 2015, 12 Pages.
International Search Report and Written Opinion received for PCT Patent Application No. PCT/US2016/060344, mailed on Mar. 13, 2017, 13 pages.
International Search Report and Written Opinion received for PCT Patent Application No. PCT/US2017/021149, mailed on Jul. 18, 2017, 14 Pages.
Kawashima, et al. (Apr. 6, 2007) "Soluble IL-6 Receptor in Vitreous Fluid of Patients with Proliferative Diabetic Retinopathy", Japanese Journal of Ophthalmology, vol. 51, No. 2, pp. 100-104.
Kimmel et al., "Adalimumab plus methotrexate improved SF-36 scores and reduced the effect of rheumatoid arthritis (RA) on work activity for patients with early RA", The Journal of Rheumatology, Feb. 2008, 35(2): 206-215.
Kishimoto, et al. (2003) "Interleukin-6 (IL-6)", The Cytokine Handbook. Ed.: Thomson. Academic Press. London, United Kingdom, vol. 12, pp. 281-304.
Kivitz, et al. (Nov. 2014) "Subcutaneous Tocilizumab Versus Placebo in Combination with Disease-Modifying Antirheumatic Drugs in Patients with Rheumatoid Arthritis", Rheumatoid Arthritis, vol. 66, Issue 11, pp. 1653-1661.
Langer, Robert (Sep. 28, 1990) "New Methods of Drug Delivery", Science, vol. 249, Issue 4976, pp. 1527-1533.
Lederman, et al. (Nov. 1991) "Single Amino Acid Substitution in a Common African Allele of the CD4 Molecule Ablates Binding of the Monoclonal Antibody, OKT4", Molecular Immunology, vol. 28, No. 11, pp. 1171-1181.
Li, et al. (May 2004) "Temporal Associations Between Interleukin 22 and the Extracellular Domains of IL-22R and IL-1 OR2", International Immunology, vol. 4, No. 5, pp. 693-708.
Lin, Phoebe (Sep. 1, 2015) "Targeting Interleukin-6 For Noninfectious Uveitis", Clinical Ophthalmology, vol. 9, pp. 1697-1702.
Lipsky, Peter E. (2006) "Interleukin-6 and Rheumatic Diseases", Arthritis Research & Therapy, vol. 8, Suppl 2, S4, pp. 1-5.
Lourdudoss et al., "Dietary intake of polyunsaturated fatty acids and pain in spite of inflammatory control among methotrexate-treated early rheumatoid arthritis patients", Arthritis Care and Research, Feb. 2018, 70(2): 205-212.
McGovern, Timothy J. (Oct. 19, 2016) "Center for Drug Evaluation and Research", Application No. 761037Orig1s000, pp. 01-278.
Meehan, et al. (May 5, 1997) "A Microinfusor Device for the Delivery of Therapeutic Levels of Peptides and Macromolecules", Journal of Controlled Release, vol. 46, Issues 1-2, pp. 107-116.
Merida, et al. (Aug. 11, 2015) "New Immunosuppressive Therapies in Uveitis Treatment", International Journal of Molecular Sciences, vol. 16, No. 8, pp. 18778-18795.
Mesquida, et al. (Sep. 6, 2014) "Long-Term Effects of Tocilizumab Therapy for Refractory Uveitis-Related Macular Edema", Ophthalmology, vol. 121, No. 12, pp. 2380-2386.
Mihara, et al. (Nov. 2005) "Tocilizumab Inhibits Signal Transduction Mediated by Both mIL-6R and sIL-6R, but Not by the Receptors of Other Members of IL-6 Cytokine Family", International Immunopharmacology, vol. 5, No. 12, pp. 1731-1740.
Muszbek et al., "Economic Evaluation of Sarilumab in the Treatment of Adult Patients with Moderately-to-Severely Active Rheumatoid Arthritis Who Have an Inadequate Response to Conven-

(56) References Cited

OTHER PUBLICATIONS tional Synthetic Disease-Modifying Antirheumatic Drugs", Advances in Therapy, Apr. 19, 2019, 36(6): 1337-1357.
Nguyen, et al. (Jun. 2015) "The SATURN Study (SARIL-NIU): Sarilumab for the Treatment of Posterior Segment Non-Infectious Uveitis (NIU)", Investigative Ophthalmology & Visual Science, vol. 56, No. 7, 3116 pages.
Nicassio, et al. (Jan. 2012) "The Contribution of Pain and Depression to Self- Reported Sleep Disturbance in Patients with Rheumatoid Arthritis", Pain, vol. 153, No. 1, pp. 107-112.
Nieminen, et al., "The Use of the ATF System to Culture Chinese Hamster Ovary Cells in a Concentrated Fed-Batch System", BioPharm International, vol. 24, Issue 6, pp. 1-8, Jun. 1, 2011.
"Nihon Naika Gakkai zasshi", Japan Internal Medical Association Magazine, vol. 101, No. 10, pp. 2893-2898.
Nishimoto, et al. (Nov. 1, 2008) "Study of Active Controlled Tocilizumab Monotherapy for Rheumatoid Arthritis Patients with an Inadequate Response to Methotrexate (SATORI): Significant Reduction in Disease Activity and Serum Vascular Endothelial Growth Factor by IL-6 Receptor Inhibition Th", Modern Rheumatology, vol. 19, No. 1, pp. 12-19.
Nussenblatt, et al. (Apr. 1985) "Standardization of Vitreal Inflammatory Activity in Intermediate and Posterior Uveitis", Ophthalmology, vol. 92, No. 4, pp. 467-471.
Ongkosuwito, et al. (Dec. 1998) "Analysis of Immunoregulatory Cytokines in Ocular Fluid Samples from Patients with Uveitis", Investigative Ophthalmology & Visual Science, vol. 39, No. 13, pp. 2659-2665.
Panka, et al. (May 1988) "Variable Region Framework Differences Result in Decreased or Increased Affinity of Variant Anti-Digoxin Antibodies", Proceedings of the National Academy of Sciences of the United States of America, vol. 85, pp. 3080-3084.
Patro et al., "Protein formulation and fill-finish operations," Biotechnol Annu Rev, 8:55-84, (2002). Abstract only.
Paul-Pletzer (2006) "Tocilizumab: Blockade of Interleukin-6 Signaling Pathway as a Therapeutic Strategy for Inflammatory Disorders", Drugs of Today, vol. 42, No. 9, pp. 559-576.
Peichl, "Biologikatherapie in der Rheumatologie", DoctorConsult—The Journal. Wissen fur Klinik und Praxis, Nov. 2011, 2(3): e164-e166.
Perez, et al. (Sep. 2004) "Elevated Levels of Interleukin 6 in the Vitreous Fluid of Patients with Pars Planitis and Posterior Uveitis: The Massachusetts Eye & Ear Experience and Review of Previous Studies", Ocular Immunology and Inflammation, vol. 12, No. 3, pp. 193-201.
Pham et al., "Patient acceptable symptomatic state (PASS)", Joint Bone Spine, Jul. 2009, 76(4): 321-323.
Powchik (Jul. 15, 2010) "Investor Day", Regeneron Pharmaceuticals, pp. 1-19.
Powell, et al. (Sep.-Oct. 1998) "Compendium of Excipients for Parenteral Formulations", PDA Journal of Pharmaceutical Science and Technology, vol. 52, No. 5, pp. 238-311.
Presta (2006) "Engineering of Therapeutic Antibodies to Minimize Immunogenicity and Optimize Function", Advanced Drug Delivery Reviews, pp. 640-656.
PubChem SID: 135626879, National Library of Medicine, https://pubchem.ncbi.nlm.nih.gov/substance/135626879, Apr. 5, 2012.
Pulawski et al., "Certain therapies linked to pulmonary toxicity among patients with rheumatic diseases", Healio, May 20, 2015, obtained from url: https://www.healio.com/news/rheumatology/20150520/certain-therapies-linked-to-pulmonary-toxicity-among-patients-with-rheumatic-diseases.
Radin, et al. (Jan. 1, 2010) "Safety and Effects on Markers of Inflammation of Subcutaneously Administered regn88/sar153191 (regn88), an Interleukin-6 Receptor Inhibitor, in Patients with Rheumatoid Arthritis: Findings from Phase 1 Studies", Annals of the Rheumatic Diseases, vol. 69, Supplement 3, XP008158577, 99 Page.
Radin, et al. (Nov. 2010) "REGN88/SAR153191, a fully-human interleukin-6 receptor monoclonal antibody, reduces acute phase reactants in patients with rheumatoid arthritis: preliminary observations from Phase 1 studies.", Arthritis & Rheumatology, vol. 62, Supplement 10, XP008158581, p. S1121.
Rafique, et al. (Jun. 23, 2013) "Evaluation of the Binding Kinetics and Functional Bioassay Activity of Sarilumab and Tocilizumab to the Human IL-6 Receptor (IL-6r) alpha", Annals of the Rheumatic Diseases, vol. 72, Issue Suppl 3, pp. A797.1-A797.
Raimondo et al., "Profile of sarilumab and its potential in the treatment of rheumatoid arthritis", Drug Design, Development and Therapy, May 24, 2017, 11: 1593-1603.
Reddy et al., "Elimination of Fc Receptor-Dependent Effector Functions of a Modified IgG4 Monoclonal Antibody to Human CD4," Journal of Immunology, 164:1925-1933 (2000).
Regeneron (Jun. 12, 2014) "Sanofi and Regeneron Announce New, Detailed Data from Positive Sarilumab Phase 3 Rheumatoid Arthritis Trial at EULAR".
Regeneron (Nov. 22, 2013) "Sanofi and Regeneron Report Positive Results with Sarilumab in First Phase 3 Rheumatoid Arthritis Registration Trial", Press Release, Acquire Media, Retrieved From: <<https://investor.regeneron.com/news-releases/news-release-details/sanofi-and-regeneron-report-positive-results-sarilumab-first>>, 6 pages.
Regeneron Pharmaceuticals (Jul. 12, 2011) "Evaluation of Sarilumab (SAR153191/REGN88) on Top of Methotrexate in Rheumatoid Arthritis Patients (RA-Mobility)", Retrieved from the internet from URL <<https://clinicaltrials.gov/ct2/results?term=SAR+153191=mobility>>.
Regeneron Pharmaceuticals (Jul. 12, 2011) "Sanofi and Regeneron Report Positive Phase 2b Trial Results with Sarilumab in Rheumatoid Arthritis", Acquire Media, Retrieved form URL: <http://web.archive.org/web/20110818152737/http://investorregeneron.com/releasedetail.cfm?ReleaseiD=590869>>, 3 pages.
Reichert, Janice M. (Jan.-Feb. 2011) "Antibody-Based Therapeutics to Watch in 2011", MABS, vol. 3, No. 1, pp. 76-99.
Riancho-Zarrabeitia, et al., "Efficacy of Tocilizumab in Patients with Uveitis Refractory to Other Biologic Drugs: A Multicenter Study on 31 Cases", 2014 ACR/ARHP Annual Meeting Abstract No. 1249, Retrieved from: <<https://acrabstracts.org/abstract/efficacy-of-Tocilizumab-in-patients-with-uveitis-refractory-to-other-biologic-drugs-a-multicenter-study-on-31-cases/>>.
Rose-John, et al. (May 17, 2006) "Interleukin-6 Biology is Coordinated by Membrane-Bound and Soluble Receptors: Role in Inflammation and Cancer", Journal of Leukocyte Biology, vol. 80, No. 2, pp. 227-236.
Rudikoff, et al. (Mar. 1, 1982) "Single Amino Acid Substitution Altering Antigen-Binding Specificity", Proceedings of the National Academy of Sciences of the United States of America, vol. 79, pp. 1979-1983.
Sanofi (Feb. 2, 2010) "Evaluation of Sarilumab (SAR153191/REGN88) on Top of Methotrexate in Rheumatoid Arthritis Patients (RA-MOBILITY)", Clinical Trials.gov, Retrieved from: <<http://clinicaltrials.gov/show/NCT01061736>>, 6 pages.
Sanofi (Nov. 7, 2013) "View of NCT01061736 on Nov. 7, 2013: ClinicaiTrials.gov Archive", Retrieved from URL: <<https://clinicaltrials.gov/archive/NCT01061736/2013_11_07>>.
Sanofi (Oct. 7, 2010) "Effect of SAR153191 (REGN88) With Methotrexate in Patients with Active Rheumatoid Arthritis Who Failed TNF-α Blockers", ClinicaiTrials.gov, Retrieved from: <<http://clinicaltrials.gov/show/NCT01217814>>, 5 pages.
Sanofi (Sep. 27, 2011) "View of NCT01217814 on Sep. 27, 2011", ClinicaiTrials.gov, Retrieved from URL: <<https://clinicaltrials.gov/archive/NCT01217814/2011_09_27>>, 4 pages.
Sanofi and Regeneron (May 21, 2015) "Sanofi and Regeneron Announce Positive Topline Results from Phase 3 Studies with Sarilumab in Patients with Rheumatoid Arthritis", Press Release, Retrieved from http://mediaroom.sanofi.com/sanofi-and-regeneron-announce-positive-topline-results-from-phase-3-studies-witharilumab-in-patients-with-rheumatoid-arthritis-2, 4 pages.
Sanofi and Regeneron (Nov. 8, 2015) "Regeneron and Sanofi Present Results from Pivotal Phase 3 Study of Sarilumab at American College of Rheumatology Annual Meeting", Press Release, Regeneron Pharmaceuticals, Inc. Retrieved from http://investor.regeneron.com/releasedetail.cfm?releaseid=941387.

(56) References Cited

OTHER PUBLICATIONS

Sanofi et al., "A Repeated Dose-finding Study of Sarilumab in Children and Adolescents With Systemic Juvenile Idiopathic Arthritis (SKYPS)", ClinicalTrials.gov Identifier: NCT02991469, Dec. 13, 2016.
Sanofi et al., "An Open-label, Ascending, Repeated Dose-finding Study of Sarilumab in Children and Adolescents With Polyarticular-course Juvenile Idiopathic Arthritis (pcJIA) (SKYPP)", ClinicalTrials.gov Identifier: NCT02776735, May 18, 2016.
Sebba et al., "Comparative Effectiveness of TNF Inhibitor vs IL-6 Receptor Inhibitor as Monotherapy or Combination Therapy with Methotrexate in Patients with Rheumatoid Arthritis: Analysis from the CorEvitas RA Registry", Poster No. 0834, ACR Convergence—Virtual, Nov. 1-10, 2021.
Sebba, "Comparative Effectiveness of TNF Inhibitor vs IL-6 Receptor Inhibitor as Monotherapy or Combination Therapy with Methotrexate in Patients with Rheumatoid Arthritis: Analysis from the CorEvitas RA Registry", SAR-54318 TNFi/IL-6Ri Mono/Combo Audio narration, ACR Convergence—Virtual, Nov. 1-10, 2021.
Seth, et al., "Development of a New Bioprocess Scheme Using Frozen Seed Train Intermediates to Initiate CHO Cell Culture Manufacturing Campaigns", Biotechnology and Bioengineering, May 2013, vol. 110, Issue 5, pp. 1376-1385.
Shields et al., "Lack of Fucose on Human IgG1 N-Linked Oligosaccharide Improves Binding to Human Fc gamma RIII and Antibody-dependent Cellular Toxicity," Journal of Biological Chemistry, 277(30):26733-26740 (2002).
Smolen et al., "Rheumatoid arthritis", Lancet, 2016, 388(10055): 2023-2038.
Smolen, et al. (Mar. 22-28, 2008) "Effect of Interleukin-6 Receptor Inhibition with Tocilizumab in Patients with Rheumatoid Arthritis (Option Study): A Double-Blind, Placebo-Controlled, Randomised Trial", The Lancet, vol. 371, Issue 9617, pp. 987-997.
Spectrum Laboratories, Inc., "Hollow Fiber Filters", Datasheet [online], Spectrumlabs.com, Copyright 1995-2015, Retrieved from: <<URL: http://www.spectrumlabs.com/filtration/mPESKrosFloList.html>>, Retrieved on: Jun. 12, 2015.
Strand et al., "Patient-reported outcomes from a randomized phase III trial of sarilumab monotherapy versus adalimumab monotherapy in patients with rheumatoid arthritis", Arthritis Res Ther., 2018, 20(1): 129.
Strand, et al. (2012) "Health-related Quality of Life Outcomes of Adalimumab for Patients with Early Rheumatoid Arthritis: Results from a Randomized Multicenter Study", The Journal of Rheumatology, vol. 39, pp. 63-72.
Suttorp-Schulten, et al. (1996) "Recent Developments in the Treatment of Posterior Uveitis", Ocular Immunology and Inflammation, vol. 4, No. 4, pp. 207-217.
Taylor et al., "A transgenic mouse that expresses a diversity of human sequence heavy and light chain immunoglobulins", Nucleic Acids Research, Dec. 11, 1992, 20(23): 6287-6295.
Taylor, Peter C. (Jun. 2010) "Pharmacology of TNF Blockade in Rheumatoid Arthritis and Other Chronic Inflammatory Diseases", Current Opinion in Pharmacology, vol. 10, Issue 3, pp. 308-315.
The Chemical Abstracts Service CAS, 1189541-98-7.
U.S. Adopted Names Council "Statement on a Nonproprietary Name Adopted by the USAN Council: Sarilumab", CAS Registry No. 1189541-98-7.
Uchiyama, et al. (2008) "Tocilizumab, A Humanized Anti-Interleukin-6 Receptor Antibody, Ameliorates Joint Swelling in Established Monkey Collagen-Induced Arthritis", Biological and Pharmaceutical Bulletin, vol. 31, No. 6, pp. 1159-1163.
Valentincic, et al. (Jul. 20, 2011) "Intraocular and Serum Cytokine Profiles in Patients with Intermediate Uveitis", Molecular Vision, vol. 17, pp. 2003-2010.
Vasanthi, et al. (Dec. 2007) "Role of Tumor Necrosis Factor-Alpha in Rheumatoid Arthritis: A Review", APLAR Journal of Rheumatology, vol. 10, No. 4, pp. 270-274.
Wang et al., "Minireview: Antibody Structure, Instability, and Formulation," Journal of Pharmaceutical Sciences, 96(1):1-26, (2007).

Wang, "Instability, stabilization, and formulation of liquid protein pharmaceuticals," Int'l J. Pharmaceutics, 185(2):129-188, (1999).
Wei et al., "Serum Levels of IL-6 and TNF-a May Correlate with Activity and Severity of Rheumatoid Arthritis", Med Sci Monit., 2015, 21: 4030-4038.
Whalley, et al. (1997) "Quality of Life in Rheumatoid Arthritis", British Journal of Rheumatology, vol. 36, pp. 884-888.
Wiens, et al. (Jun. 2010) "A Systematic Review and Meta-Analysis of the Efficacy and Safety of Adalimumab for Treating Rheumatoid Arthritis", Rheumatology International, vol. 30, Issue 8, pp. 1063-1070.
Woods, et al., "Container System for Enabling Commercial Production of Cryopreserved Cell Therapy Products", Regenerative Medicine, vol. 5, No. 4, pp. 659-667, Jul. 15, 2010.
Wu, et al. (Apr. 5, 1987) "Receptor-Mediated In Vitro Gene Transformation by a Soluble DNA Carrier System", Journal of Biological Chemistry, vol. 262, No. 10, pp. 4429-4432.
Yokota et al., "Efficacy and safety of tocilizumab in patients with systemic-onset juvenile idiopathic arthritis: a randomised, double-blind, placebo-controlled, withdrawal phase III trial", The Lancet, Mar. 22, 2008, 371(9617): pp. 998-1006.
Yoshimura, et al. (2009) "Comprehensive Analysis of Inflammatory Immune Mediators in Vitreoretinal Diseases", PLoS One, vol. 4, No. 12, pp. 1-9.
U.S. Appl. No. 13/043,617, filed Oct. 25, 2011, Stevens et al.
Actemra Prescribing Information Genentech. Actemra (tocilizumab): Full Prescribing Information. 2017 Retrieved from: <<https://www.accessdata.fda.gov/drugsatfda_docs/label/2017/125276s1141b1.pdf>>.
Adlan, et al., Autonomic Function and Rheumatoid Arthritis—A Systematic Review, Seminars in Arthritis and Rheumatism, vol. 44, No. 3, pp. 283-304, 2014.
Advisory Action received for U.S. Appl. No. 13/648,521, mailed on Jul. 19, 2016, 3 Pages.
Atzeni et al., "Il-6 Involvement in pain, fatigue and mood disorders in rheumatoid arthritis and the effects of Il-6 inhibitor sarilumab", Pharmacological Research, 2019, 149: 1-8.
Biswas, et al., Prevalence, Types, Clinical Associations, and Determinants of Peripheral Neuropathy in Rheumatoid Patients, Annals of Indian Academy of Neurology, vol. 14, No. 3, pp. 194-197, 2011.
Boyden et al., Non-inflammatory Causes of Pain in Patients with Rheumatoid Arthritis, Curr Rheumatol Rep., 2016, 18: 30.1.
Brenn, et al., Sensitization of Unmyelinated Sensory Fibers of the Joint Nerve to Mechanical Stimuli by Interleukin-6 in the Rat: an Inflammatory Mechanism of Joint Pain, Arthritis & Rheumatology, vol. 56, No. 1, pp. 351-359, Jan. 2007.
Burmester, et al. Unique Changes in Hemoglobin with Sarilumab Versus Adalimumab are Independent of Better Disease Control in Patients with Rheumatoid Arthritis (RA) Arthritis & Rheumatology, 2018 vol. 70, Supplement 10, Abstract 1528.
Cazzola et al., Physiopathology of Pain in Rheumatology, Reumatismo, vol. 66, No. 1, pp. 4-13, 2014.
Center for Drug Evaluation and Research, Application No. 761037 (Year: 2016).
Challa, et al., Patient-provider Discordance Between Global Assessments of Disease Activity in Rheumatoid Arthritis: a Comprehensive Clinical Evaluation, Arthritis Research & Therapy, vol. 19, No. 212, pp. 1-14, 2017.
Cheung, et al., "2-093 Comparative Effectiveness of Biologic Dmards and Jak Inhibitors in Patients With an Inadequate Response to TNF Inhibitors: a Network Meta-analysis", International Journal of Rheumatic Diseases, Retrieved From url: <<https://onlinelibrary.wiley.com/doi/10.1111/1756-185X.13545>>.
Choy et al., "Indirect Treatment Comparison of the Efficacy and Safety of Sarilumab Monotherapy in Rheumatoid Arthritis Patients with Inadequate Response to Conventional Disease-Modifying Antirheumatic Drugs", Mar. 12, 2019, 36(4): 817-827.
Choy et al., "Therapeutic benefit of blocking interleukin-6 activity with an anti-interleukin-6 receptor monoclonal antibody in rheumatoid arthritis: A randomized, double-blind, placebo-controlled, dose-escalation trial", Arthritis & Rheumatology, Dec. 2002, 46(12): 3143-3150.

(56) References Cited

OTHER PUBLICATIONS

Clinical Trial NCT02373202, A Study Assessing the Safety and Efficacy of Sarilumab Added to Non-MTX DMARDs or as Monotherapy in Japanese Patients With Active Rheumatoid Arthritis (Feb. 26, 2015).
ClinicalTrials.gov (Oct. 22, 2019) "Efficacy and Safety of GSK3196165 (Otilimab) Versus Placebo and Sarilumab in Participants With Moderately to Severely Active Rheumatoid Arthritis Who Have an Inadequate Response to Biological Disease-modifying Antirheumatic Drug (DMARDs) and/or Janus Kinase (JAK) Inhibitors (contRAst 3)", ClinicalTrials.gov Identifier: NCT04134728, Retrieved From url: <<https://clinicaltrials.gov/ct2/show/NCT04134728>>.
ClinicalTrials.gov, (Oct. 29, 2012) Study of the Safety, Tolerability, and Bioactivity of Tocilizumab on Patients with Non-infectious Uveitis, The STOP-Uveitis Study, NCT01717170, ClinicalTrials. gov Archive, URL: https://clinicaltrials.gov/ct2/show/NCT01717170.
ClinicalTrials.gov, Study NCT01061736 (v16), Oct. 7, 2010, Retrieved online: <URL: https://clinicaltrials.gov/ct2/history/NCT01061736?V_16= /iew#StudyPageTop>.
Cronstein, "Low-Dose Methotrexate: A Mainstay in the Treatment of Rheumatoid Arthritis", Pharmacological Reviews, Jun. 2005, 57(2): 163-172.
Curtis, et al. Reanalysis of the Multi-Biomarker Disease Activity Score for Assessing Disease Activity in the Abatacept Versus Adalimumab Comparison in Biologic-Naive Rheumatoid Arthritis Subjects with Background Methotrexate Study: Comment on the Article by Fleischmann, Arthritis & Rheumatology, Apr. 2017, vol. 69, No. 4, pp. 863-872.
De Haas, et al., Rheumatoid Arthritis, Typus Robustus, Annals of the Rheumatic Diseases, vol. 32, No. 1, pp. 91-92, 1973.
Deane, et al., Preclinical Rheumatoid Arthritis: Identification, Evaluation, and Future Directions for Investigation, Rheumatic Disease Clinics of North America, vol. 36, No. 2, pp. 213-241, 2010.
Dhillon, Intravenous Tocilizumab: A Review of Its Use in Adults with Rheumatoid Arthritis, BioDrugs, vol. 28, pp. 75-106, 2014.
Durán, et al., The Effect on Treatment Response of Fibromyalgic Symptoms in Early Rheumatoid Arthritis Patients: Results From the Espoir Cohort, Rheumatology, vol. 54, No. 12, pp. 2166-2170, 2015.
Elixhauser, et al., Comorbidity Measures for Use with Administrative Data, Medical Care, vol. 36, No. 1, pp. 8-27, Jan. 1988.
Extended European Search Report received for European Patent Application No. 20167644.2, mailed on Oct. 21, 2020, 8 Pages.
Feist, et al., "Abstract 0832 Prosara—A Prospective, Multicenter, Noninterventional Study to Evaluate the Safety and Effectiveness of Sarilumab for the Treatment of Active Rheumatoid Arthritis in Regular Care in Germany", ACR Convergence, Nov. 5-9, 2020, Meeting Abstracts.
Feist, et al., "THU0165 Prosara—a Prospective, Multicenter, Noninterventional Study to Evaluate the Safety and Effectiveness of Sarilumab for the Treatment of Active Rheumatoid Arthritis in Regular Care in Germany", Annals of the Rheumaic Diseases, Scientific Abstracts, Jun. 2020.
Final Office Action received for U.S. Appl. No. 13/648,521, mailed on Mar. 10, 2014, 9 Pages.
Final Office Action received for U.S. Appl. No. 13/648,521, mailed on Feb. 11, 2016, 13 Pages.
Fleischmann et al., "Efficacy and Safety of Sarilumab in Connection with CsDMARDs in Patients with Active Rheumatoid Arthritis Who Were Inadequate Responders or Intolerant of Anti-TNF-alpha Therapy: Results from a Phase 3 Study", ACR Abstract 970; Nov. 8, 2015.
Flodin, et al., Intrinsic Brain Connectivity in Chronic Pain: A Resting-State fMRI Study in Patients with Rheumatoid Arthritis, Frontiers in Human Neuroscience, vol. 10, No. 107, pp. 1-8, Mar. 2016.
Fortin, et al., "Glossary of Selected Terms—A Systematic Review of Intravitreal Bevacizumab for the Treatment of Diabetic Macular Edema" NCBI Bookshelf, XP055753991, Retrieved from: <<https://www.ncbi.nlm.nih.gov/books/NBK169468/>>, 2 Pages, May 1, 2012.

Fragiadaki et al., Sleep Disturbances and Interleukin 6 Receptor Inhibition in Rheumatoid Arthritis, J Rheumatol., 2012, 39: 60-62.
Garces, et al., Comparison of Dose Escalation and Costs of Dose Escalation Between Patients With Rheumatoid Arthritis Initiating Biologic Treatment With Etanercept, Adalimumab, or Infliximab, Value in Health, vol. 19, No. 3, pp. A229-A230, 2016.
Genovese, et al., "293 A Phase 3 Clinical Program of Three, Randomized, Double-blind, Placebo- and Comparator-controlled Studies to Assess the Efficacy and Safety of Otilimab in RA: Study Design and Methodology", Journal of Clinical Rheumatology, Retrieved From url :<<https://journals.lww.com/jclinrheum/Fulltext/2020/04001/22nd_PANLAR_Congress_Miami,_FL,_August_12_15_2020.1.aspx>>.
Genovese, et al., "Efficacy and Safety of Sarilumab in Combination With csDMARDs or as Monotherapy in Subpopulations of Patients With Moderately to Severely Active Rheumatoid Arthritis in Three Phase III Randomized", Controlled Studies, Arthritis Research & Therapy, vol. 22, No. 1, pp. 1-17, 2020.
Genovese, et al., "Long-term Safety and Efficacy of Sarilumab Plus Methotrexate on Disease Activity, Physical Function and Radiographic Progression: 5 Years of Sarilumab Plus Methotrexate Treatment", Rheumatic & Musculoskeletal Disease, vol. 5, No. 2, pp. 1-10, 2019.
Genovese, et al., "Switching Between the JAK1-selective Inhibitor Upadacitinib and Adalimumab Following Initial Non-response: Clinical and Functional Outcomes Among Rheumatoid Arthritis Patients", Oral Presentations, Jun. 12, 2019, RA therapy—JAK inhibitors and beyond.
Genovese, et al., Interleukin-6 Receptor Inhibition With Tocilizumab Reduces Disease Activity in Rheumatoid Arthritis With Inadequate Response to Disease-modifying Antirheumatic Drugs: the Tocilizumab in Combination With Traditional Disease-modifying Antirheumatic Drug Ther, Arthritis & Rheumatism: Official Journal of the American College of Rheumatology, vol. 58, No. 10, pp. 2968-2980, Sep. 29, 2008.
Georgy, et al., A Clinical Study to Assess the Pharmacokinetics and Pharmacodynamics of Tocilizumab After a Single Dose Administration by Subcutaneous and Intra Venous Routes to Healthy Subjects, Clinical Pharmacology & Therapeutics, vol. 87, No. S1, p. S60, Feb. 15, 2010.
Hammer, et al., Major Reduction of Ultrasound Detected Synovitis during Subcutaneous Tocilizumab Treatment; Results from a Multicenter 24 Weeks Study of Patients with Rheumatoid Arthritis, Arthritis & Rheumatology, vol. 70, No. S9, pp. 1537-1538, 2018.
Heidari et al., "Rheumatoid Arthritis: Early Diagnosis and Outcomes", Caspian Journ Intern Med., Winter 2011, 2(1): 161-170.
International Search Report and Written Opinion Received for PCT Application No. PCT/US2020/037325, mailed on Oct. 27, 2020.
International Search Report and Written Opinion received for PCT Patent Application No. PCT/IB2021/054546, mailed on Sep. 14, 2021.
International Search Report and Written Opinion received for PCT Patent Application No. PCT/IB2021/054652, mailed on Aug. 30, 2021.
Jones, et al., Comparison of Tocilizumab Monotherapy Versus Methotrexate Monotherapy in Patients With Moderate to Severe Rheumatoid Arthritis: the Ambition Study, Annals of the Rheumatic Diseases, vol. 69, No. 01, pp. 88-96, 2010.
Kaneko, Tocilizumab in Rheumatoid Arthritis: Efficacy, Safety and Its Place in Therapy, Therapeutic Advances in Chronic Disease, vol. 4, No. 1, pp. 15-21, 2013.
Khan, et al., Determinants of Discordance in Patients' and Physicians' Rating of Rheumatoid Arthritis Disease Activity, Arthritis Care & Research (Hoboken), vol. 64, No. 2, pp. 206-214, 2012.
Klein, et al. FRI0549—Efficacy and Safety of Tocilizumab in Systemic and Polyarticular Juvenile Idiopathic Arthritis—Data of Toe Biker Registry Squibb, Johnson & Johnson, Novartis, Pfizer, Fieckitt Benkiser, and Roche Jun. 14, 2019 pp. 969-970.
Kojima, et al., Depression, Inflammation, and Pain in Patients With Rheumatoid Arthritis, Arthritis & Rheumatism (Arthritis Care & Research), vol. 61, No. 8, pp. 1018-1024, Aug. 15, 2009.

(56) References Cited

OTHER PUBLICATIONS

Kremer, et al., Tocilizumab Inhibits Structural Joint Damage in Rheumatoid Arthritis Patients With Inadequate Responses to Methotrexate, Arthritis & Rheumatism vol. 63, No. 3, pp. 609-621, 2011.
Kristensen, et al., Is Swollen to Tender Joint Count Ratio a New and Useful Clinical Marker for Biologic Drug Response in Rheumatoid Arthritis? Results From a Swedish Cohort, Arthritis Care & Research (Hoboken), vol. 66, No. 2, pp. 173-179, 2014.
Lamb et al., "Sarilumab: A Review in Moderate to Severe Rheumatoid Arthritis Drugs", Drugs, 2018, 78: 929-940.
Lee et al., "Disease modifying drugs in adult rheumatoid arthritis", Australian Prescriber, Apr. 2003, 26: 36-40.
Lee, et al., Pain Persists in DAS28 Rheumatoid Arthritis Remission but Not in ACR/EULAR Remission: a Longitudinal Observational Study, Arthritis Research & Therapy, vol. 13, No. R83, pp. 1-9, 2011.
Maini, et al., Double-blind Randomized Controlled Clinical Trial of the Interleukin-6 Receptor Antagonist, Tocilizumab, in European Patients With Rheumatoid Arthritis Who Had an Incomplete Response to Methotrexate, Arthritis & Rheumatism, vol. 54, No. 9, pp. 2817-2829, Aug. 31, 2006.
Maini, et al., Infliximab (Chimeric Anti-Tumour Necrosis Factor A Monoclonal Antibody) Versus Placebo in Rheumatoid Arthritis Patients Receiving Concomitant Methotrexate: a Randomised Phase III Trial, The Lancet, vol. 354, No. 9194, pp. 1932-1939, 1999.
Matcham, et al., Psychological Correlates of Fatigue in Rheumatoid Arthritis: A Systematic Review, Clinical Psychology Review, vol. 39, pp. 16-29, Jul. 2015.
Matcham, et al., Symptoms of Depression and Anxiety Predict Treatment Response and Long-term Physical Health Outcomes in Rheumatoid Arthritis: Secondary Analysis of a Randomized Controlled Trial, Rheumatology, vol. 55, Issue 2, pp. 268-278, Feb. 2016.
Matcham, et al., The Prevalence of Depression in Rheumatoid Arthritis: A Systematic Review and Meta-analysis, Rheumatology, vol. 52, Issue 12, pp. 2136-2148, Sep. 3, 2013.
Matteson, "Current Treatment Strategies for Rheumatoid Arthritis", Mayo Clinic Proceedings, vol. 75, pp. 69-74, Jan. 2000.
McWilliams, et al., Pain Mechanisms in Rheumatoid Arthritis, Clinical and Experimental Rheumatology, vol. 35, No. 5, pp. S94-S101, 2017.
Medscape, Actemra, Retrieved online: <URL: https://reference.medscape.com/drug/actennra-tocilizunnab-999419>, Retrieved on Feb. 8, 2022.
Millar et al., Inflammatory mechanisms in tendinopathy—towards translation, Nature, Feb. 2017, 13: 110-122.
Nadkarni, et al., Incidence of Dose Escalation and Impact on Biologic Costs Among Patients With Rheumatoid Arthritis Treated With Three Intravenous Agents, Journal of Comparative Effectiveness Research, vol. 6, No. 8, pp. 671-682, 2017.
New Drug Approvals Retrieved from: <<https://www.drugs.com/newdrugs.html>> pp. 1-7.
Nishimoto, et al., Humanized Antihuman IL-6 Receptor Antibody, Tocilizumab, Part of the Handbook of Experimental Pharmacology, vol. 181, Therapeutic Antibodies, pp. 151-160, 2008.
Non-Final Office Action received for U.S. Appl. No. 13/648,521, mailed on Jul. 3, 2014, 12 Pages.
Non-Final Office Action received for U.S. Appl. No. 13/648,521, mailed on Jun. 26, 2015, 9 Pages.
Non-Final Office Action received for U.S. Appl. No. 13/648,521, mailed on Mar. 19, 2015, 8 Pages.
Non-Final Office Action received for U.S. Appl. No. 13/648,521, mailed on Oct. 18, 2013, 10 Pages.
Non-Final Office Action received for U.S. Appl. No. 14/350,973, mailed on Feb. 5, 2016, 18 Pages.
Non-Final Office Action received for U.S. Appl. No. 14/350,973, mailed on Oct. 18, 2019, 10 Pages.
Notice of Allowance received for U.S. Appl. No. 14/350,973, mailed on Jun. 14, 2016, 8 Pages.

Ogata, et al., Long-term Safety and Efficacy of Weekly Subcutaneous Tocilizumab Monotherapy in Patients With Rheumatoid Arthritis Who Had an Inadequate Response to Subcutaneous Tocilizumab Every Other Week: Results From the Open-label Extension of the SHINOBI Study, Modern Rheumatology, vol. 29, Issue 5, pp. 767-774, Sep. 3, 2019.
Ogata, et al., Subcutaneous Tocilizumab: Recent Advances for the Treatment of Rheumatoid Arthritis, Expert Opinion on Drug Delivery, vol. 16, Issue 6, pp. 639-648, Jun. 3, 2019.
Ohta, et al., Optimal Dose Prediction by Pharmacokinetic and Biomarker Response of Subcutaneous Tocilizumab Treatment A Phase I/II Study Evaluating the Safety, Pharmacokinetics and Clinical Response in Patients with Rheumatoid Arthritis, Arthritis & Rheumatism, vol. 62, Supplement 10, pp. 1-2, Oct. 1, 2010.
Overman, et al., The Prospective Association Between Psychological Distress and Disease Activity in Rheumatoid Arthritis: a Multilevel Regression Analysis, Annals of the Rheumatic Diseases, vol. 71, No. 2, pp. 192-197, 2012.
Pappas, et al., Dosing of Intravenous Tocilizumab in a Real-World Setting of Rheumatoid Arthritis: Analyses from the Corrona Registry, Rheumatology and Therapy, vol. 3, pp. 103-115, Feb. 8, 2016.
Pincus, Limitations of a Quantitative Swollen and Tender Joint Count to Assess and Monitor Patients with Rheumatoid Arthritis, Bulletin of the NYU Hospital for Joint Diseases, 2008, 66(3): 216-223.
Pollard, et al., Fibromyalgic Rheumatoid Arthritis and Disease Assessment, Rheumatology, vol. 49, No. 5, pp. 924-928, Jan. 25, 2010.
Redlich et al., "Inflammatory bone loss: pathogenesis and therapeutic intervention", Nat Rev Drug Discov., Mar. 2012, 11(3): 234-250.
Regeneron Pharmaceuticals, Inc., "Sanofi and Regeneron Announce Patient Enrollment in Two Phase 3 Trials With Sarilumab in Rheumatoid Arthritis (RA)", Online Publication, May 15, 2013 at 1:00 AM EDT.
Restriction Requirement received for U.S. Appl. No. 13/648,521, mailed on Jun. 10, 2013, 7 Pages.
Restriction Requirement received for U.S. Appl. No. 14/350,973, mailed on Aug. 19, 2015, 8 Pages.
Roche, Anti-Human IL-6 Receptor Monoclonal Antibody "Actemra" Subcutaneous Injection Demonstrates Efficacy in Rheumatoid Arthritis in Phase III Clinical Study, Jul. 19, 2011, Retrieved online: <URL: https://www.roche.com/dann/jcr:c49f4e4e-d60e-48cc-a14e-c0f1f4107b24/en/inv-update-2011-07-19b-annex.pdf>, Retrieved on Feb. 8, 2022.
Salaffi et al. "The health-related quality of life in rheumatoid arthritis, ankylosing spondylitis, and psoriatic arthritis: a comparison with a selected sample of healhty people", Health and Quality of Life Outcomes, Biomed Central, vol. 7, No. 1, pp. 25, 2009.
Sarzi-Puttini, et al., Correlation of the Score for Subjective Pain With Physical Disability, Clinical and Radiographic Scores in Recent Onset Rheumatoid Arthritis, BMC Musculoskeletal Disorders, vol. 3, No. 18, pp. 1-4, Jul. 19, 2002.
Schaible, Nociceptive Neurons Detect Cytokines in Arthritis, Arthritis Research & Therapy, vol. 16, No. 470, pp. 1-9, 2014.
Singh, et al., 2015 American College of Rheumatology Guideline for the Treatment of Rheumatoid Arthritis, Arthritis & rheumatology, vol. 68, No. 1, pp. 1-26, 2016.
Smolen, et al., EULAR Recommendations for the Management of Rheumatoid Arthritis With Synthetic and Biological Disease-modifying Antirheumatic Drugs: 2016 Update, Annals of the Rheumatic Diseases, vol. 76, No. 6, pp. 960-977, 2017.
Stamp et al., "The use of low dose methotrexate in rheumatoid arthritis—are we entering a new era of therapeutic drug monitoring and pharmacogenomics?", Biomedicine & Pharmacotherapy, 2006, 60: 678-687.
Strand, et al., Sarilumab Improves Patient-reported Outcomes in Rheumatoid Arthritis Patients With Inadequate Response/Intolerance to Tumour Necrosis Factor Inhibitors, RMD Open, vol. 3, e000416, 2017.
Strand, et al., Sarilumab Plus Methotrexate Improves Patient-reported Outcomes in Patients With Active Rheumatoid Arthritis

(56) References Cited

OTHER PUBLICATIONS and Inadequate Responses to Methotrexate: Results of a Phase III Trial, Arthritis Research & Therapy, vol. 18, No. 198, pp. 1-10, 2016.
Studenic, et al., Discrepancies Between Patients and Physicians in Their Perceptions of Rheumatoid Arthritis Disease Activity, Arthritis & Rheumatology, vol. 64, No. 9, pp. 2814-2823, 2012.
Study of the Safety, Tolerability, and Bioactivity of Tocilizumab on Patients With Non-infectious Uveitis, The STOP-Uveitis Study, ClinicalTrials.gov Archive, Oct. 29, 2012.
Świerkot et al., "Methotrexate in rheumatoid arthritis", Pharmacological Reports, 2006, 58: 473-492.
Taylor, (Jun. 2010) "Pharmacology of TNF Blockade in Rheumatoid Arthritis and Other Chronic Inflammatory Diseases", Current Opinion in Pharmacology, vol. 10, Issue 3, pp. 308-315.
Taylor, et al., Patient Perceptions Concerning Pain Management in the Treatment of Rheumatoid Arthritis, The Journal of International Medical Research, vol. 38, No. 4, pp. 1213-1224, 2010.
Turnier et al., "Tocilizumab for treating juvenile idiopathic arthritis", Expert Opinion on Biological Therapy, 2016, 16(4): 559-566.
United States Census Bureau. Census Regions and Divisions of the United States, Retrieved from: <<https://www2.census.gov/geo/pdfs/maps-data/maps/reference/us_regdiv.pdf>>, Accessed on: Apr. 8, 2019.
Van Herwaarden, et al., Dose Reduction of Tocilizumab in Rheumatoid Arthritis Patients With Low Disease Activity, Clinical and Experimental Rheumatology, vol. 32, pp. 390-394, 2014.
Van Vollenhoven, Sex Differences in Rheumatoid Arthritis: More Than Meets the Eye, BMC Medicine, vol. 7, No. 12, pp. 1-4, Mar. 30, 2009.
Walsh, et al., Mechanisms, Impact and Management of Pain in Rheumatoid Arthritis, Nature Reviews Rheumatology, vol. 10, No. 10, pp. 581-592, 2014.
Wells, et al., "Immunogenicity of Sarilumab Monotherapy in Patients with Rheumatoid Arthritis Who Were Inadequate Responders or Intolerant to Disease-Modifying Antirheumatic Drugs", Rheumatology and Therapy, vol. 6, No. 3, pp. 339-352, May 14, 2019.
Wolfe et al., "Sleep Disturbance in Patients with Rheumatoid Arthritis: Evaluation by Medical Outcomes Study and Visual Analog Sleep Scales", J Rheumatol., 2006, 33:1942-1951.
Yang, et al., Chronic Pain: Structural and Functional Changes in Brain Structures and Associated Negative Affective States, International Journal of Molecular Sciences, vol. 20, No. 13, p. 3130, Jun. 26, 2019.
Yoo et al., "Exosomal amyloid A and lymphatic vessel endothelial hyaluronic acid receptor-1 proteins are associated with disease activity in rheumatoid arthritis", Arthritis Research & Therapy, 2017, 19(1): 119.
Zhou, et al., Interleukin-6: An Emerging Regulator of Pathological Pain, Journal of Neuroinflammation, vol. 13, No. 141, pp. 1-9, 2016.S.
Pelechas et al., "Clinical evaluation of the safety, efficacy and tolerability of sarilumab in the treatment of moderate to severe rheumatoid arthritis", Therapeutics and Clinical Risk Management, Sept. 1, 2019, vol. 15, pp. 1073-1079.
Alekseeva, "Juvenile Idiopathic Arthritis: Clinical Picture, Diagnosis, Treatment," Current Pediatrics, 2015, 14(1): 78-94, Etiology and Pathogenesis, p. 78; Treatment of Polyarticular (RF−, RF+) JIA, p. 84; and Treatment, p. 92, English Abstract included.
Andersson M et al., "SAT0116 Prevalence of unacceptable pain in patients with long-standing RA", Annals of the Rheumatic Diseases, 2017, 76: p. 812-813.
Burmester et al., "Efficacy and safety of subcutaneous tocilizumab versus intravenous tocilizumab in combination with traditional DMARDs in patients with RA at week 97 (SUMMACTA)", Annals of the Rheumatic Diseases, Jun. 8, 2015, vol. 75, No. 1, pp. 68-74.
Choy et al., "Subcutaneous tocilizumab in rheumatoid arthritis: findings from the common-frame work phase 4 study programme Tozura conducted in 22 countries", Rheumatology, Mar. 1, 2018, 57(3): 499-507.

ClinicalTrials.gov, (Jun. 8, 2015) "Phase II Study to Analyze Sarilumab in Non-Infectious Uveitis", ClinicalTrials.gov Identifier: NCT01900431.
ClinicalTrials.gov. (Jan. 17, 2017) "A Study of the Efficacy and Safety of Tocilizumab in Adults With Rheumatoid Arthritis", ClinicalTrials.gov. Identifier: NCT01988012.
ClinicalTrials.gov. (May 11, 2016) "A Study to Compare Subcutaneous Versus Intravenous Administration of RoActemra/Actemra (Tocilizumab) in Participants With Moderate to Severe Active Rheumatoid Arthritis", ClinicalTrials.gov. Identifier: NCT01194414.
ClinicalTrials.gov. (Sep. 15, 2014) "Torpedo Study: A Study on Rapid Effect of Tocilizumab in Patients With Rheumatoid Arthritis With an Inadequate Response to Disease-Modifying Antirheumatic Drugs (DMARDs) or Anti-TNF", ClinicalTrials.gov. Identifier: NCT00977106.
Dasgupta et al., "Sarilumab in Patients With Relapsing Polymyalgia Rheumatica: A Phase 3, Multicenter, Randomized, Double Blind, Placebo Controlled Trial (Saphyr)", Annals of the Rheumatic Diseases, EULAR European Congress of Rheumatology (EULAR); Copenhagen, Denmark; Jun. 1-4, 2022, British Medical Association, GB, May 31, 2022, 81(Suppl. 1): 210-211.
Eberhard A., et al., "AB0285 Predictors of unacceptable pain and unacceptable pain with low inflammation, in early rheumatoid arthritis", Annals of the Rheumatic Diseases, pp. 1600, 2019.
Emery et al., "Evidence-based review of biologic markers as indicators of disease progression and remission in rheumatoid arthritis", Rheumatol Int., Jul. 2007, 27(9): 793-806, Epublished May 16, 2007.
Genentech (Apr. 11, 2019) Actemra® (tocilizumab) injection, for intravenous or subcutaneous use.
Hashimoto et al., "Increase of Hemoglobin Levels by Anti-IL-6 Receptor Antibody (Tocilizumab) in Rheumatoid Arthritis", PLoS One, May 30, 2014, vol. 9, No. 5, pp. e98202: 1-7.
Huizen et al., "What does it mean if you have a high C-reactive protein level?", Medical News Today, Oct. 11, 2023.
International Search Report with Written Opinion corresponding to International Patent Application No. PCT/US2023/065361, mailed Jul. 14, 2023.
Izumi et al., "Steroid-Sparing Effect of Tocilizumab and Methotrexate in Patients with Polymyalgia Rheumatica: A Retrospective Cohort Study", Journ Clin Med., Jun. 30, 2021, 10: 2948.
Montaño et al., "Influence of the Isotype of the Light Chain on the Properties of IgG", Journal of Immunology, 2002, 168: 224-231.
Nasonov, E.L. et al., "Prospects of pharmacotherapy rheumatoid arthritis: monoclonal antibodies", Nauchnopraktych Rheumatol., 2012, 52(3): 75-82.
Ogata et al., "Phase III Study of the Efficacy and Safety of Subcutaneous Versus Intravenous Tocilizumab Monotherapy in Patients With Rheumatoid Arthritis", Arthritis Care & Research, Aug. 27, 2013, vol. 66, No. 3, pp. 344-354.
Ohta et al., "Mechanism-Based Approach Using a Biomarker Response to Evaluate Tocilizumab Subcutaneous Injection in Patients With Rheumatoid Arthritis With an Inadequate Response to Synthetic DMARDs (Matusri Study)", The Journal of Clinical Pharmacology, Jan. 2014, 54(1):109-119, Epublished Oct. 12, 2013 . . . .
Patel et al., "The Negative Effect of Carpal Tunnel Syndrome on Sleep Quality", Sleep Disorders, Feb. 17, 2014, Article ID 962746.
Paul et al., "Effectiveness of biologic and non-biologic antirheumatic drugs on anaemia markers in 153,788 patients with rheumatoid arthritis: New evidence from real-world data", Seminars in Arthritis and Rheumatism, Feb. 1, 2018, vol. 47, No. 4, pp. 478-484.
Pelechas et al., "Clinical evaluation of the safety, efficacy and tolerability of sarilumab in the treatment of moderate to severe rheumatoid arthritis", Therapeutics and Clinical Risk Management, Sep. 1, 2019, vol. 15, pp. 1073-1079.
Scott, "Sarilumab: First Global Approval", Drugs, 2017, 77: 705-712.
Starkova et al., "ES02. Relatonship between fatigue and IL 6, diseas activity, depression in patients treated with tocilizumab", Rheumatology, Feb. 2012, 51(Suppl 1): i34-i41, Published Jan. 10, 2012.
Starkova et al., "Impact of tocilizumab therapy on fatigue in patients with rheumatoid arthritis", Scientific and Practical Rheumatology, 2012, N 52(3): 33-37, English translation included.

(56) References Cited

OTHER PUBLICATIONS

Steel et al., "2015 EULAR-ACR recommendations for polymyalgia rheumatica: the message and next steps", Rheumatology, Jun. 17, 2016, 55(6): 955-956, Advance Access Publication Dec. 17, 2015.
Strand et al., "Sustained benefit in rheumatoid arthritis following one course of rituximab: improvements in physical function over 2 years", Rheumatology, 2006, 45(12): 1505-1513.
Takeuchi, "Rheumatoid Arthritis: Advances in Diagnosis and Treatment", The Journal of the Japanese Society of Internal Medicine, 2012, vol. 101, pp. 2815-2817.
Ueno et al., "3-145: The efficacy and safety of additional tocilizumab in patients with polymyalgia rheumatica resistant to or intolerant of conventional therapy", AU, Apr. 1, 2019, 22(S3): 204.
Unknown, "Differentiation of Arthritis: Advances in Diagnosis and Treatment 1. Rheumatoid Arthritis", The Journal of the Japanese Society of Internal Medicine, 2010, vol. 99, pp. 2392-2400.
Yamamura, "FRI0266. The Real-World Efficacy of the 2015 EULAR/ACR Recommendations for the Management of Polymyalgia Rheumatica with Additional Tocilizumab Therapy", Annals of the Rheumatic Diseases, Jun. 13, 2020, 79(Suppl 1), 717.2-718.
Yoshii, I. et al, "Influence of pain score measured by a visual analog scale (PS-VAS) on the Health Assessment Questionnaire Disability Index and 28 joint-Disease Activity Index with C-reactive protein in rheumatoid arthritis patients", Int J, Rheum DID, 2018, 21: 1955-1961.
Chambers et al., "Serum Amyloid A Protein Concentration in Rheumatoid Arthritis and Its Role In Monitoring Disease Activity", Annals of the Rheumatic Diseases, Jan. 1, 1983, 42(6): 665-667.
ClinicalTrials.gov (May 21, 2020) "Efficacy and Safety of GSK3196165 (Otilimab) Versus Placebo and Sarilumab in Participants With Moderately to Severely Active Rheumatoid Arthritis Who Have an Inadequate Response to Biological Disease-modifying Antirheumatic Drug (DMARDs) and/or Janus Kinase (JAK) Inhibitors (contRAst 3)", ClinicalTrials.gov Identifier: NCT04134728.
ClinicalTrials.gov, "Efficacy, Safety and Tolerability of Repeated Dosis of Intravitreous Bevacizumab in Uveitic Macular Oedema", ClinicalTrials.gov ID: NCT01095809, Mar. 23, 2012.
Corraliza-Gorjón et al., "New strategies using antibody combinations to increase cancer treatment effectiveness", Frontiers in immunology, 2017, 8: 1804.
Heissigerova et al., "Efficacy and Safety of Sarilumab for the Treatment of Posterior Segment Noninfectious Uveitis (SARIL-NIU):: The Phase 2 Saturn Study", Ophthalmology, Mar. 2019, 126(3): 428-437.
Kenny et al., "Therapeutic protein drug-drug interactions: navigating the knowledge gaps—highlights from the 2012 AAPS NBC Roundtable and IQ Consortium/FDA workshop", The AAPS Journal, 2013, 15(4): 933-940.
Mould et al., "Pharmacokinetics and pharmacodynamics of monoclonal antibodies", BioDrugs, 2010, 24(1): 23-39.
Prodanovic et al., "Matrix Metalloproteinases-3 Baseline Serum Levels in Early Rheumatoid Arthritis Patients without Initial Radiographic Changes: A TwoYear Ultrasonographic Study", Med Princ Pract., 2018, 27(4): 378-386, Epublished May 24, 2018.
Sack Jr. et al., "Serum amyloid A—a review", Mol Med., Aug. 30, 2018, 24(1): 46.
Tallarida et al., "Quantitative Methods for Assessing Drug Synergism", Genes & Cancer, 2011, 2(11): 1003-1008.
Targonska-Stepniak et al., "Serum Amyloid A as a Marker of Persistent Inflammation and an Indicator of Cardiovascular and Renal Involvement in Patients with Rheumatoid Arthritis", Mediators of Inflammation, Jan. 1, 2014.
Teper et al., "Update on the Management of Uveitic Macular Edema", J Clin Med., 2021, 10(18): 4133.
Tyagi et al., "Chemical Modification and Chemical Crosslinking for Protein/Enzyme Stabilization", Biokhimiya, 1998, 63(3): 395-407.

\* cited by examiner

METHOD OF DIAGNOSIS AND TREATMENT OF RHEUMATOID ARTHRITIS

RELATED APPLICATIONS

This application claims the benefit of U.S. Provisional Application No. 62/837,793, filed Apr. 24, 2019; and European Application No. 20305193.3, filed on Feb. 27, 2020; each of which is incorporated herein by reference in its entirety.

FIELD

The present disclosure relates to the field of treating rheumatoid arthritis in a subject with serum concentrations of certain biomarkers, by administering to the subject an anti-IL6 receptor antibody.

BACKGROUND

Patients with rheumatoid arthritis (RA) develop bone and cartilage damage in synovial joints as a result of chronic inflammation, which is mediated by pro-inflammatory cytokines such as interleukin-6 (IL-6) and tumour necrosis factor alpha (TNF-α). In RA, elevated circulating cytokine concentrations trigger bone and cartilage destruction through activation of signaling cascades that lead to the stimulation of osteoclasts via bone-resorptive factors (e.g. receptor activator of nuclear factor-κB ligand [RANKL]) and joint-destructive proteins (e.g. matrix metalloproteinases). Underlying joint damage leads to long-term impairments in physical function.

IL-6 is a pleiotropic cytokine that plays a role in inflammatory, metabolic, neural and regenerative processes. IL-6 operates through two distinct mechanisms—classic (cis) and trans-signaling—which expands the range of its actions and contributes towards the systemic manifestations and co-morbidities commonly associated with RA, including the acute-phase response, osteoporosis, fatigue, depression, anemia and cardiovascular (CV) disease. Patients with RA have an increased risk of CV events, including myocardial infarction and stroke, relative to healthy individuals. It is understood that pro-inflammatory cytokines promote endothelial dysfunction and structural vessel abnormalities, and induce other CV risk factors, including changes in lipid levels, insulin resistance, and oxidative stress. In addition, significantly elevated levels of lipoprotein(a) (Lp[a]), a biomarker of CV risk which is involved in both inflammation and thrombosis, have been observed in patients with RA compared with healthy controls.

Sarilumab is a human monoclonal antibody that binds membrane-bound and soluble IL-6 receptor-α to inhibit IL-6 signaling. It is approved for the treatment of adults with moderate-to-severe active RA as monotherapy and in combination with conventional synthetic disease-modifying anti-rheumatic drugs (csDMARDs). There is a need to define patient populations that show better efficacy with sarilumab when treating RA so that they are administered the drug sooner.

SUMMARY

This disclosure provides, inter alia, methods for identifying subjects with a propensity to respond to treatment with an anti-interleukin 6 receptor (IL-6R) antibody, such as an antibody comprising a heavy chain variable region comprising the sequence SEQ ID NO:1 and a light chain variable region comprising the sequence SEQ ID NO:2 (e.g., sarilumab). In some embodiments, the methods identify the subject as having a higher propensity to respond to an IL-6R antibody (such as sarilumab) than a TNF-α inhibitor (such as adalimumab). The present disclosure further provides methods of treating RA in subjects who have levels of certain biomarkers that identify the subject as having a propensity to respond to administration of an IL-6R antibody In an aspect, provided herein is a method of treating rheumatoid arthritis in a subject with a serum concentration of C-reactive protein (CRP) of greater than 27.9 mg/L comprising selecting the subject and administering to the subject an anti-IL-6R antibody.

In some embodiments, the antibody comprises a heavy chain variable region comprising the sequence SEQ ID NO:1 and a light chain variable region comprising the sequence SEQ ID NO:2. In some embodiments, the antibody is sarilumab. In some embodiments, the antibody is administered subcutaneously.

In some embodiments, the subject has a serum concentration of CRP equal to or greater than 37.6 mg/L. In some embodiments, the subject has a serum concentration of CRP equal to or greater than 65.1 mg/L.

In some embodiments, a method of treating rheumatoid arthritis in a subject with a serum concentration of C-reactive protein (CRP) greater than 27.9 mg/L comprises selecting the subject and administering to the subject about 150 mg to about 200 mg of an antibody once every two weeks, wherein the antibody comprises a heavy chain variable region comprising the sequence SEQ ID NO:1 and a light chain variable region comprising the sequence SEQ ID NO:2 and the antibody is administered subcutaneously.

In some embodiments, the serum concentration of CRP is less than 65.1 mg/L in the subject. In some embodiments, the subject achieves ACR20 after 24 weeks of treatment with the antibody.

In some embodiments, the subject achieves a DAS28-CRP score of less than 3.2 after 24 weeks of treatment with the antibody. In some embodiments, the subject achieves an improvement in patient global VAS, HAQ-DI, Pain VAS, SF-36—PCS score or morning stiffness VAS after 24 weeks of treatment with the antibody.

This disclosure further provides a method of treating rheumatoid arthritis in a subject with a serum concentration of C-reactive protein (CRP) greater than 6.9 mg/L and less than 13.1 mg/L comprising selecting the subject and administering to the subject an anti-IL-6R antibody.

In some embodiments, the antibody comprises a heavy chain variable region comprising the sequence SEQ ID NO:1 and a light chain variable region comprising the sequence SEQ ID NO:2. In some embodiments, the antibody is sarilumab. In some embodiments, the antibody is administered subcutaneously.

In some embodiments, a method of treating rheumatoid arthritis in a subject with a serum concentration of C-reactive protein (CRP) greater than 6.9 mg/L and less than 13.1 mg/L comprises selecting the subject and administering to the subject about 150 mg to about 200 mg of an antibody once every two weeks, wherein the antibody comprises a heavy chain variable region comprising the sequence SEQ ID NO:1 and a light chain variable region comprising the sequence SEQ ID NO:2 and the antibody is administered subcutaneously.

In some embodiments, the subject achieves an improvement in patient global VAS, Pain VAS, SF-36—PCS score, SF-36—RE domain, morning stiffness VAS or RAID score after 24 weeks of treatment with the antibody.

This disclosure further provides a method of treating rheumatoid arthritis in a subject with a serum concentration of serum amyloid A (SAA) greater than 105.2 ng/mL comprising selecting the subject and administering to the subject an anti-IL-6R antibody.

In some embodiments, the subject has a serum concentration of SAA less than 256.0 ng/mL. In some embodiments, the antibody comprises a heavy chain variable region comprising the sequence SEQ ID NO:1 and a light chain variable region comprising the sequence SEQ ID NO:2. In some embodiments, the antibody is sarilumab. In some embodiments, the antibody is administered subcutaneously.

In some embodiments, the subject has a serum concentration of SAA equal to or greater than 174.9 ng/mL. In some embodiments, the subject has a serum concentration of SAA equal to or greater than 256.0 ng/mL.

In some embodiments, a method of treating rheumatoid arthritis in a subject with a serum concentration of serum amyloid A (SAA) greater than 105.2 ng/mL, comprising selecting the subject and administering to the subject about 150 mg to about 200 mg of an antibody once every two weeks, wherein the antibody comprises a heavy chain variable region comprising the sequence SEQ ID NO:1 and a light chain variable region comprising the sequence SEQ ID NO:2 and the antibody is administered subcutaneously. In some embodiments, the subject has a serum concentration of SAA less than 256.0 ng/mL.

In some embodiments, the subject achieves ACR20, ACR50 or ACR70 after 24 weeks of treatment with the antibody. In some embodiments, the subject achieves a DAS28-CRP score of less than 3.2 after 24 weeks of treatment with the antibody. In some embodiments, wherein the subject achieves an improvement in patient global VAS, HAQ-DI, Pain VAS, SF-36—PCS score, SF-36—PF domain, morning stiffness VAS or RAID score after 24 weeks of treatment with the antibody.

This disclosure further provides a method of treating rheumatoid arthritis in a subject with a serum concentration of SAA greater than 11.83 ng/mL and less than 30.08 ng/mL comprising selecting the subject and administering to the subject an anti-IL-6R antibody.

In some embodiments, the antibody comprises a heavy chain variable region comprising the sequence SEQ ID NO:1 and a light chain variable region comprising the sequence SEQ ID NO:2. In some embodiments, the antibody is sarilumab. In some embodiments, the antibody is administered subcutaneously.

In some embodiments, a method of treating rheumatoid arthritis in a subject with a serum concentration of serum amyloid A (SAA) greater than 11.83 ng/mL and less than 30.08 ng/mL, comprises selecting the subject and administering to the subject about 150 mg to about 200 mg of an antibody once every two weeks, wherein the antibody comprises a heavy chain variable region comprising the sequence SEQ ID NO:1 and a light chain variable region comprising the sequence SEQ ID NO:2 and the antibody is administered subcutaneously.

In some embodiments, the subject achieves an improvement in HAQ-DI after 24 weeks of treatment with the antibody.

This disclosure further provides a method of treating rheumatoid arthritis in a subject with a serum concentration of matrix metalloproteinase-3 (MMP-3) greater than 77.0 ng/mL comprising selecting the subject and administering to the subject an anti-IL-6R antibody.

In some embodiments, the antibody comprises a heavy chain variable region comprising the sequence SEQ ID NO:1 and a light chain variable region comprising the sequence SEQ ID NO:2. In some embodiments, the antibody is sarilumab. In some embodiments, the antibody is administered subcutaneously.

In some embodiments, the subject has a serum concentration of MMP-3 equal to or greater than 99.9 ng/mL. In some embodiments, the subject has a serum concentration of MMP-3 equal to or greater than 154.3 ng/mL.

In some embodiments, a method of treating rheumatoid arthritis in a subject with a serum concentration of matrix metalloproteinase-3 (MMP-3) greater than 77.0 ng/mL, comprises selecting the subject and administering to the subject about 150 mg to about 200 mg of an antibody once every two weeks, wherein the antibody comprises a heavy chain variable region comprising the sequence SEQ ID NO:1 and a light chain variable region comprising the sequence SEQ ID NO:2 and the antibody is administered subcutaneously.

In some embodiments, the serum concentration of MMP-3 is less than 154.3 ng/mL in the subject. In some embodiments, the subject achieves ACR20 after 24 weeks of treatment with the antibody. In some embodiments, the subject achieves a DAS28-CRP score of less than 3.2 after 24 weeks of treatment with the antibody. In some embodiments, the subject achieves an improvement in patient global VAS, HAQ-DI, Pain VAS, SF-36—PCS score, SF-36—PF domain, morning stiffness VAS or RAID score after 24 weeks of treatment with the antibody.

This disclosure further provides a method of treating rheumatoid arthritis in a subject with a serum concentration of MMP-3 greater than 35.5 ng/mL and less than 54.1 ng/mL comprising selecting the subject and administering to the subject an anti-IL-6R antibody.

In some embodiments, the antibody comprises a heavy chain variable region comprising the sequence SEQ ID NO:1 and a light chain variable region comprising the sequence SEQ ID NO:2. In some embodiments, the antibody is sarilumab. In some embodiments, the antibody is administered subcutaneously.

In some embodiments, a method of treating rheumatoid arthritis in a subject with a serum concentration of matrix metalloproteinase-3 (MMP-3) greater than 35.5 ng/mL and less than 54.1 ng/mL, comprises selecting the subject and administering to the subject about 150 mg to about 200 mg of an antibody once every two weeks, wherein the antibody comprises a heavy chain variable region comprising the sequence SEQ ID NO:1 and a light chain variable region comprising the sequence SEQ ID NO:2 and the antibody is administered subcutaneously.

In some embodiments, the subject achieves an improvement in pain VAS after 24 weeks of treatment with the antibody.

This disclosure further provides a method of treating rheumatoid arthritis in a subject with a serum concentration of chemokine (C-X-C motif) ligand 13 (CXCL13) greater than 180.8 pg/mL comprising selecting the subject and administering to the subject an anti-IL-6R antibody.

In some embodiments, the antibody comprises a heavy chain variable region comprising the sequence SEQ ID NO:1 and a light chain variable region comprising the sequence SEQ ID NO:2. In some embodiments, the antibody is sarilumab. In some embodiments, the antibody is administered subcutaneously.

In some embodiments, the subject has a serum concentration of CXCL13 equal to or greater than 236.8 pg/mL. In some embodiments, the subject has a serum concentration of CXCL13 equal to or greater than 323.9 pg/mL.

In some embodiments, a method of treating rheumatoid arthritis in a subject with a serum concentration of chemokine (C-X-C motif) ligand 13 (CXCL13) greater than 180.8 pg/mL, comprises selecting the subject and administering to the subject about 150 mg to about 200 mg of an antibody once every two weeks, wherein the antibody comprises a heavy chain variable region comprising the sequence SEQ ID NO:1 and a light chain variable region comprising the sequence SEQ ID NO:2 and the antibody is administered subcutaneously.

In some embodiments, the serum concentration of CXCL3 is less than 323.9 pg/mL in the subject. In some embodiments, the subject achieves ACR20 after 24 weeks of treatment with the antibody. In some embodiments, the subject achieves an improvement in HAQ-DI, SF-36—PCS score or SF-36—PF domain after 24 weeks of treatment with the antibody.

This disclosure further provides a method of treating rheumatoid arthritis in a subject with a serum concentration of CXCL13 greater than 98.2 pg/mL and less than 130.6 pg/ml comprising selecting the subject and administering to the subject an anti-IL-6R antibody.

In some embodiments, the antibody comprises a heavy chain variable region comprising the sequence SEQ ID NO:1 and a light chain variable region comprising the sequence SEQ ID NO:2. In some embodiments, the antibody is sarilumab. In some embodiments, the antibody is administered subcutaneously.

In some embodiments, a method of treating rheumatoid arthritis in a subject with a serum concentration of chemokine (C-X-C motif) ligand 13 (CXCL13) greater than 98.2 pg/mL and less than 130.6 pg/ml comprises selecting the subject and administering to the subject about 150 mg to about 200 mg of an antibody once every two weeks, wherein the antibody comprises a heavy chain variable region comprising the sequence SEQ ID NO:1 and a light chain variable region comprising the sequence SEQ ID NO:2 and the antibody is administered subcutaneously.

In some embodiments, the subject achieves an improvement in HAQ-DI after 24 weeks of treatment with the antibody.

This disclosure further provides a method of treating rheumatoid arthritis in a subject with a serum concentration of hepcidin greater than 43.9 ng/mL comprising selecting the subject and administering to the subject an anti-IL-6R antibody.

In some embodiments, the antibody comprises a heavy chain variable region comprising the sequence SEQ ID NO:1 and a light chain variable region comprising the sequence SEQ ID NO:2. In some embodiments, the antibody is sarilumab. In some embodiments, the antibody is administered subcutaneously.

In some embodiments, the subject has a serum concentration of hepcidin equal to or greater than 62.4 ng/mL. In some embodiments, the subject has a serum concentration of hepcidin equal to or greater than 77 ng/mL.

In some embodiments, a method of treating rheumatoid arthritis in a subject with a serum concentration of hepcidin greater than 62.4 ng/mL, comprises selecting the subject and administering to the subject about 150 mg to about 200 mg of an antibody once every two weeks, wherein the antibody comprises a heavy chain variable region comprising the sequence SEQ ID NO:1 and a light chain variable region comprising the sequence SEQ ID NO:2 and the antibody is administered subcutaneously.

In some embodiments, the serum concentration of hepcidin is less than 77 ng/mL in the subject. In some embodiments, the subject achieves ACR20 after 24 weeks of treatment with the antibody.

This disclosure further provides a method of treating rheumatoid arthritis in a subject with a serum concentration of hepcidin greater than 17 ng/mL and less than 28.9 ng/ml comprising selecting the subject and administering to the subject an anti-IL-6R antibody.

In some embodiments, the antibody comprises a heavy chain variable region comprising the sequence SEQ ID NO:1 and a light chain variable region comprising the sequence SEQ ID NO:2. In some embodiments, the antibody is sarilumab. In some embodiments, the antibody is administered subcutaneously.

In some embodiments, a method of treating rheumatoid arthritis in a subject with a serum concentration of hepcidin greater than 17 ng/mL and less than 28.9 ng/ml comprises selecting the subject and administering to the subject about 150 mg to about 200 mg of an antibody once every two weeks, wherein the antibody comprises a heavy chain variable region comprising the sequence SEQ ID NO:1 and a light chain variable region comprising the sequence SEQ ID NO:2 and the antibody is administered subcutaneously.

In some embodiments, the subject achieves an improvement in HAQ-DI after 24 weeks of treatment with the antibody.

This disclosure further provides a method of treating rheumatoid arthritis in a subject with a serum concentration of CXCL13 less than 72.0 pg/mL and a serum concentration of soluble intracellular adhesion molecule-1 (sICAM-1) of less than 212.1 ng/mL comprising selecting the subject and administering to the subject an anti-IL-6R antibody.

In some embodiments, the antibody comprises a heavy chain variable region comprising the sequence SEQ ID NO:1 and a light chain variable region comprising the sequence SEQ ID NO:2. In some embodiments, the antibody is sarilumab. In some embodiments, the antibody is administered subcutaneously.

In some embodiments, a method of treating rheumatoid arthritis in a subject with a serum concentration of chemokine CXCL13 less than 72.0 pg/mL and a serum concentration of soluble intracellular adhesion molecule-1 (sICAM-1) of less than 212.1 ng/mL comprises selecting the subject and administering to the subject about 150 mg to about 200 mg of an antibody once every two weeks, wherein the antibody comprises a heavy chain variable region comprising the sequence SEQ ID NO:1 and a light chain variable region comprising the sequence SEQ ID NO:2 and the antibody is administered subcutaneously.

In some embodiments, the serum concentration of CXCL3 is greater than 52.4 pg/mL in the subject. In some embodiments, serum concentration of sICAM1 is greater than 179.7 ng/mL in the subject. In some embodiments, the subject achieves ACR50 after 24 weeks of treatment with the antibody.

This disclosure further provides a method of treating rheumatoid arthritis in a subject with a serum concentration of CXCL13 greater than 180.8 pg/mL and a serum concentration of sICAM-1 of greater than 313.7 ng/mL comprising selecting the subject and administering to the subject an anti-IL-6R antibody.

In some embodiments, the antibody comprises a heavy chain variable region comprising the sequence SEQ ID NO:1 and a light chain variable region comprising the sequence SEQ ID NO:2. In some embodiments, the antibody is sarilumab. In some embodiments, the antibody is administered subcutaneously.

In some embodiments, a method of treating rheumatoid arthritis in a subject with a serum concentration of chemokine CXCL13 greater than 180.8 pg/mL and a serum concentration of sICAM-1 of greater than 313.7 ng/mL comprises selecting the subject and administering to the subject about 150 mg to about 200 mg of an antibody once every two weeks, wherein the antibody comprises a heavy chain variable region comprising the sequence SEQ ID NO:1 and a light chain variable region comprising the sequence SEQ ID NO:2 and the antibody is administered subcutaneously.

In some embodiments, the serum concentration of CXCL3 is less than 323.9 pg/mL in the subject. In some embodiments, the serum concentration of sICAM-1 is less than 380.0 ng/mL in the subject. In some embodiments, the subject achieves ACR50 after 24 weeks of treatment with the antibody. In some embodiments of any of the methods provided above, the subject has moderate to severe rheumatoid arthritis. In some embodiments, the antibody is administered with a prefilled syringe or with an autoinjector.

In some embodiments, the antibody is administered as an aqueous buffered solution at about pH 6.0 containing about 21 mM histidine, about 45 mM arginine, about 0.2% (w/v) polysorbate 20, and about 5% (w/v) sucrose. In some embodiments, the solution comprises at least about 130 mg/mL of the antibody. In some embodiments, the solution comprises about 131.6 mg/mL of the antibody. In some embodiments, the solution comprises about 175 mg/mL of the antibody. In some embodiments, the antibody is sarilumab. In some embodiments, the subject is intolerant of one or more DMARDs. In some embodiments, the DMARD is methotrexate. In some embodiments, the method further comprises administering to the subject an effective amount of methotrexate. In some embodiments, methotrexate is administered between 6 to 25 mg per week. In some embodiments, the subject has moderate to severe rheumatoid arthritis and has had an inadequate response to one or more DMARDs. In some embodiments, the DMARD is methotrexate. In some embodiments, the antibody is administered subcutaneously at 150 mg once every two weeks to the subject. In some embodiments, the antibody is administered subcutaneously at 200 mg once every two weeks to the subject.

This disclosure further provides a method of determining if a subject with rheumatoid arthritis has an increased propensity for effective treatment of rheumatoid arthritis with an antibody comprising measuring a concentration of CRP in a serum sample from the subject wherein if the serum sample has a concentration of CRP greater than 27.9 mg/L, 37.6 mg/L, or 65.1 mg/L, the subject has an increased propensity for effective treatment of RA with the antibody, and wherein the antibody comprises a heavy chain variable region comprising the sequence SEQ ID NO:1 and a light chain variable region comprising the sequence SEQ ID NO:2. In some embodiments, the subject has an increased propensity for effective treatment of rheumatoid arthritis with an anti-IL-6R antibody (such as sarilumab) compared to a TNF-α inhibitor (such as adalimumab).

In some embodiments, the serum sample from the subject has a concentration of CRP less than 65.1 mg/L in the subject. In some embodiments, the subject has an increased propensity of achieving ACR20 after 24 weeks of treatment with the antibody. In some embodiments, the subject has an increased propensity of achieving a DAS28-CRP score of less than 3.2 after 24 weeks of treatment with the antibody. In some embodiments, the subject has an increased propensity of achieving an improvement in patient global VAS, Pain VAS, SF-36—PCS score, SF-36—RE domain, morning stiffness VAS or RAID score after 24 weeks of treatment with the antibody.

This disclosure further provides a method of determining if a subject with rheumatoid arthritis has an increased propensity for effective treatment of rheumatoid arthritis with an antibody comprising measuring a concentration of CRP in a serum sample from the subject wherein if the serum sample has a concentration of CRP greater than 6.9 mg/L and less than 13.1 mg/L, the subject has an increased propensity for effective treatment of RA with the antibody, and wherein the antibody comprises a heavy chain variable region comprising the sequence SEQ ID NO:1 and a light chain variable region comprising the sequence SEQ ID NO:2. In some embodiments, the subject has an increased propensity for effective treatment of rheumatoid arthritis with an anti-IL-6R antibody (such as sarilumab) compared to a TNF-α inhibitor (such as adalimumab).

In some embodiments, the subject has an increased propensity of achieving an improvement in patient global VAS, Pain VAS, SF-36—PCS score, SF-36—RE domain, morning stiffness VAS or RAID score after 24 weeks of treatment with the antibody.

This disclosure further provides a method of determining if a subject with rheumatoid arthritis has an increased propensity for effective treatment of rheumatoid arthritis with an antibody comprising measuring a concentration of SAA in a serum sample from the subject wherein if the serum sample has a concentration of SAA greater than 105.2 ng/mL, 174.9 ng/mL, or 256 ng/mL and less than 256.0 ng/mL, the subject has an increased propensity for effective treatment of RA with the antibody, and wherein the antibody comprises a heavy chain variable region comprising the sequence SEQ ID NO:1 and a light chain variable region comprising the sequence SEQ ID NO:2. In some embodiments, the subject has an increased propensity for effective treatment of rheumatoid arthritis with an anti-IL-6R antibody (such as sarilumab) compared to a TNF-α inhibitor (such as adalimumab).

In some embodiments, the subject has an increased propensity of achieving ACR20, ACR50 or ACR70 after 24 weeks of treatment with the antibody. In some embodiments, wherein the subject has an increased propensity of achieving a DAS28-CRP score of less than 3.2 after 24 weeks of treatment with the antibody. In some embodiments, wherein the subject has an increased propensity of achieving an improvement in patient global VAS, HAQ-DI, Pain VAS, SF-36—PCS score, SF-36—PF domain, morning stiffness VAS or RAID score after 24 weeks of treatment with the antibody.

This disclosure further provides a method of determining if a subject with rheumatoid arthritis has an increased propensity for effective treatment of rheumatoid arthritis with an antibody comprising measuring a concentration of SAA in a serum sample from the subject wherein if the serum sample has a concentration of SAA greater than 11.83 ng/mL and less than 30.08 ng/mL, the subject has an increased propensity for effective treatment of RA with the antibody, and wherein the antibody comprises a heavy chain variable region comprising the sequence SEQ ID NO:1 and a light chain variable region comprising the sequence SEQ ID NO:2. In some embodiments, the subject has an increased propensity for effective treatment of rheumatoid arthritis with an anti-IL-6R antibody (such as sarilumab) compared to a TNF-α inhibitor (such as adalimumab).

In some embodiments, the subject has an increased propensity of achieving an improvement in HAQ-DI after 24 weeks of treatment with the antibody.

This disclosure further provides a method of determining if a subject with rheumatoid arthritis has an increased propensity for effective treatment of rheumatoid arthritis with an antibody comprising measuring a concentration of MMP-3 in a serum sample from the subject wherein if the serum sample has a concentration of MMP-3 greater than 77.0 ng/mL, 99.9 ng/mL, or 154.3 ng/mL, the subject has an increased propensity for effective treatment of RA with the antibody, and wherein the antibody comprises a heavy chain variable region comprising the sequence SEQ ID NO:1 and a light chain variable region comprising the sequence SEQ ID NO:2. In some embodiments, the subject has an increased propensity for effective treatment of rheumatoid arthritis with an anti-IL-6R antibody (such as sarilumab) compared to a TNF-α inhibitor (such as adalimumab).

In some embodiments, the serum sample from the subject has a concentration of MMP-3 is less than 154.3 ng/mL in the subject. In some embodiments, the subject has an increased propensity of achieving ACR20 after 24 weeks of treatment with the antibody. In some embodiments, the subject has an increased propensity of achieving a DAS28-CRP score of less than 3.2 after 24 weeks of treatment with the antibody. In some embodiments, the subject has an increased propensity of achieving an improvement in patient global VAS, HAQ-DI, Pain VAS, SF-36—PCS score, SF-36—PF domain, morning stiffness VAS or RAID score after 24 weeks of treatment with the antibody.

This disclosure further provides a method of determining if a subject with rheumatoid arthritis has an increased propensity for effective treatment of rheumatoid arthritis with an antibody comprising measuring a concentration of MMP-3 in a serum sample from the subject wherein if the serum sample has a concentration of MMP-3 greater than 35.5 ng/mL and less than 54.1 ng/mL, the subject has an increased propensity for effective treatment of RA with the antibody, and wherein the antibody comprises a heavy chain variable region comprising the sequence SEQ ID NO:1 and a light chain variable region comprising the sequence SEQ ID NO:2. In some embodiments, the subject has an increased propensity for effective treatment of rheumatoid arthritis with an anti-IL-6R antibody (such as sarilumab) compared to a TNF-α inhibitor (such as adalimumab).

In some embodiments, the subject has an increased propensity of achieving an improvement in pain VAS after 24 weeks of treatment with the antibody.

This disclosure further provides a method of determining if a subject with rheumatoid arthritis has an increased propensity for effective treatment of rheumatoid arthritis with an antibody comprising measuring a concentration of CXCL13 in a serum sample from the subject wherein if the serum sample has a concentration of CXCL13 greater than 98.2 pg/mL, 116.4 pg/mL, 130.6 pg/mL, 180.8 pg/mL, 236.8 pg/mL, or 323.9 pg/mL, the subject has an increased propensity for effective treatment of RA with the antibody, and wherein the antibody comprises a heavy chain variable region comprising the sequence SEQ ID NO:1 and a light chain variable region comprising the sequence SEQ ID NO:2. In some embodiments, the subject has an increased propensity for effective treatment of rheumatoid arthritis with an anti-IL-6R antibody (such as sarilumab) compared to a TNF-α inhibitor (such as adalimumab).

In some embodiments, the serum sample from the subject has a concentration of CXCL3 is less than 323.9 pg/mL in the subject. In some embodiments, the subject has an increased propensity of achieving ACR20 after 24 weeks of treatment with the antibody. In some embodiments, the subject has an increased propensity of achieving an improvement in HAQ-DI, SF-36—PCS score or SF-36—PF domain after 24 weeks of treatment with the antibody.

This disclosure further provides a method of determining if a subject with rheumatoid arthritis has an increased propensity for effective treatment of rheumatoid arthritis with an antibody comprising measuring a concentration of hepcidin in a serum sample from the subject wherein if the serum sample has a concentration of hepcidin greater than 17 ng/mL, 23 ng/mL, 28.9 ng/mL, 43.9 ng/mL, 62.4 ng/mL, or 77 ng/mL, the subject has an increased propensity for effective treatment of RA with the antibody, and wherein the antibody comprises a heavy chain variable region comprising the sequence SEQ ID NO:1 and a light chain variable region comprising the sequence SEQ ID NO:2. In some embodiments, the subject has an increased propensity for effective treatment of rheumatoid arthritis with an anti-IL-6R antibody (such as sarilumab) compared to a TNF-α inhibitor (such as adalimumab).

In some embodiments, the subject has an increased propensity of achieving ACR20 after 24 weeks of treatment with the antibody. This disclosure further provides a method of determining if a subject with rheumatoid arthritis has an increased propensity for effective treatment of rheumatoid arthritis with an antibody comprising measuring a concentration of CXCL13 in a serum sample from the subject wherein if the serum sample has a concentration of CXCL13 less than 72.0 pg/mL and a concentration of sICAM-1 of less than 212.1 ng/mL, the subject has an increased propensity for effective treatment of RA with the antibody, and wherein the antibody comprises a heavy chain variable region comprising the sequence SEQ ID NO:1 and a light chain variable region comprising the sequence SEQ ID NO:2. In some embodiments, the subject has an increased propensity for effective treatment of rheumatoid arthritis with an anti-IL-6R antibody (such as sarilumab) compared to a TNF-α inhibitor (such as adalimumab).

In some embodiments, the serum sample from the subject has a concentration of CXCL3 is greater than 52.4 pg/mL in the subject. In some embodiments, the serum sample from the subject has a concentration of sICAM1 is greater than 179.7 ng/mL in the subject. In some embodiments, the subject has an increased propensity of achieving ACR50 after 24 weeks of treatment with the antibody.

This disclosure further provides a method of determining if a subject with rheumatoid arthritis has an increased propensity for effective treatment of rheumatoid arthritis with an antibody comprising measuring a concentration of CXCL13 in a serum sample from the subject wherein if the serum sample has a concentration of CXCL13 greater than 180.8 pg/mL and a concentration of sICAM-1 of greater than 313.7 ng/mL, the subject has an increased propensity for effective treatment of RA with the antibody, and wherein the antibody comprises a heavy chain variable region comprising the sequence SEQ ID NO:1 and a light chain variable region comprising the sequence SEQ ID NO:2. In some embodiments, the subject has an increased propensity for effective treatment of rheumatoid arthritis with an anti-IL-6R antibody (such as sarilumab) compared to a TNF-α inhibitor (such as adalimumab).

In some embodiments, the serum sample from the subject has a concentration of CXCL3 is less than 323.9 pg/mL in the subject. In some embodiments, the serum sample from the subject has a concentration of sICAM-1 is less than 380.0 ng/mL in the subject. In some embodiments, the subject has an increased propensity of achieving ACR50 after 24 weeks of treatment with the antibody. In some embodiments of the methods of determining if a subject with rheumatoid arthritis has an increased propensity for effective treatment described above, the subject has moderate to severe rheumatoid arthritis. In some embodiments, the antibody is sarilumab. In some embodiments, the subject intolerant of one or more DMARDs. In some embodiments, the DMARD is methotrexate. In some embodiments, the subject has moderate to severe rheumatoid arthritis and has had an inadequate response to one or more DMARDs. In some embodiments, the DMARD is methotrexate.

In some embodiments, a serum sample is from the peripheral blood of a subject.

In some embodiments, the subject has at least 5, 6, 7, 8, 9, or 10 tender joints. In some embodiments, the subject has at least 10, 15, 20, 25, or 30 tender joints. In some embodiments, the subject has 5-10, 10-15, 15-20, or 10-20 tender joints. In some embodiments, the subject has at least 5, 6, 7, 8, 9, or 10 swollen joints. In some embodiments, the subject has at least 10, 15, 20, 25, or 30 swollen joints. In some embodiments, the subject has 5-10, 10-15, 15-20, or 10-20 swollen joints. In some embodiments, the subject has joint erosion in at least 1, 2, 3, 4, 5, 6, 7, 8, 9, or 10 joints. In some embodiments, the subject has joint erosion in 1-5, 5-10, 1-10, 10-15, or 1-15 joints. In some embodiments, the subject has a Disease Activity Score using 28 Joints (DAS28) of 5, 6, 7, 8, 9, or 10. In some embodiments, the subject has a DAS28 score of at least 5. In some embodiments, the subject has a DAS28 score of at least 6. In some embodiments, the subject has a DAS28 score of at least 7. In some embodiments, the subject has a DAS28 score of at least 8. In some embodiments, the subject has a DAS28 score of at least 9. In some embodiments, the subject has a DAS28 score of at least 10. In some embodiments, the subject has a DAS28 score of 5-10.

BRIEF DESCRIPTION OF THE DRAWINGS

In FIG. 6A, *Adjusted P<0.05; adjusted P<0.01 vs adalimumab; *adjusted P<0.0001 vs adalimumab (Benjamini-Hochberg procedure). In FIG. 6B, proportions of patients with biomarker serum concentrations exceeding the reference range at baseline that normalized to within reference range at week 24. ***Unadjusted P<0.0001 vs adalimumab ($\chi^2$ test). CRP: C-reactive protein; Lp(a): lipoprotein (a); OC: osteocalcin; OPG: osteoprotegerin; P1NP: procollagen type 1 N-terminal propeptide; q2w: every 2 weeks; RANKL: receptor activator of nuclear factor-κB ligand; SAA: serum amyloid A.

In FIG. 7A, odds ratios (sarilumab vs adalimumab) for achieving ACR20, ACR50 and DAS28-CRP<3.2 responses at week 24 by baseline biomarker tertiles. *Nominal biomarker-by-treatment interaction vs low tertile. Low, medium and high subgroups are based on biomarker tertile values in overall treatment groups (see Table 1 for tertile ranges). ACR20/50: American College of Rheumatology 20/50% improvement criteria; CI: confidence interval; DAS28-CRP: Disease Activity Score (28 joints) using C-reactive protein; MMP-3: matrix metalloproteinase-3; NS: not significant at 5%; SAA: serum amyloid A. In FIG. 7B, LS mean differences in changes from baseline between sarilumab and adalimumab at week 24 by baseline biomarker tertiles in HAQ-DI (Top) and Pain VAS (Bottom). *Nominal biomarker-by-treatment interaction vs low tertile. Low, medium and high subgroups are based on biomarker tertile values in overall treatment groups (see Table 1 for tertile ranges). CI: confidence interval; CXCL13: chemokine (C-X-C motif) ligand 13; HAQ-DI: Health Assessment Questionnaire-Disability Index; LS: least squares; MMP-3: matrix metalloproteinase-3; NS: not significant at 5%; P1NP: procollagen type 1 N-terminal propeptide; SAA: serum amyloid A; VAS: visual analogue scale.

Figure 1A:
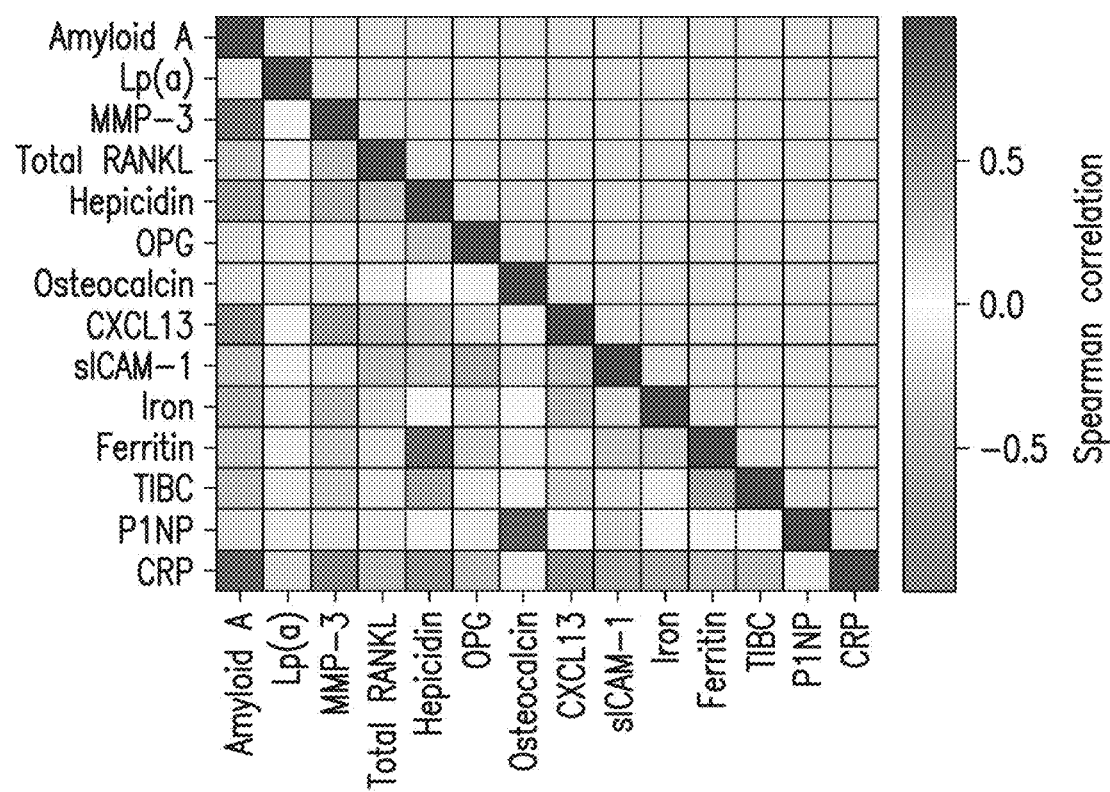
FIGS. 1A-1B depict the correlation between baseline biomarkers and haematology parameters. CRP: C-reactive protein; CXCL13: chemokine (C-X-C motif) ligand 13; Lp(a): lipoprotein (a); MMP-3: matrix metalloproteinase-3; OPG: osteoprotegerin; P1NP: procollagen type 1 N-terminal propeptide; RANKL: receptor activator of nuclear factor-κB ligand; SAA: serum amyloid A; sICAM-1: soluble intercellular adhesion molecule 1; TIBC: total iron-binding capacity.

chemokine (C-X-C motif) ligand 13; OR: odds ratio; q2w: every 2 weeks; sICAM-1: soluble intercellular adhesion molecule-1.

DETAILED DESCRIPTION

This disclosure provides evidence that several biomarkers, including MMP-3, SAA, hepcidin, CXCL13, sICAM-1, and CRP, were associated with clinical efficacy and individually predicted response to sarilumab treatment. For example, patients with the highest baseline concentrations of SAA who received sarilumab were more likely to achieve ACR20/50/70 or DAS28-CRP<3.2 responses than with adalimumab compared with patients in the low tertile: ACR20 (OR [95% CI] 5.5 [2.1, 14.5]); ACR50 (5.4 [2.2, 13.2]); ACR70 (5.7 [1.8, 18.4]); DAS28-CRP<3.2 (6.1 [2.3, 15.7]). SAA was consistently predictive compared with high MMP-3 and CRP, which were only predictive of ACR20 and DAS28-CRP<3.2 response (Table 5). Baseline levels of biomarkers associated with bone remodeling, synovial lymphoid and myeloid cell infiltrates and anemia of inflammation were not predictive of efficacy at week 24, except for hepcidin and CXCL13, which were associated with ACR20 response.

Analysis of the pharmacodynamic effects of treatment on circulating biomarkers found sarilumab treatment reduced biomarkers of the acute-phase response, bone resorption, synovial inflammation and CV risk compared with adalimumab. These effects were generally observed early and persisted through to week 24. This was particularly evident with CRP and is consistent with previous observations. In addition, a greater proportion of patients treated with sarilumab vs adalimumab monotherapy demonstrated normalization of serum biomarkers at week 24, which was greatest for biomarkers of the acute-phase response (CRP and SAA).

As provided herein, both SAA and CRP were strongly correlated with DAS28-CRP at baseline (nominal P<0.0001). However, no correlations were observed between baseline biomarkers and PROs. Reductions in several biomarkers were associated with clinical efficacy at week 24 in adalimumab-treated patients; however, these associations were not observed in the sarilumab group. This result suggests that IL-6 receptor blockade may have a direct effect on production of these biomarkers independent of its effects on disease activity, in contrast to TNF inhibitors.

High levels of CRP, SAA, MMP-3, CXCL13 and sICAM-1 predicted ACR20 responses to sarilumab. These markers were associated with changes in several patients reported outcomes (PROs). High baseline levels of SAA and MMP-3 were also associated with improvements in several PROs, including patient global VAS, HAQ-DI, pain VAS, SF-36 PCS and MCS scores, morning stiffness VAS and RAID score.

C-Reactive Protein (CRP) (GenBank Reference: NP_001315986.1)

The protein encoded by this gene belongs to the pentaxin family. It is involved in several host defense related functions based on its ability to recognize foreign pathogens and damaged cells of the host and to initiate their elimination by interacting with humoral and cellular effector systems in the blood. Consequently, the level of this protein in plasma increases greatly during acute phase response to tissue injury, infection, or other inflammatory stimuli.

In certain embodiments, the serum concentration of CRP tends to range from 1.0-3.4 mg/l in low tertile patients, 6.9-13.1 mg/l in medium tertile patients and 27.9-65.1 mg/l in high tertile patients. In certain embodiments, patients whose serum CRP concentrations are in the high tertile can achieve ACR20, DAS28-CRP score of less than 3.2 or improvement in patient global VAS, HAQ-DI, Pain VAS, SF-36—PCS score or morning stiffness VAS after 24 weeks of treatment with an IL-6 receptor antibody. In certain embodiments, patients whose serum CRP are in the medium tertile can achieve an improvement in patient global VAS, HAQ-DI, Pain VAS, SF-36—PCS score, SF-36—PF domain, morning stiffness VAS or RAID score after 24 weeks of treatment with an IL-6 receptor antibody.

In certain embodiments, the nucleic acid and amino acid sequences of CRP are provided below.

```
CRP transcript variant 2 cDNA sequence
(GenBank reference: NP_001315986.1):
                                      (SEQ ID NO: 11)
ATGGAGAAGCTGTTGTGTTTCTTGGTCTTGACCAGCCTCTCTCATGCTTTT

GGCCAGACAGACATGTCGAGGAAGGCTTTTGTGTTTCCCAAAGAGTCGGAT

ACTTCCTATGTATCCCTCAAAGCACCGTTAACGAAGCCTCTCAAAGCCTTC

ACTGTGTGCCTCCACTTCTACACGGAACTGTCCTCGACCCGTGGGTACAGT

ATTTTCTCGTATGCCACCAAGAGACAAGACAATGAGATTCTCATATTTTGG

TCTAAGGATATAGGATACAGTTTTACAGTGGGTGGGTCTGAAATATTATTC

GAGGTTCCTGAAGTCACAGTAGCTCCAGTACACATTTGTACAAGCTGGGAG

TCCGCCTCAGGGATCGTGGAGTTCTGGGTAGATGGGAAGCCCAGGGTGAGG

AAGAGTCTGAAGAAGGGATACACTGTGGGGGCAGAAGCAAGCATCATCTTG

GGGCAGGAGCAGGATTCCTTCGGTGGGAACTTTGAAGGAAGCCAGTCCCTG

GTGGGAGACATTGGAAATGTGAACATGTGGGACTTTGTGCTGTCACCAGAT

GAGATTAACACCATCTATCTTGGCGGGCCCTTCAGTCCTAATGTCCTGAAC

TGGCGGGCACTGAAGTATGAAGTGCAAGGCGAAGTGTTCACCAAACCCCAG

CTGTGGCCCTGA
Note: CRP transcript variant 2 retains an intron in
the 3' UTR compared to variant 1. Both variants 1
and 2 encode the same isoform.

CRP peptide sequence:
                                      (SEQ ID NO: 12)
MEKLLCFLVLTSLSHAFGQTDMSRKAFVFPKESDTSYVSLKAPLTKPLKAF

TVCLHFYTELSSTRGYSIFSYATKRQDNEILIFWSKDIGYSFTVGGSEILF

EVPEVTVAPVHICTSWESASGIVEFWVDGKPRVRKSLKKGYTVGAEASIIL

GQEQDSFGGNFEGSQSLVGDIGNVNMWDFVLSPDEINTIYLGGPFSPNVLN

WRALKYEVQGEVFTKPQLWP

CRP genomic DNA sequence (GenBank reference:
NG013007.1):
                                      (SEQ ID NO: 13)
GACTGGATTCAGAGACTCAAACAATGTTATTGAGGCATGGTCTATCTCTCA

GCTCTACTCGTGAGTCAAGGATGGTGTATTAGTTGGTTTTCACACTGCTGT

AAAGAACTACCTGAGTATGGGTAATTTATAAACAAAAGAAATTTTAAATGA

ACTTACAGTTCCACATGTTTGGGGAGGACTCATGAAACTTACAATCATGGT

GGAAGGTGAAGGGGAAGCAGGCATTTTCTTCACAAGGCAGCAGGAGAGAGA

CAGTGTGAGTGGGGACTGCCAAGCACTTTTATTTAAATCATCAGACCTAG

TGAGAACTCATTATCATGAGCACAGCATGGGCAAAACTACCTCCACGATCC

AATCTTCTCCCACCATGTCCCTCCCTCAACTCATGGGGATTACAATTTGAG
```

```
-continued
ATGACATTTGGGTGGGAACACAGAACCAAACCATATCATTCCACCTCTGGC

TCCTCCAAAATATCATGTTCTTTTCACATTTCAAAACCAATCATACCTTCC

CAACAGTCACCCAAACTTAACTCATTTCAGCATTAACTCAAAAGTCCAAGT

CTAAAGTTCCATCTGAGAAAAGGCAAGTCACTTCTGCCTATTAGCCTAGTA

AAATAAAAAACAAGTTAGTTACTTCCAAGATACAGTGGGGGTATAGGCATT

GGGTAAATGGTCCTGTTTGAAATGGGAGAAATTGGCCAAAACAAAGGGGCC

ACAGGCCCCATGTAAATCCAAAATCTGGCAGGACACTCATGAAATCTTAAA

GCTCCAAAATAATCTCCTTTGATTCTTTGTCTCACATCCAGGGCATGCTGA

TGCAAGCGGTAGGCTTCCATGGCCTTGGGTAGCTCCATACTTGTGGCTCTT

CAGGGTACAGCCCCTGTGGCTGCTTTCACAGGCTGGCATTGAACACTTGCA

AGCTTTTCTAAGCACAAGGTGCAAACTGTCAGTGGTTCTACCATTCTGGGA

TCTGGAGGACAGTGGCCCTCTTCTCACAGATCCACTAGGCAGTGCCCCAGT

GGGGACTCTGTGTGGAGACTCCAACCCCACATTTCCCTGCTGCATTGCCCT

AGTAGAGGTTTTCTGTGAGGGCTCCATGCCTGCAGAAGACTTCTGCCTGAA

CATCCAGGTGTTTCCATACATCTTCTGAAATCTAGACAGAAACTCCCAAAG

CTCAACTCTTGTCTTCTGTGCATCTGCACCCTCAACACTACTTGGAAGCCA

CCAAGGCTTGGGGCTTGTGCCCTCTGAAGCAATGGCCTGAGCTATATACAT

TGCCCCCTTTTAGCCATGGCTGGAGCCGCAGCAGCTGGCACACAGGGTGCC

ATGTTCCTGGGCTGCACAGAGCAGCGGGGCCCTGGGCCTGGCCCATGATAC

CATTTTTTCCTCCTAGGCTTTTGGACCTCTGATGGGAGGGGCTGCCATGAA

GATCTTCTGAAATGACCTGAAGACATTTTCCTCATTGTTTTGGCTATCAAC

ATTCATCTCCTCATTACTTATGCAAATTTCTGCAGCCAGCTTGAATTTTTC

CCCAGAAAATGGGTTTTTCTTTTCTACCACATGGTCAGGCTGCACATTTTC

CAAACTTTTATGCTCCCTTTCCCTTTTAAACATAAGTTCCAATTTCAGATC

ATCTCTTTGTGAACACATATGATTGTATGTTTTCAGAAAAAGCCAGGTCAC

TTCTTGAATGCTTTGGTGCTTAGAAATTTCTTAAGCACCAAAGCATTCAAG

AAATCATGTCTCTTAAGTTAAAAGTTCCACAGATCTCTAGGGCATGGGCAA

AATGCCACCATTGTCTTTGCTAAAACATAGAAAGAGTGACCTTTACTCCCG

TTTCCAATAAGTTCCTCATCTCCATCTAAGGACACCTCTGCATGAACTTCA

TTTTCCATATCACTATCAGCATTTTGGTCAAAACCATTCAACAAAACTCAG

GAAGTTCCAAGCTTTTCCACATCTTCCTGTCTTCTCCTGAGCCCTCCAAAC

TCTTCCAGCCTCTGCCCCTAGTTGGTTCCAA
```

Matrix Metallopeptidase 3 (MMP-3) (Genbank Reference: EAW67032.1)

Proteins of the matrix metalloproteinase (MMP) family are involved in the breakdown of extracellular matrix in normal physiological processes, such as embryonic development, reproduction, and tissue remodeling, as well as in disease processes, such as arthritis and metastasis. Most MMP's are secreted as inactive proproteins which are activated when cleaved by extracellular proteinases. This gene encodes an enzyme which degrades fibronectin, laminin, collagens III, IV, IX, and X, and cartilage proteoglycans. The enzyme is thought to be involved in wound repair, progression of atherosclerosis, and tumor initiation. The gene is part of a cluster of MMP genes which localize to chromosome 11q22.3.

In certain embodiments, the serum concentration of MMP-3 tends to range from 10.3-20.8 ng/ml in low tertile patients, 35.5-54.1 ng/ml in medium tertile patients and 77.0-154.3 ng/ml in high tertile patients. In certain embodiments, patients whose serum MMP-3 concentrations are in the high tertile can achieve ACR20, DAS28-CRP score of less than 3.2 or an improvement in patient global VAS, HAQ-DI, Pain VAS, SF-36—PCS score or morning stiffness VAS after 24 weeks of treatment with an IL-6 receptor antibody. In certain embodiments, patients whose serum MMP-3 concentrations are in the medium tertile can achieve an improvement in pain VAS after 24 weeks of treatment with an IL-6 receptor antibody.

In certain embodiments, the nucleic acid and amino acid sequences of MMP-3 are provided below.

```
MMP-3 peptide sequence:
                                        (SEQ ID NO: 14)
MKSLPILLLLCVAVCSAYPLDGAARGEDTSMNLVQKYLENYYDLKKDVKQF

VRRKDSGPVVKKIREMQKFLGLEVTGKLDSDTLEVMRKPRCGVPDVGHFRT

FPGIPKWRKTHLTYRIVNYTPDLPKDAVDSAVEKALKVWEEVTPLTFSRLY

EGEADIMISFAVREHGDFYPFDGPGNVLAHAYAPGPGINGDAHFDDDEQWT

KDTTGTNLFLVAAHEIGHSLGLFHSANTEALMYPLYHSLTDLTRFRLSQDD

INGIQSLYGPPPDSPETPLVPTEPVPPEPGTPANCDPALSFDAVSTLRGEI

LIFKDRHFWRKSLRKLEPELHLISSFWPSLPSGVDAAYEVTSKDLVFIFKG

NQFWAIRGNEVRAGYPRGIHTLGFPPTVRKIDAAISDKEKNKTYFFVEDKY

WRFDEKRNSMEPGFPKQIAEDFPGIDSKIDAVFEEFGFFYFFTGSSQLEFD

PNAKKVTHTLKSNSWLNC

MMP-3 cDNA sequence:
                                        (SEQ ID NO: 15)
ATGAAGAGTCTTCCAATCCTACTGTTGCTGTGCGTGGCAGTTTGCTCAGCC

TATCCATTGGATGGAGCTGCAAGGGGTGAGGACACCAGCATGAACCTTGTT

CAGAAATATCTAGAAAACTACTACGACCTCAAAAAAGATGTGAAACAGTTT

GTTAGGAGAAAGGACAGTGGTCCTGTTGTTAAAAAAATCCGAGAAATGCAG

AAGTTCCTTGGATTGGAGGTGACGGGAAGCTGGACTCCGACACTCTGGAG

GTGATGCGCAAGCCCAGGTGTGGAGTTCCTGATGTTGGTCACTTCAGAACC

TTTCCTGGCATCCCGAAGTGGAGGAAAACCCACCTTACATACAGGATTGTG

AATTATACACCAGATTTGCCAAAAGATGCTGTTGATTCTGCTGTTGAGAAA

GCTCTGAAAGTCTGGGAAGAGGTGACTCCACTCACATTCTCCAGGCTGTAT

GAAGGAGAGGCTGATATAATGATCTCTTTTGCAGTTAGAGAACATGGAGAC

TTTTACCCTTTTGATGGACCTGGAAATGTTTTGGCCCATGCCTATGCCCT

GGGCCAGGGATTAATGGAGATGCCCACTTTGATGATGATGAACAATGGACA

AAGGATACAACAGGGACCAATTTATTTCTCGTTGCTGCTCATGAAATTGGC

CACTCCCTGGGTCTCTTTCACTCAGCCAACACTGAAGCTTTGATGTACCCA

CTCTATCACTCACTCACAGACCTGACTCGGTTCCGCCTGTCTCAAGATGAT

ATAAATGGCATTCAGTCCCTCTATGGACCTCCCCCTGACTCCCCTGAGACC

CCCCTGGTACCCACGGAACCTGTCCCTCCAGAACCTGGGACGCCAGCCAAC

TGTGATCCTGCTTTGTCCTTTGATGCTGTCAGCACTCTGAGGGGAGAAATC

CTGATCTTTAAAGACAGGCACTTTTGGCGCAAATCCCTCAGGAAGCTTGAA
```

CCTGAATTGCATTTGATCTCTTCATTTTGGCCATCTCTTCCTTCAGGCGTG

GATGCCGCATATGAAGTTACTAGCAAGGACCTCGTTTTCATTTTTAAAGGA

AATCAATTCTGGGCTATCAGAGGAAATGAGGTACGAGCTGGATACCCAAGA

GGCATCCACACCCTAGGTTTCCCTCCAACCGTGAGGAAAATCGATGCAGCC

ATTTCTGATAAGGAAAAGAACAAAACATATTTCTTTGTAGAGGACAAATAC

TGGAGATTTGATGAGAAGAGAAATTCCATGGAGCCAGGCTTTCCCAAGCAA

ATAGCTGAAGACTTTCCAGGGATTGACTCAAAGATTGATGCTGTTTTTGAA

GAATTTGGGTTCTTTTATTTCTTTACTGGATCTTCACAGTTGGAGTTTGAC

CCAAATGCAAAGAAAGTGACACACACTTTGAAGAGTAACAGCTGGCTTAAT

TGTTGA

MMP-3 mRNA sequence (GenBank reference:
NM_002422.5):
(SEQ ID NO: 16)
ACAAGGAGGCAGGCAAGACAGCAAGGCATAGAGACAACATAGAGCTAAGTA

AAGCCAGTGGAAATGAAGAGTCTTCCAATCCTACTGTTGCTGTGCGTGGCA

GTTTGCTCAGCCTATCCATTGGATGGAGCTGCAAGGGGTGAGGACACCAGC

ATGAACCTTGTTCAGAAATATCTAGAAAACTACTACGACCTCAAAAAAGAT

GTGAAACAGTTTGTTAGGAGAAAGGACAGTGGTCCTGTTGTTAAAAAAATC

CGAGAAATGCAGAAGTTCCTTGGATTGGAGGTGACGGGGAAGCTGGACTCC

GACACTCTGGAGGTGATGCGCAAGCCCAGGTGTGGAGTTCCTGATGTTGGT

CACTTCAGAACCTTTCCTGGCATCCCGAAGTGGAGGAAAACCCACCTTACA

TACAGGATTGTGAATTATACACCAGATTTGCCAAAAGATGCTGTTGATTCT

GCTGTTGAGAAAGCTCTGAAAGTCTGGGAAGAGGTGACTCCACTCACATTC

TCCAGGCTGTATGAAGGAGAGGCTGATATAATGATCTCTTTTGCAGTTAGA

GAACATGGAGACTTTTACCCTTTTGATGGACCTGGAAATGTTTTGGCCCAT

GCCTATGCCCCTGGGCCAGGGATTAATGGAGATGCCCACTTTGATGATGAT

GAACAATGGACAAAGGATACAACAGGGACCAATTTATTTCTCGTTGCTGCT

CATGAAATTGGCCACTCCCTGGGTCTCTTTCACTCAGCCAACACTGAAGCT

TTGATGTACCCACTCTATCACTCACTCACAGACCTGACTCGGTTCCGCCTG

TCTCAAGATGATATAAATGGCATTCAGTCCCTCTATGGACCTCCCCCTGAC

TCCCCTGAGACCCCCCTGGTACCCACGGAACCTGTCCCTCCAGAACCTGGG

ACGCCAGCCAACTGTGATCCTGCTTTGTCCTTTGATGCTGTCAGCACTCTG

AGGGGAGAAATCCTGATCTTTAAAGACAGGCACTTTTGGCGCAAATCCCTC

AGGAAGCTTGAACCTGAATTGCATTTGATCTCTTCATTTTGGCCATCTCTT

CCTTCAGGCGTGGATGCCGCATATGAAGTTACTAGCAAGGACCTCGTTTTC

ATTTTTAAAGGAAATCAATTCTGGGCTATCAGAGGAAATGAGGTACGAGCT

GGATACCCAAGAGGCATCCACACCCTAGGTTTCCCTCCAACCGTGAGGAAA

ATCGATGCAGCCATTTCTGATAAGGAAAAGAACAAAACATATTTCTTTGTA

GAGGACAAATACTGGAGATTTGATGAGAAGAGAAATTCCATGGAGCCAGGC

TTTCCCAAGCAAATAGCTGAAGACTTTCCAGGGATTGACTCAAAGATTGAT

GCTGTTTTTGAAGAATTTGGGTTCTTTTATTTCTTTACTGGATCTTCACAG

TTGGAGTTTGACCCAAATGCAAAGAAAGTGACACACACTTTGAAGAGTAAC

AGCTGGCTTAATTGTTGAAAAGAGATATGTAGAAGGCACAATATGGGCACTT

TAAATGAAGCTAATAATTCTTCACCTAAGTCTCTGTGAATTGAAATGTTCG

TTTTCTCCTGCCTGTGCTGTGACTCGAGTCACACTCAAGGGAACTTGAGCG

TGAATCTGTATCTTGCCGGTCATTTTTATGTTATTACAGGGCATTCAAATG

GGCTGCTGCTTAGCTTGCACCTTGTCACATAGAGTGATCTTTCCCAAGAGA

AGGGGAAGCACTCGTGTGCAACAGACAAGTGACTGTATCTGTGTAGACTAT

TTGCTTATTTAATAAAGACGATTTGTCAGTTATTTTA

C-X-C Motif Chemokine Ligand 13 (CXCL13) (GenBank Reference: NP_006410.1)

B lymphocyte chemoattractant, independently cloned and named Angie, is an antimicrobial peptide and CXC chemokine strongly expressed in the follicles of the spleen, lymph nodes, and Peyer's patches. It preferentially promotes the migration of B lymphocytes (compared to T cells and macrophages), apparently by stimulating calcium influx into, and chemotaxis of, cells expressing Burkitt's lymphoma receptor 1 (BLR-1). It may therefore function in the homing of B lymphocytes to follicles.

In certain embodiments, the serum concentration of CXCL13 tends to range from 52.4-72.0 pg/ml in low tertile patients, 98.2-130.6 pg/ml in medium tertile patients and 180.8-323.9 pg/ml in high tertile patients.

In certain embodiments, patients whose serum CXCL13 concentrations in the high tertile can achieve ACR20 or an improvement in HAQ-DI, SF-36—PCS score or SF-36—PF domain after 24 weeks of treatment with an antibody.

In certain embodiments, the nucleic acid and amino acid sequences of CXCL13 are provided below.

CXCL13 peptide sequence (GenBank reference:
NP_006410.1):
(SEQ ID NO: 17)
MKFISTSLLLMLLVSSLSPVQGVLEVYYTSLRCRCVQESSVFIPRRFIDRI

QILPRGNGCPRKEIIVWKKNKSIVCVDPQAEWIQRMMEVLRKRSSSTLPVP

VFKRKIP

CXCL13 cDNA sequence (GenBank reference:
NP_006410.1):
(SEQ ID NO: 18)
ATGAAGTTCATCTCGACATCTCTGCTTCTCATGCTGCTGGTCAGCAGCCTC

TCTCCAGTCCAAGGTGTTCTGGAGGTCTATTACACAAGCTTGAGGTGTAGA

TGTGTCCAAGAGAGCTCAGTCTTTATCCCTAGACGCTTCATTGATCGAATT

CAAATCTTGCCCCGTGGGAATGGTTGTCCAAGAAAAGAAATCATAGTCTGG

AAGAAGAACAAGTCAATTGTGTGTGTGGACCCTCAAGCTGAATGGATACAA

AGAATGATGGAAGTATTGAGAAAAAGAAGTTCTTCAACTCTACCAGTTCCA

GTGTTTAAGAGAAAGATTCCCTGA

CXCL13 genomic DNA sequence (GenBank reference:
NM_006419.2):
(SEQ ID NO: 19)
GAGAAGATGTTTGAAAAAACTGACTCTGCTAATGAGCCTGGACTCAGAGCT

CAAGTCTGAACTCTACCTCCAGACAGAATGAAGTTCATCTCGACATCTCTG

CTTCTCATGCTGCTGGTCAGCAGCCTCTCTCCAGTCCAAGGTGTTCTGGAG

GTCTATTACACAAGCTTGAGGTGTAGATGTGTCCAAGAGAGCTCAGTCTTT

-continued
ATCCCTAGACGCTTCATTGATCGAATTCAAATCTTGCCCCGTGGGAATGGT

TGTCCAAGAAAAGAAATCATAGTCTGGAAGAAGAACAAGTCAATTGTGTGT

GTGGACCCTCAAGCTGAATGGATACAAAGAATGATGGAAGTATTGAGAAAA

AGAAGTTCTTCAACTCTACCAGTTCCAGTGTTTAAGAGAAAGATTCCCTGA

TGCTGATATTTCCACTAAGAACACCTGCATTCTTCCCTTATCCCTGCTCTG

GATTTTAGTTTTGTGCTTAGTTAAATCTTTTCCAGGAAAAAGAACTTCCCC

ATACAAATAAGCATGAGACTATGTAAAAATAACCTTGCAGAAGCTGATGGG

GCAAACTCAAGCTTCTTCACTCACAGCACCCTATATACACTTGGAGTTTGC

ATTCTTATTCATCAGGGAGGAAAGTTTCTTTGAAAATAGTTATTCAGTTAT

AAGTAATACAGGATTATTTTGATTATATACTTGTTGTTTAATGTTTAAAAT

TTCTTAGAAAACAATGGAATGAGAATTTAAGCCTCAAATTTGAACATGTGG

CTTGAATTAAGAAGAAAATTATGGCATATATTAAAAGCAGGCTTCTATGAA

AGACTCAAAAAGCTGCCTGGGAGGCAGATGGAACTTGAGCCTGTCAAGAGG

CAAAGGAATCCATGTAGTAGATATCCTCTGCTTAAAAACTCACTACGGAGG

AGAATTAAGTCCTACTTTTAAAGAATTTCTTTATAAAATTTACTGTCTAAG

ATTAATAGCATTCGAAGATCCCCAGACTTCATAGAATACTCAGGGAAAGCA

TTTAAAGGGTGATGTACACATGTATCCTTTCACACATTTGCCTTGACAAAC

TTCTTTCACTCACATCTTTTTCACTGACTTTTTTTGTGGGGGCGGGGCCG

GGGGGACTCTGGTATCTAATTCTTTAATGATTCCTATAAATCTAATGACAT

TCAATAAAGTTGAGCAAACATTTTACTTAAAAAAAAAAAAAAAAAA

Serum Amyloid A (SAA) (GenBank Reference: AAB24060.1)

This gene encodes a member of the serum amyloid A family of apolipoproteins. The encoded preproprotein is proteolytically processed to generate the mature protein. This protein is a major acute phase protein that is highly expressed in response to inflammation and tissue injury. This protein also plays an important role in HDL metabolism and cholesterol homeostasis. High levels of this protein are associated with chronic inflammatory diseases including atherosclerosis, rheumatoid arthritis, Alzheimer's disease and Crohn's disease. This protein may also be a potential biomarker for certain tumors. Alternate splicing results in multiple transcript variants that encode the same protein. A pseudogene of this gene is found on chromosome 11.

In certain embodiments, the serum concentration of SAA tends to range from 2192.7-5346.4 ng/l in low tertile patients, 11832.0-30082.0 ng/l in medium tertile patients and 105200.0-256000.0 ng/l in high tertile patients. In certain embodiments, patients whose serum SAA concentrations are in the high tertile can achieve ACR20, ACR50 or ACR70, DAS28-CRP score of less than 3.2, or an improvement in patient global VAS, HAQ-DI, Pain VAS, SF-36—PCS score, SF-36—PF domain, morning stiffness VAS or RAID score after 24 weeks of treatment with an antibody. In certain embodiments, patients whose serum SAA concentrations are in the medium tertile can achieve an improvement in HAQ-DI after 24 weeks of treatment with an antibody.

In certain embodiments, the nucleic acid and amino acid sequences of SAA are provided below.

Serum amyloid A peptide sequence (GenBank reference: AAB24060.1):
(SEQ ID NO: 20)
MRLFTGIVFCSLVMGVTSESWRSFFKEALQGVGDMGRAYWDIMISNHQNSN

RYLYARGNYDAAQRGPGGVWAAKLISRSRVYLQGLIDYYLFGNSSTVLEDS

KSNEKAEEWGRSGKDPDRFRPDGLPKKY

Serum amyloid A cDNA sequence (GenBank reference: AAB24060.1):
(SEQ ID NO: 21)
ATGAGGCTTTTCACAGGCATTGTTTTCTGCTCCTTGGTCATGGGAGTCACC

AGTGAAAGCTGGCGTTCGTTTTTCAAGGAGGCTCTCCAAGGGGTTGGGGAC

ATGGGCAGAGCCTATTGGGACATAATGATATCCAATCACCAAAATTCAAAC

AGATATCTCTATGCTCGGGGAAACTATGATGCTGCCCAAAGAGGACCTGGG

GGTGTCTGGGCTGCTAAACTCATCAGCCGTTCCAGGGTCTATCTTCAGGGA

TTAATAGACTACTATTTATTTGGAAACAGCAGCACTGTATTGGAGGACTCG

AAGTCCAACGAGAAAGCTGAGGAATGGGGCCGGAGTGGCAAAGACCCCGAC

CGCTTCAGACCTGACGGCCTGCCTAAGAAATACTGA

Serum amyloid A mRNA sequence (GenBank reference: M81349.1):
(SEQ ID NO: 22)
TATAGCTCCACGGCCAGAAGATACCAGCAGCTCTGCCTTTACTGAAATTTC

AGCTGGAGAAAGGTCCACAGCACAATGAGGCTTTTCACAGGCATTGTTTTC

TGCTCCTTGGTCATGGGAGTCACCAGTGAAAGCTGGCGTTCGTTTTTCAAG

GAGGCTCTCCAAGGGGTTGGGGACATGGGCAGAGCCTATTGGGACATAATG

ATATCCAATCACCAAAATTCAAACAGATATCTCTATGCTCGGGGAAACTAT

GATGCTGCCCAAAGAGGACCTGGGGTGTCTGGGCTGCTAAACTCATCAGCC

GTTCCAGGGTCTATCTTCAGGGATTAATAGACTACTATTTATTTGGAAACA

GCAGCACTGTATTGGAGGACTCGAAGTCCAACGAGAAAGCTGAGGAATGGG

GCCGGAGTGGCAAAGACCCCGACCGCTTCAGACCTGACGGCCTGCCTAAGA

AATACTGAGCTTCCTGCTCCTCTGCTCTCAGGGAAACTGGGCTGTGAGCCA

CACACTTCTCCCCCCAGACAGGGACACAGGGTCACTGAGCTTTGTGTCCCC

AGGAACTGGTATAGGGCACCTAGAGGTGTTCAATAAATGTTTGTCAAATTG

A

Soluble Intercellular Adhesion Molecule-1 (sICAM-1) (GenBank Reference: NP_000192.2):

All ICAM proteins are type I transmembrane glycoproteins, contain 2-9 immunoglobulin-like C2-type domains, and bind to the leukocyte adhesion LFA-1 protein. This protein may play a role in lymphocyte recirculation by blocking LFA-1-dependent cell adhesion. It mediates adhesive interactions important for antigen-specific immune response, NK-cell mediated clearance, lymphocyte recirculation, and other cellular interactions important for immune response and surveillance. Several transcript variants encoding the same protein have been found for this gene.

The serum concentration of sICAM-1 tends to range from 179.7-212.1 ng/ml in low tertile patients, 239.7-272.3 ng/ml in medium tertile patients and 313.7-380.0 ng/ml in high tertile patients. In certain embodiments, patients whose serum CXCL13 concentration in the low tertile and whose sICAM-1 concentration is in the low tertile can achieve ACR50 after 24 weeks of treatment with an antibody. In certain embodiments, patients whose serum CXCL13 concentration is in the high tertile and whose sICAM-1 concentration is in the high tertile can achieve ACR50 after 24 weeks of treatment with an antibody.

In certain embodiments, the nucleic acid and amino acid sequences of sICAM-1 are provided below.

```
sICAM-1 peptide sequence (GenBank reference:
NP_000192.2):
                                      (SEQ ID NO: 23)
MAPSSPRPALPALLVLLGALFPGPGNAQTSVSPSKVILPRGGSVLVTCSTS

CDQPKLLGIETPLPKKELLLPGNNRKVYELSNVQEDSQPMCYSNCPDGQST

AKTFLTVYWTPERVELAPLPSWQPVGKNLTLRCQVEGGAPRANLTVVLLRG

EKELKREPAVGEPAEVTTTVLVRRDHHGANFSCRTELDLRPQGLELFENTS

APYQLQTFVLPATPPQLVSPRVLEVDTQGTVVCSLDGLFPVSEAQVHLALG

DQRLNPTVTYGNDSFSAKASVSVTAEDEGTQRLTCAVILGNQSQETLQTVT

IYSFPAPNVILTKPEVSEGTEVTVKCEAHPRAKVTLNGVPAQPLGPRAQLL

LKATPEDNGRSFSCSATLEVAGQLIHKNQTRELRVLYGPRLDERDCPGNWT

WPENSQQTPMCQAWGNPLPELKCLKDGTFPLPIGESVTVTRDLEGTYLCRA

RSTQGEVTRKVTVNVLSPRYEIVIITVVAAAVIMGTAGLSTYLYNRQRKIK

KYRLQQAQKGTPMKPNTQATPP sICAM-1 cDNA sequence (GenBank reference:
NP_000192.2):
                                      (SEQ ID NO: 24)
ATGGCTCCCAGCAGCCCCCGGCCCGCGCTGCCCGCACTCCTGGTCCTGCTC

GGGGCTCTGTTCCCAGGACCTGGCAATGCCCAGACATCTGTGTCCCCCTCA

AAAGTCATCCTGCCCCGGGGAGGCTCCGTGCTGGTGACTGCAGCACCTCCT

GTGACCAGCCCAAGTTGTTGGGCATAGAGACCCCGTTGCCTAAAAAGGAGT

TGCTCCTGCCTGGGAACAACCGGAAGGTGTATGAACTGAGCAATGTGCAAG

AAGATAGCCAACCAATGTGCTATTCAAACTGCCCTGATGGGCAGTCAACAG

CTAAAACCTTCCTCACCGTGTACTGGACTCCAGAACGGGTGGAACTGGCAC

CCCTCCCCTCTTGGCAGCCAGTGGGCAAGAACCTTACCCTACGCTGCCAGG

TGGAGGGTGGGGCACCCCGGGCCAACCTCACCGTGGTGCTGCTCCGTGGGG

AGAAGGAGCTGAAACGGGAGCCAGCTGTGGGGAGCCCGCTGAGGTCACGA

CCACGGTGCTGGTGAGGAGAGATCACCATGGAGCCAATTTCTCGTGCCGCA

CTGAACTGGACCTGCGGCCCCAAGGGCTGGAGCTGTTTGAGAACACCTCGG

CCCCCTACCAGCTCCAGACCTTTGTCCTGCCAGCGACTCCCCCACAACTTG

TCAGCCCCCGGGTCCTAGAGGTGGACACGCAGGGGACCGTGGTCTGTTCCC

TGGACGGGCTGTTCCCAGTCTCGGAGGCCCAGGTCCACCTGGCACTGGGGG

ACCAGAGGTTGAACCCCACAGTCACCTATGGCAACGACTCCTTCTCGGCCA

AGGCCTCAGTCAGTGTGACCGCAGAGGACGAGGGCACCCAGCGGCTGACGT

GTGCAGTAATACTGGGGAACCAGAGCCAGGAGACACTGCAGACAGTGACCA

TCTACAGCTTTCCGGCGCCCAACGTGATTCTGACGAAGCCAGAGGTCTCAG

AAGGGACCGAGGTGACAGTGAAGTGTGAGGCCCACCCTAGAGCCAAGGTGA

CGCTGAATGGGGTTCCAGCCCAGCCACTGGGCCCGAGGGCCCAGCTCCTGC
```

```
TGAAGGCCACCCCAGAGGACAACGGGCGCAGCTTCTCCTGCTCTGCAACCC

TGGAGGTGGCCGGCCAGCTTATACACAAGAACCAGACCCGGGAGCTTCGTG

TCCTGTATGGCCCCCGACTGGACGAGAGGGATTGTCCGGGAAACTGGACGT

GGCCAGAAAATTCCCAGCAGACTCCAATGTGCCAGGCTTGGGGGAACCCAT

TGCCCGAGCTCAAGTGTCTAAAGGATGGCACTTTCCCACTGCCCATCGGGG

AATCAGTGACTGTCACTCGAGATCTTGAGGGCACCTACCTCTGTCGGGCCA

GGAGCACTCAAGGGGAGGTCACCCGCAAGGTGACCGTGAATGTGCTCTCCC

CCCGGTATGAGATTGTCATCATCACTGTGGTAGCAGCCGCAGTCATAATGG

GCACTGCAGGCCTCAGCACGTACCTCTATAACCGCCAGCGGAAGATCAAGA

AATACAGACTACAACAGGCCCAAAAAGGGACCCCCATGAAACCGAACACAC

AAGCCACGCCTCCCTGA sICAM-1 mRNA sequence (GenBank reference:
NM_000201.3)
                                      (SEQ ID NO: 25)
GAGCTCCTCTGCTACTCAGAGTTGCAACCTCAGCCTCGCTATGGCTCCCAG

CAGCCCCCGGCCCGCGCTGCCCGCACTCCTGGTCCTGCTCGGGGCTCTGTT

CCCAGGACCTGGCAATGCCCAGACATCTGTGTCCCCCTCAAAAGTCATCCT

GCCCCGGGGAGGCTCCGTGCTGGTGACATGCAGCACCTCCTGTGACCAGCC

CAAGTTGTTGGGCATAGAGACCCCGTTGCCTAAAAAGGAGTTGCTCCTGCC

TGGGAACAACCGGAAGGTGTATGAACTGAGCAATGTGCAAGAAGATAGCCA

ACCAATGTGCTATTCAAACTGCCCTGATGGGCAGTCAACAGCTAAAACCTT

CCTCACCGTGTACTGGACTCCAGAACGGGTGGAACTGGCACCCCTCCCCTC

TTGGCAGCCAGTGGGCAAGAACCTTACCCTACGCTGCCAGGTGGAGGGTGG

GGCACCCCGGGCCAACCTCACCGTGGTGCTGCTCCGTGGGGAGAAGGAGCT

GAAACGGGAGCCAGCTGTGGGGAGCCCGCTGAGGTCACGACCACGGTGCT

GGTGAGGAGAGATCACCATGGAGCCAATTTCTCGTGCCGCACTGAACTGGA

CCTGCGGCCCCAAGGGCTGGAGCTGTTTGAGAACACCTCGGCCCCCTACCA

GCTCCAGACCTTTGTCCTGCCAGCGACTCCCCCACAACTTGTCAGCCCCCG

GGTCCTAGAGGTGGACACGCAGGGGACCGTGGTCTGTTCCCTGGACGGGCT

GTTCCCAGTCTCGGAGGCCCAGGTCCACCTGGCACTGGGGGACCAGAGGTT

GAACCCCACAGTCACCTATGGCAACGACTCCTTCTCGGCCAAGGCCTCAGT

CAGTGTGACCGCAGAGGACGAGGGCACCCAGCGGCTGACGTGTGCAGTAAT

ACTGGGGAACCAGAGCCAGGAGACACTGCAGACAGTGACCATCTACAGCTT

TCCGGCGCCCAACGTGATTCTGACGAAGCCAGAGGTCTCAGAAGGGACCGA

GGTGACAGTGAAGTGTGAGGCCCACCCTAGAGCCAAGGTGACGCTGAATGG

GGTTCCAGCCCAGCCACTGGGCCCGAGGGCCCAGCTCCTGCTGAAGGCCAC

CCCAGAGGACAACGGGCGCAGCTTCTCCTGCTCTGCAACCCTGGAGGTGGC

CGGCCAGCTTATACACAAGAACCAGACCCGGGAGCTTCGTGTCCTGTATGG

CCCCCGACTGGACGAGAGGGATTGTCCGGGAAACTGGACGTGGCCAGAAAA

TTCCCAGCAGACTCCAATGTGCCAGGCTTGGGGGAACCCATTGCCCGAGCT

CAAGTGTCTAAAGGATGGCACTTTCCCACTGCCCATCGGGGAATCAGTGAC

TGTCACTCGAGATCTTGAGGGCACCTACCTCTGTCGGGCCAGGAGCACTCA
```

```
-continued
AGGGGAGGTCACCCGCAAGGTGACCGTGAATGTGCTCTCCCCCGGTATGA

GATTGTCATCATCACTGTGGTAGCAGCCGCAGTCATAATGGGCACTGCAGG

CCTCAGCACGTACCTCTATAACCGCCAGCGGAAGATCAAGAAATACAGACT

ACAACAGGCCCAAAAAGGGACCCCCATGAAACCGAACACACAAGCCACGCC

TCCCTGAACCTATCCCGGGACAGGGCCTCTTCCTCGGCCTTCCCATATTGG

TGGCAGTGGTGCCACACTGAACAGAGTGGAAGACATATGCCATGCAGCTAC

ACCTACCGGCCCTGGGACGCCGGAGGACAGGGCATTGTCCTCAGTCAGATA

CAACAGCATTTGGGGCCATGGTACCTGCACACCTAAAACACTAGGCCACGC

ATCTGATCTGTAGTCACATGACTAAGCCAAGAGGAAGGAGCAAGACTCAAG

ACATGATTGATGGATGTTAAAGTCTAGCCTGATGAGAGGGGAAGTGGTGGG

GGAGACATAGCCCCACCATGAGGACATACAACTGGGAAATACTGAAACTTG

CTGCCTATTGGGTATGCTGAGGCCCCACAGACTTACAGAAGAAGTGGCCCT

CCATAGACATGTGTAGCATCAAAACACAAAGGCCCACACTTCCTGACGGAT

GCCAGCTTGGGCACTGCTGTCTACTGACCCCAACCCTTGATGATATGTATT

TATTCATTTGTTATTTTACCAGCTATTTATTGAGTGTCTTTTATGTAGGCT

AAATGAACATAGGTCTCTGGCCTCACGGAGCTCCCAGTCCTAATCACATTC

AAGGTCACCAGGTACAGTTGTACAGGTTGTACACTGCAGGAGAGTGCCTGG

CAAAAAGATCAAATGGGGCTGGGACTTCTCATTGGCCAACCTGCCTTTCCC

CAGAAGGAGTGATTTTTCTATCGGCACAAAAGCACTATATGGACTGGTAAT

GGTTACAGGTTCAGAGATTACCCAGTGAGGCCTTATTCCTCCCTTCCCCCC

AAAACTGACACCTTTGTTAGCCACCTCCCCACCCACATACATTTCTGCCAG

TGTTCACAATGACACTCAGCGGTCATGTCTGGACATGAGTGCCCAGGGAAT

ATGCCCAAGCTATGCCTTGTCCTCTTGTCCTGTTTGCATTTCACTGGGAGC

TTGCACTATGCAGCTCCAGTTTCCTGCAGTGATCAGGGTCCTGCAAGCAGT

GGGGAAGGGGCCAAGGTATTGGAGGACTCCCTCCCAGCTTTGGAAGCCTC

ATCCGCGTGTGTGTGTGTGTATGTGTAGACAAGCTCTCGCTCTGTCACC

CAGGCTGGAGTGCAGTGGTGCAATCATGGTTCACTGCAGTCTTGACCTTTT

GGGCTCAAGTGATCCTCCCACCTCAGCCTCCTGAGTAGCTGGGACCATAGG

CTCACAACACCACACCTGGCAAATTTGATTTTTTTTTTTTTCCAGAGACG

GGGTCTCGCAACATTGCCCAGACTTCCTTTGTGTTAGTTAATAAAGCTTTC

TCAACTGCC
```

Pain VAS

The visual analog scale (VAS) for pain is a unidimensional measure of pain intensity, which has been widely used in diverse adult populations, including those with rheumatic diseases. The pain VAS is a continuous scale comprised of a horizontal (HVAS) or vertical (VVAS) line, usually 10 centimeters (100 mm) in length, anchored by 2 verbal descriptors, one for each symptom extreme. For pain intensity, the scale is most commonly anchored by "no pain" (score of 0) and "pain as bad as it could be" or "worst imaginable pain" (score of 100 [100-mm scale]). To avoid clustering of scores around a preferred numeric value, numbers or verbal descriptors at intermediate points are not recommended.

Patient Global VAS

The patient global assessment of disease activity is a crucial component of various measures of disease activity in rheumatoid arthritis (RA). Our objective was to identify underlying latent traits driving the patient global assessment using a quantitative, multivariable data reduction approach. In certain embodiments, patients rate their global assessment on a visual analog scale (VAS) by answering the question, "Considering all of the ways your disease affects you, how well are you doing in the past week?" Hence, the patient global not only assesses disease from the patient perspective but also encompasses various factors affecting patients in addition to RA.

Morning Stiffness VAS

Patients were asked if there was joint stiffness upon waking (yes or no); those answering yes were asked to indicate the severity of the morning stiffness by marking a vertical line across the severity scale (100-mm visual analog scale [VAS], where 0=not severe at all and 100=extremely severe). These patients were also asked to record the time that morning stiffness in the joints subsided; the duration of morning stiffness was calculated by subtraction of this time from the waking time. Patients were also asked to record the intensity of pain upon waking, by marking a line on a 100-mm VAS (where 0=no pain and 100=very severe pain).

Anti-IL-6R Antibodies

The present disclosure includes methods that comprise administering to a patient an antibody, or an antigen-binding fragment thereof, that binds specifically to hIL-6R. As used herein, the term "hIL-6R" means a human cytokine receptor that specifically binds human interleukin-6 (IL-6). In certain embodiments, the antibody that is administered to the patient binds specifically to the extracellular domain of hIL-6R.

The term "antibody", as used herein, is intended to refer to immunoglobulin molecules comprising four polypeptide chains, two heavy (H) chains and two light (L) chains inter-connected by disulfide bonds, as well as multimers thereof (e.g., IgM). Each heavy chain comprises a heavy chain variable region (abbreviated herein as HCVR or VH) and a heavy chain constant region. The heavy chain constant region comprises three domains, CH1, CH2 and CH3. Each light chain comprises a light chain variable region (abbreviated herein as LCVR or VL) and a light chain constant region. The light chain constant region comprises one domain (CL1). The VH and VL regions can be further subdivided into regions of hypervariability, termed complementarity determining regions (CDRs), interspersed with regions that are more conserved, termed framework regions (FR). Each VH and VL is composed of three CDRs and four FRs, arranged from amino-terminus to carboxy-terminus in the following order: FR1, CDR1, FR2, CDR2, FR3, CDR3, FR4. In some embodiments, the FRs of the antibody (or antigen-binding portion thereof) may be identical to the human germline sequences, or may be naturally or artificially modified. An amino acid consensus sequence may be defined based on a side-by-side analysis of two or more CDRs.

The term "antibody," as used herein, also includes antigen-binding fragments of full antibody molecules. The terms "antigen-binding portion" of an antibody, "antigen-binding fragment" of an antibody, and the like, as used herein, include any naturally occurring, enzymatically obtainable, synthetic, or genetically engineered polypeptide or glycoprotein that specifically binds an antigen to form a complex. Antigen-binding fragments of an antibody may be derived, e.g., from full antibody molecules using any suitable standard techniques such as proteolytic digestion or recombinant genetic engineering techniques involving the manipulation and expression of DNA encoding antibody variable and optionally constant domains. Such DNA is known and/or is readily available from, e.g., commercial sources, DNA libraries (including, e.g., phage-antibody libraries), or can be synthesized. The DNA may be sequenced and manipulated chemically or by using molecular biology techniques, for example, to arrange one or more variable and/or constant domains into a suitable configuration, or to introduce codons, create cysteine residues, modify, add or delete amino acids, etc.

Non-limiting examples of antigen-binding fragments include: (i) Fab fragments; (ii) F(ab')2 fragments; (iii) Fd fragments; (iv) Fv fragments; (v) single-chain Fv (scFv) molecules; (vi) dAb fragments; and (vii) minimal recognition units consisting of the amino acid residues that mimic the hypervariable region of an antibody (e.g., an isolated complementarity determining region (CDR) such as a CDR3 peptide), or a constrained FR3-CDR3-FR4 peptide. Other engineered molecules, such as domain-specific antibodies, single domain antibodies, domain-deleted antibodies, chimeric antibodies, CDR-grafted antibodies, diabodies, triabodies, tetrabodies, minibodies, nanobodies (e.g., monovalent nanobodies, and bivalent nanobodies), small modular immunopharmaceuticals (SMIPs), and shark variable IgNAR domains, are also encompassed within the expression "antigen-binding fragment," as used herein.

An antigen-binding fragment of an antibody will typically comprise at least one variable domain. The variable domain may be of any size or amino acid composition and will generally comprise at least one CDR which is adjacent to or in frame with one or more framework sequences. In antigen-binding fragments having a VH domain associated with a VL domain, the VH and VL domains may be situated relative to one another in any suitable arrangement. For example, the variable region may be dimeric and contain VH-VH, VH-VL or VL-VL dimers. Alternatively, the antigen-binding fragment of an antibody may contain a monomeric VH or VL domain.

In certain embodiments, an antigen-binding fragment of an antibody may contain at least one variable domain covalently linked to at least one constant domain. Non-limiting, exemplary configurations of variable and constant domains that may be found within an antigen-binding fragment of an antibody include: (i) VH-CH1; (ii) VH-CH2; (iii) VH-CH3; (iv) VH-CH1-CH2; (v) VH-CH1-CH2-CH3; (vi) VH-CH2-CH3; (vii) VH-CL; (viii) VL-CH1; (ix) VL-CH2; (x) VL-CH3; (xi) VL-CH1-CH2; (xii) VL-CH1-CH2-CH3; (xiii) VL-CH2-CH3; and (xiv) VL-CL. In any configuration of variable and constant domains, including any of the exemplary configurations listed above, the variable and constant domains may be either directly linked to one another or may be linked by a full or partial hinge or linker region. A hinge region may in various embodiments consist of at least 2 (e.g., 5, 10, 15, 20, 40, 60 or more) amino acids which result in a flexible or semi-flexible linkage between adjacent variable and/or constant domains in a single polypeptide molecule. Moreover, an antigen-binding fragment of an antibody may in various embodiments comprise a homo-dimer or hetero-dimer (or other multimer) of any of the variable and constant domain configurations listed above in non-covalent association with one another and/or with one or more monomeric VH or VL domain (e.g., by disulfide bond(s)).

As with full antibody molecules, antigen-binding fragments may be monospecific or multispecific (e.g., bispecific). A multispecific antigen-binding fragment of an antibody will typically comprise at least two different variable domains, wherein each variable domain is capable of specifically binding to a separate antigen or to a different epitope on the same antigen. Any multispecific antibody format, including the exemplary bispecific antibody formats disclosed herein, may in various embodiments be adapted for use in the context of an antigen-binding fragment of an anti-IL-6R antibody using routine techniques available in the art.

The constant region of an antibody is important in the ability of an antibody to fix complement and mediate cell-dependent cytotoxicity. Thus, the isotype of an antibody may be selected on the basis of whether it is desirable for the antibody to mediate cytotoxicity.

The term "human antibody", as used herein, is intended to include antibodies having variable and constant regions derived from human germline immunoglobulin sequences. The human antibodies featured in the disclosure may in various embodiments nonetheless include amino acid residues not encoded by human germline immunoglobulin sequences (e.g., mutations introduced by random or site-specific mutagenesis in vitro or by somatic mutation in vivo), for example in the CDRs and in in some embodiments CDR3. However, the term "human antibody", as used herein, is not intended to include antibodies in which CDR sequences derived from the germline of another mammalian species, such as a mouse, have been grafted onto human framework sequences.

The term "recombinant human antibody", as used herein, is intended to include all human antibodies that are prepared, expressed, created or isolated by recombinant means, such as antibodies expressed using a recombinant expression vector transfected into a host cell (described further below), antibodies isolated from a recombinant, combinatorial human antibody library (described further below), antibodies isolated from an animal (e.g., a mouse) that is transgenic for human immunoglobulin genes (see e.g., Taylor et al., (1992) Nucl. Acids Res. 20:6287-6295, incorporated herein by reference in its entirety,) or antibodies prepared, expressed, created or isolated by any other means that involves splicing of human immunoglobulin gene sequences to other DNA sequences. Such recombinant human antibodies have variable and constant regions derived from human germline immunoglobulin sequences. In certain embodiments, however, such recombinant human antibodies are subjected to in vitro mutagenesis (or, when an animal transgenic for human Ig sequences is used, in vivo somatic mutagenesis) and thus the amino acid sequences of the VH and VL regions of the recombinant antibodies are sequences that, while derived from and related to human germline VH and VL sequences, may not naturally exist within the human antibody germline repertoire in vivo.

Human antibodies can exist in two forms that are associated with hinge heterogeneity. In an embodiment, an immunoglobulin molecule comprises a stable four chain construct of approximately 150-160 kDa in which the dimers are held together by an interchain heavy chain disulfide bond. In certain embodiments, the dimers are not linked via inter-chain disulfide bonds and a molecule of about 75-80 kDa is formed composed of a covalently coupled light and heavy chain (half-antibody). These embodiments/forms have been extremely difficult to separate, even after affinity purification.

The frequency of appearance of the second form in various intact IgG isotypes is due to, but not limited to, structural differences associated with the hinge region isotype of the antibody. A single amino acid substitution in the hinge region of the human IgG4 hinge can significantly reduce the appearance of the second form (Angal et al., (1993) Molecular Immunology 30:105, incorporated by reference in its entirety) to levels typically observed using a human IgG1 hinge. The instant disclosure encompasses in various embodiments antibodies having one or more mutations in the hinge, CH2 or CH3 region which may be desirable, for example, in production, to improve the yield of the desired antibody form.

An "isolated antibody," as used herein, means an antibody that has been identified and separated and/or recovered from at least one component of its natural environment. For example, an antibody that has been separated or removed from at least one component of an organism, or from a tissue or cell in which the antibody naturally exists or is naturally produced, is an "isolated antibody." In various embodiments, the isolated antibody also includes an antibody in situ within a recombinant cell. In other embodiments, isolated antibodies are antibodies that have been subjected to at least one purification or isolation step. In various embodiments, an isolated antibody may be substantially free of other cellular material and/or chemicals.

The term "specifically binds," or the like, means that an antibody or antigen-binding fragment thereof forms a complex with an antigen that is relatively stable under physiologic conditions. Methods for determining whether an antibody specifically binds to an antigen are well known in the art and include, for example, equilibrium dialysis, surface plasmon resonance, and the like. For example, an antibody that "specifically binds" IL-6R, as used herein, includes antibodies that bind IL-6R or portion thereof with a KD of less than about 1000 nM, less than about 500 nM, less than about 300 nM, less than about 200 nM, less than about 100 nM, less than about 90 nM, less than about 80 nM, less than about 70 nM, less than about 60 nM, less than about 50 nM, less than about 40 nM, less than about 30 nM, less than about 20 nM, less than about 10 nM, less than about 5 nM, less than about 4 nM, less than about 3 nM, less than about 2 nM, less than about 1 nM or about 0.5 nM, as measured in a surface plasmon resonance assay. An isolated antibody that specifically binds human IL-6R may, however, have cross-reactivity to other antigens, such as IL-6R molecules from other (non-human) species.

The term "surface plasmon resonance", as used herein, refers to an optical phenomenon that allows for the analysis of real-time interactions by detection of alterations in protein concentrations within a biosensor matrix, for example using the BIAcore™ system (Biacore Life Sciences division of GE Healthcare, Piscataway, NJ).

The term "KD", as used herein, is intended to refer to the equilibrium dissociation constant of an antibody-antigen interaction.

The term "epitope" refers to an antigenic determinant that interacts with a specific antigen binding site in the variable region of an antibody molecule known as a paratope. A single antigen may have more than one epitope. Thus, different antibodies may bind to different areas on an antigen and may have different biological effects. Epitopes may be either conformational or linear. A conformational epitope is produced by spatially juxtaposed amino acids from different segments of the linear polypeptide chain. A linear epitope is one produced by adjacent amino acid residues in a polypeptide chain. In certain circumstance, an epitope may include moieties of saccharides, phosphoryl groups, or sulfonyl groups on the antigen.

The anti-IL-6R antibodies useful for the methods featured herein may in various embodiments include one or more amino acid substitutions, insertions and/or deletions in the framework and/or CDR regions of the heavy and light chain variable domains as compared to the corresponding germline sequences from which the antibodies were derived. Such mutations can be readily ascertained by comparing the amino acid sequences disclosed herein to germline sequences available from, for example, public antibody sequence databases. The present disclosure includes in various embodiments methods involving the use of antibodies, and antigen-binding fragments thereof, which are derived from any of the amino acid sequences disclosed herein, wherein one or more amino acids within one or more framework and/or CDR regions are mutated to the corresponding residue(s) of the germline sequence from which the antibody was derived, or to the corresponding residue(s) of another human germline sequence, or to a conservative amino acid substitution of the corresponding germline residue(s) (such sequence changes are referred to herein collectively as "germline mutations"). Numerous antibodies and antigen-binding fragments may be constructed which comprise one or more individual germline mutations or combinations thereof. In certain embodiments, all of the framework and/or CDR residues within the VH and/or VL domains are mutated back to the residues found in the original germline sequence from which the antibody was derived. In other embodiments, only certain residues are mutated back to the original germline sequence, e.g., only the mutated residues found within the first 8 amino acids of FR1 or within the last 8 amino acids of FR4, or only the mutated residues found within CDR1, CDR2 or CDR3. In other embodiments, one or more of the framework and/or CDR residue(s) are mutated to the corresponding residue(s) of a different germline sequence (i.e., a germline sequence that is different from the germline sequence from which the antibody was originally derived). Furthermore, the antibodies may contain any combination of two or more germline mutations within the framework and/or CDR regions, e.g., wherein certain individual residues are mutated to the corresponding residue of a certain germline sequence while certain other residues that differ from the original germline sequence are maintained or are mutated to the corresponding residue of a different germline sequence. Once obtained, antibodies and antigen-binding fragments that contain one or more germline mutations can be easily tested for one or more desired property such as, improved binding specificity, increased binding affinity, improved or enhanced antagonistic or agonistic biological properties (as the case may be), reduced immunogenicity, etc. The use of antibodies and antigen-binding fragments obtained in this general manner are encompassed within the present disclosure.

The present disclosure also includes methods involving the use of anti-IL-6R antibodies comprising variants of any of the HCVR, LCVR, and/or CDR amino acid sequences disclosed herein having one or more conservative substitutions. For example, the present disclosure includes the use of anti-IL-6R antibodies having HCVR, LCVR, and/or CDR amino acid sequences with, e.g., 10 or fewer, 8 or fewer, 6 or fewer, 4 or fewer, etc. conservative amino acid substitutions relative to any of the HCVR, LCVR, and/or CDR amino acid sequences disclosed herein.

According to the present disclosure, the anti-IL-6R antibody, or antigen-binding fragment thereof, in various embodiments comprises a heavy chain variable region (HCVR), light chain variable region (LCVR), and/or complementarity determining regions (CDRs) comprising any of the amino acid sequences of the anti-IL-6R antibodies as claimed in U.S. Pat. No. 7,582,298, incorporated herein by reference in its entirety. The anti-IL-6R antibody or antigen-binding fragment thereof that can be used in the context of the methods of the present disclosure comprises the heavy chain complementarity determining regions (HCDRs) of a HCVR comprising the amino acid sequence of SEQ ID NO:1 and the light chain complementarity determining regions (LCDRs) of a LCVR comprising the amino acid sequence of SEQ ID NO:2. According to certain embodiments, the anti-IL-6R antibody or antigen-binding fragment thereof comprises three HCDRs (i.e., HCDR1, HCDR2 and HCDR3) and three LCDRs (i.e., LCDR1, LCDR2 and LCDR3), wherein the HCDR1 comprises the amino acid sequence of SEQ ID NO:3; the HCDR2 comprises the amino acid sequence of SEQ ID NO:4; the HCDR3 comprises the amino acid sequence of SEQ ID NO:5; the LCDR1 comprises the amino acid sequence of SEQ ID NO:6; the LCDR2 comprises the amino acid sequence of SEQ ID NO:7; and the LCDR3 comprises the amino acid sequence of SEQ ID NO:8. In yet other embodiments, the anti-IL-6R antibody or antigen-binding fragment thereof comprises an HCVR comprising SEQ ID NO:1 and an LCVR comprising SEQ ID NO:2.

In certain embodiments, the anti-IL-6R antibody or antigen-binding fragment thereof comprises a heavy chain comprising SEQ ID NO:9 and a light chain comprising SEQ ID NO:10. According to certain exemplary embodiments, the methods of the present disclosure comprise the use of the anti-IL-6R antibody referred to and known in the art as sarilumab, or a bioequivalent thereof.

The amino acid sequence of SEQ ID NO: 1 is
EVQLVESGGGLVQPGRSLRLSCAASRFTFDDYAMHWVRQAPGKGLEWVSGI

SWNSGRIGYADSVKGRFTISRDNAENSLFLQMNGLRAEDTALYYCAKGRDS

FDIWGQGTMVTVSS

The amino acid sequence of SEQ ID NO: 2 is
DIQMTQSPSSVSASVGDRVTITCRASQGISSWLAWYQQKPGKAPKLLIYGA

SSLESGVPSRFSGSGSGTDFTLTISSLQPEDFASYYCQQANSFPYTFGQGT

KLEIK.

The amino acid sequence of SEQ ID NO: 3 is
RFTFDDYA.

The amino acid sequence of SEQ ID NO: 4 is
ISWNSGRI.

The amino acid sequence of SEQ ID NO: 5 is
AKGRDSFDI.

The amino acid sequence of SEQ ID NO: 6 is
QGISSW.

The amino acid sequence of SEQ ID NO: 7 is
GAS.

The amino acid sequence of SEQ ID NO: 8 is
QQANSFPYT.

The amino acid sequence of SEQ ID NO: 9 is
EVQLVESGGGLVQPGRSLRLSCAAS<u>RFTFDDYA</u>MHWVRQAPGKGLEWVSGI SWN<u>SGRIGYADSVKGRFTISRDNAENSLFLQMNGLRAEDTALYYC<u>AKGRDS</u>

<u>FDI</u>WGQGTMVTVSSASTKGPSVFPLAPSSKSTSGGTAALGCLVKDYFPEPV

TVSWNSGALTSGVHTFPAVLQSSGLYSLSSVVTVPSSSLGTQTYICNVNHK

PSNTKVDKKVEPKSCDKTHTCPPCPAPELLGGPSVFLFPPKPKDTLMISRT

PEVTCVVVDVSHEDPEVKFNWYVDGVEVHNAKTKPREEQYNSTYRVVSVLT

VLHQDWLNGKEYKCKVSNKALPAPIEKTISKAKGQPREPQVYTLPPSRDEL

TKNQVSLTCLVKGFYPSDIAVEWESNGQPENNYKTTPPVLDSDGSFFLYSK

LTVDKSRWQQGNVFSCSVMHEALHNHYTQKSLSLSPGK.

The amino acid sequence of SEQ ID NO: 10 is
DIQMTQSPSSVSASVGDRVTITCRAS<u>QGISSW</u>LAWYQQKPGKAPKLLIYGA SSLESGVPSRFSGSGSGTDFTLTISSLQPEDFASYYC<u>QQANSFPYT</u>FGQGT

KLEIKRTVAAPSVFIFPPSDEQLKSGTASVVCLLNNFYPREAKVQWKVDNA

LQSGNSQESVTEQDSKDSTYSLSSTLTLSKADYEKHKVYACEVTHQGLSSP

VTKSFNRGEC.

The term "bioequivalent" as used herein, refers to a molecule having similar bioavailability (rate and extent of availability) after administration at the same molar dose and under similar conditions (e.g., same route of administration), such that the effect, with respect to both efficacy and safety, can be expected to be essentially same as the comparator molecule. Two pharmaceutical compositions comprising an anti-IL-6R antibody are bioequivalent if they are pharmaceutically equivalent, meaning they contain the same amount of active ingredient (e.g., IL-6R antibody), in the same dosage form, for the same route of administration and meeting the same or comparable standards. Bioequivalence can be determined, for example, by an in vivo study comparing a pharmacokinetic parameter for the two compositions. Parameters commonly used in bioequivalence studies include peak plasma concentration (Cmax) and area under the plasma drug concentration time curve (AUC).

The disclosure in certain embodiments relates to methods comprising administering to the subject an antibody which comprises the heavy chain variable region comprising sequence SEQ ID NO:1 and the light chain variable region comprising sequence SEQ ID NO:2.

The disclosure provides pharmaceutical compositions comprising such antibody, and methods of using these compositions.

The antibody which comprises the heavy chain variable region comprising sequence SEQ ID NO:1 and the light chain variable region comprising sequence SEQ ID NO:2 is an antibody that specifically binds human interleukin-6 receptor (hIL-6R). See international publication number WO2007/143168, incorporated herein by reference in its entirety.

In certain embodiments, the antibody which comprises the heavy chain variable region comprising sequence SEQ ID NO:1 and the light chain variable region comprising sequence SEQ ID NO:2 is sarilumab.

DMARDs

DMARDs are drugs defined by their use in rheumatoid arthritis to slow down disease progression.

DMARDs have been classified as synthetic (sDMARD) and biological (bDMARD). Synthetic DMARDs include non-exhaustively methotrexate, sulfasalazine, leflunomide, and hydroxychloroquine. Biological DMARDs include non-exhaustively adalimumab, golimumab, etanercept, abatacept, infliximab, rituximab, and tocilizumab.

Methods of Administration and Formulations

The methods described herein comprise administering to a patient a therapeutically effective amount of an anti-hIL-6R antibody alone and, optionally, a therapeutically effective amount of an anti-hIL-6R antibody in combination with a DMARD. As used herein, the phrase "therapeutically effective amount" means a dose of the therapeutic that results in a detectable improvement in one or more symptoms associated with depression or a depressive disorder or which causes a biological effect (e.g., a decrease in the level of a particular biomarker) that is correlated with the underlying pathologic mechanism(s) giving rise to the condition or symptom(s) of depression or a depressive disorder. For example, a dose of anti-hIL-6R antibody which causes an improvement in any of the following symptoms or conditions is deemed a "therapeutically effective amount": loss of confidence and self-esteem, inappropriate guilt, thoughts of death and suicide, diminished concentration, disturbance of sleep and appetite and feelings of sadness and loss of interest across most situations.

The antibody in various embodiments is administered to the subject. In various embodiments, the antibody is administered once every two weeks. "Once every two weeks" has the same meaning as "q2w" or "once per two weeks", i.e. that the antibody is administered once in a two week period of time. According to certain embodiments, the antibody is administered subcutaneously.

In certain embodiments, the antibody is administered at about 150 mg or about 200 mg once every two weeks. In this context, "about" refers to an amount within 5% of the stated amount. For example, "about 150 mg" is a range of between 142 and 158 mg, and "about 200 mg" is a range of between 90 and 210 mg. According to certain embodiments, the antibody is administered subcutaneously.

The antibody is administered to the subject in various embodiments in a formulation comprising suitable carriers, excipients, and other agents to provide improved transfer, delivery, tolerance, and the like, and suitable for a subcutaneous injection.

The injectable preparations may be prepared by methods publicly known. For example, injectable preparations may be prepared, e.g., by dissolving, suspending or emulsifying the antibody or its salt described above in a sterile aqueous medium or an oily medium conventionally used for injections. As the aqueous medium for injections, there are, for example, physiological saline, an isotonic solution containing glucose and other auxiliary agents, etc., which may be used in combination with an appropriate solubilizing agent such as an alcohol (e.g., ethanol), a polyalcohol (e.g., propylene glycol, polyethylene glycol), a nonionic surfactant [e.g., polysorbate 20 or 80, HCO-50 (polyoxyethylene (50 mol) adduct of hydrogenated castor oil)], etc. As the oily medium, there are employed, e.g., sesame oil, soybean oil, etc., which may be used in combination with a solubilizing agent such as benzyl benzoate, benzyl alcohol, etc. The injectable preparation thus prepared can be filled in an appropriate ampoule.

The antibody is typically formulated as described herein and in international publication number WO2011/085158, incorporated herein by reference in its entirety.

In various embodiments, the antibody is administered as an aqueous buffered solution at about pH 6.0 containing
about 21 mM histidine,
about 45 mM arginine,
about 0.2% (w/v) polysorbate 20,
about 5% (w/v) sucrose, and
between about 100 mg/mL and about 200 mg/mL of the antibody.

In certain embodiments, the antibody is administered as an aqueous buffered solution at pH 6.0 containing
about 21 mM histidine,
about 45 mM arginine,
about 0.2% (w/v) polysorbate 20,
about 5% (w/v) sucrose, and
at least about 130 mg/mL of the antibody.

In certain embodiments, the antibody is administered as an aqueous buffered solution at about pH 6.0 containing
about 21 mM histidine,
about 45 mM arginine,
about 0.2% (w/v) polysorbate 20,
about 5% (w/v) sucrose, and
about 131.6 mg/mL of the antibody.

In certain embodiments, the antibody is administered as an aqueous buffered solution at about pH 6.0 containing
about 21 mM histidine,
about 45 mM arginine,
about 0.2% (w/v) polysorbate 20,
about 5% (w/v) sucrose; and
about 175 mg/mL of the antibody.

In certain embodiments, the antibody is administered as an aqueous buffered solution at pH 6.0 containing
21 mM histidine,
45 mM arginine,
0.2% (w/v) polysorbate 20,
5% (w/v) sucrose, and
between 100 mg/mL and 200 mg/mL of the antibody.

In certain embodiments, the antibody is administered as an aqueous buffered solution at pH 6.0 containing
21 mM histidine,
45 mM arginine,
0.2% (w/v) polysorbate 20,
5% (w/v) sucrose, and
at least 130 mg/mL of the antibody.

In certain embodiments, the antibody is administered as an aqueous buffered solution at pH 6.0 containing
21 mM histidine,
45 mM arginine,
0.2% (w/v) polysorbate 20,
5% (w/v) sucrose, and
131.6 mg/mL of the antibody.

In certain embodiments, the antibody is administered as an aqueous buffered solution at pH 6.0 containing
21 mM histidine,
45 mM arginine,
0.2% (w/v) polysorbate 20,
5% (w/v) sucrose; and
175 mg/mL of the antibody.

The antibody according to the disclosure can be administered to the subject using any acceptable device or mechanism. For example, the administration can be accomplished using a syringe and needle or with a reusable pen and/or autoinjector delivery device. The methods of the present disclosure include the use of numerous reusable pen and/or autoinjector delivery devices to administer an antibody (or pharmaceutical formulation comprising the antibody). Examples of such devices include, but are not limited to AUTOPEN™ (Owen Mumford, Inc., Woodstock, UK), DISETRONIC™ pen (Disetronic Medical Systems, Bergdorf, Switzerland), HUMALOG MIX 75/25™ pen, HUMALOG™ pen, HUMALIN 70/30™ pen (Eli Lilly and Co., Indianapolis, IN), NOVOPEN™ I, II and III (Novo Nordisk, Copenhagen, Denmark), NOVOPEN JUNIOR™ (Novo Nordisk, Copenhagen, Denmark), BD™ pen (Becton Dickinson, Franklin Lakes, NJ), OPTIPEN™, OPTIPEN PRO™, OPTIPEN STARLET™, and OPTICLIK™ (Sanofi-Aventis, Frankfurt, Germany), to name only a few. Examples of disposable pen and/or autoinjector delivery devices having applications in subcutaneous delivery of a pharmaceutical composition described herein include, but are not limited to, the SOLOSTAR™ pen (Sanofi-Aventis), the FLEXPEN™ (Novo Nordisk), and the KWIKPEN™ (Eli Lilly), the SURECLICK™ Autoinjector (Amgen, Thousand Oaks, CA), the PENLET™ (Haselmeier, Stuttgart, Germany), the EPIPEN (Dey, L. P.), the HUMIRA™ Pen (Abbott Labs, Abbott Park, IL), the DAI® Auto Injector (SHL Group) and any auto-injector featuring the PUSHCLICK™ technology (SHL Group), to name only a few.

In certain embodiments, the antibody is administered with a prefilled syringe.

In certain embodiments, the antibody is administered with a prefilled syringe containing a safety system. For example, the safety system prevents an accidental needstick injury. In various embodiments, the antibody is administered with a prefilled syringe containing an ÈRIS™ safety system (West Pharmaceutical Services Inc.). See also U.S. Pat. Nos. 5,215,534 and 9,248,242, incorporated herein by reference in their entireties.

In certain embodiments, the antibody is administered with an auto-injector. In various embodiments, the antibody is administered with an auto-injector featuring the PUSHCLICK™ technology (SHL Group). In various embodiments, the auto-injector is a device comprising a syringe that allows for administration of a dose of the composition and/or antibody to a subject. See also U.S. Pat. Nos. 9,427,531 and 9,566,395, incorporated herein by reference in their entireties.

Patient Population

According to the disclosure, "subject" means a human subject or human patient.

The antibody according to the disclosure is in various embodiments administered to subjects who have serum biomarker concentrations as described above.

According to the disclosure, a subject who is considered "ineffectively treated" by his or her physician is a subject who in various embodiments either has shown to be intolerant to the one or more DMARD tested by the physician, and/or a subject who has shown an inadequate response to the one or more DMARD tested by the physician, typically a subject who is still considered by the physician to present with, or to have, active rheumatoid arthritis despite the previous one or more DMARD administered. The "active rheumatoid arthritis" is typically defined as:
  at least 6 of 66 swollen joints and 8 of 68 tender joints, as counted by the physician in a typical quantitative swollen and tender joint count examination,
  High sensitivity C-reactive protein (hs-CRP)≥8 mg/L or ESR≥28 mm/H
  DAS28ESR>5.1.

In certain embodiments, "moderately active RA" in a subject is defined as: at least 8 and at most 26 of 68 tender joints and at least 6 and/or at most 16 of 66 swollen joints in the subject. In certain embodiments, "severely active RA" in a subject is defined as: (i) more than 27 of 68 tender joints and/or at least 17 of 66 swollen joints in the subject.

In some embodiments, the subject, who was previously ineffectively treated for rheumatoid arthritis by administering at least one DMARD different from the antibody, is a subject who was previously ineffectively treated for rheumatoid arthritis by administering a DMARD. In some embodiments, the DMARD is selected from the group consisting of methotrexate, sulfasalazine, leflunomide, and hydroxychloroquine. In various embodiments, the DMARD is methotrexate.

In some embodiments, the subject, who was previously ineffectively treated for rheumatoid arthritis by administering one or more DMARD different from the antibody, is a subject who had an inadequate response or intolerance to methotrexate.

According to the disclosure, for those subjects previously ineffectively treated for rheumatoid arthritis by administering one or more DMARD different from the antibody, the one or more DMARD is/are not administered anymore to the subject, and the antibody is in various embodiments administered alone, in monotherapy to the subject. See international publication number WO2017155990, which is incorporated by reference herein in its entirety.

In some embodiments, the subject is intolerant to the DMARD due to one or more physical reactions, conditions or symptoms from the treatment with the DMARD. Physical reactions, conditions or symptoms can include allergies, pain, nausea, diarrhea, azotemia, bleeding of the stomach, intestinal bleeding, canker sores, decreased blood platelets, perforation of the intestine, bacterial infection, inflammation of gums or mouth, inflammation of the stomach lining or intestinal lining, bacterial sepsis, stomach ulcer, intestinal ulcer, sun sensitive skin, dizziness, loss of appetite, low energy, and vomiting. In certain embodiments, intolerance can be determined by the subject or by a medical professional upon examination of the subject. In various embodiments, the DMARD is selected from the group consisting of methotrexate, sulfasalazine, leflunomide, and hydroxychloroquine. In some embodiments, the DMARD is methotrexate.

In some embodiments the disclosure comprises administering to the subject one or more additional therapeutic agents in combination with the IL-6R antibody. As used herein, the expression "in combination with" means that the additional therapeutic agents are administered before, after, or concurrent with the pharmaceutical composition comprising the IL-6R antibody. In certain embodiments, the subject is administered the antibody with a DMARD and/or TNF-α antagonist.

All publications mentioned herein are incorporated herein by reference in their entirety for all purposes.

EXAMPLES

Example 1—Sarilumab and adalimumab Differential Effects on Bone Resorption and Cardiovascular Risk Biomarkers, and Predictions of Treatment Outcomes Methods This phase III active-comparator randomized controlled trial has been described in full previously (Burmester G R, *Ann Rheum Dis* 2017; 76:840-7.) In brief, MTX-INT/IR patients were randomized to sarilumab 200 mg every 2 weeks (q2w) or adalimumab 40 mg q2w for 24 weeks. At week 16, dose escalation to weekly adalimumab was permitted for those who did not achieve≥20% improvement in tender and swollen joint counts. The trial was conducted in accordance with Good Clinical Practice and with the principles of the Declaration of Helsinki; all protocols and patient information materials were approved by appropriate ethical review boards and all patients provided written informed consent.

Efficacy and PRO Endpoints

Efficacy endpoints included: proportion of patients achieving≥20/50/70% improvement according to American College of Rheumatology criteria (ACR20/50/70), Clinical Disease Activity Index (CDAI)≤2.8, CDAI≤10, DAS28 using CRP (DAS28-CRP) or DAS28-ESR<2.6 and DAS28-CRP or DAS28-ESR<3.2.

PROs evaluated in the study were previously described for the overall ITT population (Strand V, *Arthritis Res Ther* 2018; 20:129) and (evaluated as change from baseline at week 24) included Patient Global Assessment of disease activity visual analogue scale (VAS), Health Assessment Questionnaire-Disability Index (HAQ-DI), pain VAS, Functional Assessment of Chronic Illness Therapy (FACIT)-Fatigue, morning stiffness VAS, rheumatoid arthritis impact of disease (RAID) score and Medical Outcomes Study Short-Form (36-item) Health Survey (SF-36) physical (PCS) and mental (MCS) component summary scores, which include the physical functioning, role-physical, bodily pain, general health, vitality, social functioning, role-emotional and mental health domains.

Serum Collection and Biomarker Analysis

Patients were selected for this biomarker analysis if they had been randomized and treated with sarilumab or adalimumab during the double-blind period, had provided written informed consent for future use of samples, with a serum sample drawn pre-dose (baseline) and evaluable (biomarker population). Serum samples were collected and stored frozen at baseline and post-treatment through week 24 from 307 patients in the intention-to-treat population (sarilumab: n=153; adalimumab: n=154). Baseline results are provided in Table 1.

TABLE 1

Baseline biomarker serum concentrations in the biomarker population

| Biomarker | Adalimumab 40 mg q2w (n = 154) | Sarilumab 200 mg q2w (n = 153) | Low tertile |
|---|---|---|---|
| SAA, ng/l | 22 806.0 (5817.2, 115 200.0) | 16 089.0 (4997.5, 85 918.0) | 3734.7 (2192.7, 5346.4) |
| CRP, mg/l | 9.4 (3.8, 33.5) | 7.8 (2.8, 24.7) | 1.9 (1.0, 3.4) |
| Lp(a), mg/l | 235.5 (111.0, 559.0) | 179.0 (78.0, 402.0)* | 48.5 (17.5, 100.0) |
| MMP-3, ng/ml | 44.0 (25.2, 80.9) | 40.8 (19.3, 74.4) | 16.0 (10.3, 20.8) |
| Total RANKL, pmol/l | 484.5 (254.7, 1423.1) | 547.6 (268.5, 1361.3) | 200.1 (136.7, 258.5) |
| P1NP, ng/ml | 45.9 (34.9, 63.9) | 44.7 (30.3, 59.9) | 27.6 (21.4, 32.9) |
| OPG, pmol/l | 5.9 (5.0, 8.0) | 6.0 (4.7, 7.5) | 4.3 (3.9, 5.0) |
| OC, ng/ml | 19.0 (13.8, 26.0) | 18.0 (13.9, 25.8) | 12.0 (9.6, 13.8) |
| CXCL13, pg/ml | 120.1 (72.4, 184.7) | 112.8 (70.8, 180.8) | 61.8 (52.4, 72.0) |
| sICAM-1, ng/ml | 258.6 (212.1, 324.8) | 257.3 (212.7, 304.0) | 199.3 (179.7, 212.1) |
| Iron μmol/l | 10.5 (7.0, 14.9) | 11.3 (7.2, 16.0) | 6.1 (4.2, 7.0) |
| Ferritin, ng/ml | 80.0 (41.1, 174.0) | 74.9 (35.1, 130.6) | 24.9 (13.9, 35.5) |
| TIBC, μg/dl | 321.5 (293.5, 350.5) | 324.0 (303.0, 361.0) | 286.0 (267.0, 297.0) |
| Hepcidin, ng/ml | 24.8 (9.7, 48.9) | 20.9 (9.2, 39.3) | 6.0 (3.7, 9.3) |

| Biomarker | Medium tertile | High tertile | Reference range[a] |
|---|---|---|---|
| SAA, ng/l | 18549.5 (11 832.0, 30 082.0) | 174 900.0 (105 200.0, 256 000.0) | 1000.0-9249.3 |
| CRP, mg/l | 8.5 (6.9, 13.1) | 37.6 (27.9, 65.1) | ≤2.9 |
| Lp(a), mg/l | 192.0 (157.0, 236.0) | 689.5 (450.0, 1116.0) | 19.0-1028.0 |
| MMP-3, ng/ml | 42.8 (35.5, 54.1) | 99.9 (77.0, 154.3) | 6.0-15.8 |
| Total RANKL, pmol/l | 515.0 (424.3, 674.0) | 2252.8 (1417.6, 3657.6) | 35.1-639.7 |
| P1NP, ng/ml | 45.6 (41.6, 50.1) | 73.2 (63.0, 87.6) | 47.9-204.1 |
| OPG, pmol/l | 5.9 (5.6, 6.5) | 8.8 (7.7, 10.5) | 3.6-7.9 |
| OC, ng/ml | 18.6 (16.8, 21.1) | 28.9 (26.0, 35.6) | 13.9-30.6 |
| CXCL13, pg/ml | 116.4 (98.2, 130.6) | 236.8 (180.8, 323.9) | 37.8-153.6 |
| sICAM-1, ng/ml | 257.7 (239.7, 272.3) | 339.4 (313.7, 380.0) | 186.0-331.0 |
| Iron μmol/l | 10.9 (9.8, 12.2) | 17.2 (15.5, 20.3) | 10.8-28.9 |
| Ferritin, ng/ml | 76.7 (60.5, 93.5) | 204.3 (154.9, 283.4) | 18.6-148.3 |
| TIBC, μg/dl | 322.0 (313.0, 332.0) | 373.0 (357.0, 397.0) | 247.2-363.0 |
| Hepcidin, ng/ml | 23.0 (17.0, 28.9) | 62.4 (43.9, 77.0) | 0.6-46.4 |

Data presented as median (Q1, Q3) at baseline. Reference range for CRP is based on population of healthy men and women (reference range provided by Covance); for all other biomarkers, reference range is based on healthy post-menopausal women (5th-95th percentile; reference ranges provided by Bioclinica).
*Unadjusted Wilcoxon test P-value <5%. CRP: C-reactive protein; CXCL13: chemokine (C-X-C motif) ligand 13; Lp(a): lipoprotein (a); MMP 3: matrix metalloproteinase-3; OC: osteocalcin; OPG: osteoprotegerin; P1NP: procollagen type 1 N-terminal propeptide; Q: quartile; q2w: every 2 weeks; RANKL: receptor activator of nuclear factor-κB ligand; SAA: serum amyloid A; sICAM-1: soluble intercellular adhesion molecule-1; TIBC: total iron-binding capacity.

Biomarkers were analyzed retrospectively (except CRP) at one or two post-baseline timepoints through week 24 (Table 2). Timepoints selected for analysis were based on either previous data following sarilumab treatment or on literature suggesting either acute or latent effects of RA therapy on specific markers. The assay characteristics for most biomarkers have been described previously (Gabay C, 2018).

TABLE 2

Individual serum biomarker assessment schedule

| Function | Biomarker | Baseline | Week 2 | Week 4 | Week 8 | Week 12 | Week 16 | Week 20 | Week 24 |
|---|---|---|---|---|---|---|---|---|---|
| Acute-phase response | SAA | X | | | | X | | | X |
| | CRP | X | X | X | X | X | X | X | X |

TABLE 2-continued

Individual serum biomarker assessment schedule

| Function | Biomarker | Baseline | Week 2 | Week 4 | Week 8 | Week 12 | Week 16 | Week 20 | Week 24 |
|---|---|---|---|---|---|---|---|---|---|
| Atherothrombosis | Lp(a) | X | | | | X | | | X |
| Synovial inflammation | MMP-3 | X | | | | | | | X |
| Bone remodeling | Total RANKL | X | X | | | | | | X |
| | P1NP | X | | | | | | | X |
| | OPG | X | X | | | | | | X |
| | Osteocalcin | X | | | | | | | X |
| Marker reflecting synovial lymphoid cell infiltrate | CXCL13 | X | X | | | | | | X |
| Marker reflecting synovial myeloid cell infiltrate | sICAM-1 | X | X | | | | | | X |
| Anemia of chronic disease | Iron | X | X | | | | | | |
| | Ferritin | X | X | | | | | | |
| | TIBC | X | X | | | | | | |
| | Hepcidin | X | X | | | | | | |

CRP: C-reactive protein; CXCL13: chemokine (C-X-C motif) ligand 13; Lp(a): lipoprotein (a); MMP-3: matrix metalloproteinase-3; OPG: osteoprotegerin; P1NP: procollagen type 1 N-terminal propeptide; RANKL: receptor activator of nuclear factor-κB ligand; SAA: serum amyloid A; sICAM-1: soluble intercellular adhesion molecule-1; TIBC: total iron-binding capacity Statistical Analysis Baseline biomarker levels were compared between treatment groups using a Wilcoxon test. Spearman's ranked correlations at baseline were computed in the overall biomarker population. To evaluate pharmacodynamic changes in circulating biomarker concentrations between treatment groups at each timepoint, absolute and percentage changes from baseline were described. In addition, the percentage changes in biomarker concentrations were analyzed using non-parametric methods because of non-normal distributions. For biomarkers measured once postbaseline, a rank-based analysis of covariance (ANCOVA) adjusted on baseline value was implemented. For biomarkers measured twice post-baseline, a mixed-effect model with repeated measures was performed on rank-transformed data (analysis of variance [ANOVA]-type method), with treatment, visit and treatment-by-visit interaction as fixed effects, baseline biomarker value transformed in rank, baseline biomarker value transformed in rank-by-visit interaction as fixed covariates, assuming an unstructured covariance structure. P-values were adjusted for false discovery rate (Benjamini-Hochberg 5% threshold). The number of patients with abnormal biomarker levels at baseline (according to the reference ranges provided by the testing laboratory) that normalized with treatment was compared between groups using a $\chi^2$ test; unadjusted P-values are reported.

Percentage changes in biomarker concentrations at week 24 were compared between clinical responders and non-responders at the same visit within each treatment group using similar non-parametric methods. P-values were also adjusted for false discovery rate.

For binary efficacy endpoints, predictive effects of baseline biomarker values on sarilumab efficacy vs adalimumab were tested using a logistic regression with treatment group and region as fixed effects, baseline biomarker value as a continuous covariate, and the baseline biomarker-by-treatment group interaction. For continuous PROs, a linear regression was used with the same effects as above, as well as the baseline PRO value as a covariate. Unadjusted P-values for the interaction are reported to assess the predictive value of the biomarkers. Similar analyses were performed after categorization of patients into high, medium and low biomarker levels at baseline using tertile values in the biomarker population. In addition, pairwise comparisons of responses between sarilumab and adalimumab were performed separately in patients with high, medium and low biomarker levels, and the Mantel-Haenszel estimates of odds ratios (ORs), stratified by region, and 95% confidence intervals (CIs) were derived and graphically represented using forest plots. For continuous PROs, a linear regression was performed separately in each biomarker tertile and differences in least squares mean (LSM) changes with 95% CI between both treatments were provided.

Differential combinations of circulating CXCL13 and sICAM-1 (low or high levels defined relative to baseline median levels) were assessed for prediction of response to sarilumab, using Mantel-Haenszel estimates of ORs derived for each combination.

All analyses were performed using SAS version 9.2 or higher (SAS Institute Inc., Cary, NC, USA).

Biomarker Analysis

All biomarker serum concentrations, except C-reactive protein (CRP), were analyzed retrospectively using a validated proprietary enzyme-linked immunosorbent assay (ELISA) at Bioclinica Lab (Lyon, France). CRP was assessed at Covance Laboratories (Indianapolis, IN, USA, Geneva, Switzerland or Singapore) using the Siemens high-sensitivity CRP nephelometry assay. The intra-assay precision was <3%, inter-assay precision was <5.4%, and the reference range for healthy controls was ≤2.87 mg/l. Serum levels of chemokine (C-X-C motif) ligand 13 and soluble intercellular adhesion molecule-1 were assessed using an ELISA (Quantikine® ELISA kit, R&D Systems, Minneapolis, MN, USA), with inter-assay coefficient of variation (CV)<8% and intra-assay CV<15%. Serum procollagen type 1 N-terminal propeptide (P1NP) was measured using the Roche Modular S P1NP assay, with intra- and inter-assay CVs<7%. Serum amyloid A was measured using an ELISA (Anogen) with intra- and inter-assay CVs<7%. Ferritin was measured using the Roche Modular Serum Ferritin assay, with intra- and inter-assay CVs<3%. Total iron-binding capacity was measured using a Kone 20 analyser, Konelab (Total Iron-Binding Capacity [RANDOX]) with intra- and inter-assay CVs<5.5% and <4.7%, respectively. Serum levels of iron were measured using a Kone 20 analyzer, Konelab (Iron [Thermo Scientific]) with intra- and inter-assay CVs<7.8% and <6%, respectively. Hepcidin levels were measured using an ELISA (Human Hepcidin 25 (bioactive) HS ELISA [DRG]) with intra- and inter-assay CVs<9.6% and <8.1%, respectively. Biomarker levels below the lower limit of quantification (LLOQ) were replaced by LLOQ/2 in all analyses, and those above upper limit of quantification (ULOQ) by ULOQ.

Baseline Demographics, Disease Characteristics, Efficacy and Biomarker Levels

Baseline demographics and disease characteristics of the biomarker population were generally similar to the overall intent-to-treat (ITT) population (Table 2). Overall, efficacy and PROs were also generally similar between the ITT and biomarker populations (Table 3).

TABLE 3

Efficacy and PROs at week 24 in the biomarker and ITT populations

|  | ITT population | | Biomarker population | |
|---|---|---|---|---|
|  | Adalimumab 40 mg q2w (n = 185) | Sarilumab 200 mg q2w (n = 184) | Adalimumab 40 mg q2w (n = 154) | Sarilumab 200 mg q2w (n = 153) |
| Efficacy results at week 24[a] | | | | |
| ACR20 responders, % | 58.4 | 71.7 | 59.1 | 73.9 |
| ACR50 responders, % | 29.7 | 45.7 | 29.2 | 49.7 |
| ACR70 responders, % | 11.9 | 23.4 | 12.3 | 25.5 |
| ΔDAS28-ESR | −2.2 (1.4) | −3.4 (1.4) | −2.3 (1.3) | −3.4 (1.3) |
| DAS28-ESR < 2.6, % | 7.0 | 26.6 | 8.4 | 27.5 |
| DAS28-ESR < 3.2, % | 14.1 | 42.9 | 15.6 | 43.8 |
| ΔDAS28-CRP | −2.1 (1.2) | −2.9 (1.3) | −2.1 (1.3) | −3.0 (1.2) |
| DAS28-CRP < 2.6, % | 13.5 | 34.2 | 13.0 | 34.6 |
| DAS28-CRP < 3.2, % | 24.3 | 51.6 | 24.0 | 52.3 |
| ΔTJC | −16.4 (12.0) | −19.0 (13.3) | −16.6 (12.3) | −19.4 (12.5) |
| ΔSJC | −12.2 (9.1) | −14.3 (9.6) | −12.1 (8.9) | −14.6 (9.8) |
| ΔCDAI | −25.5 (12.9) | −29.7 (12.7) | −25.9 (13.3) | −30.2 (12.0) |
| CDAI ≤ 2.8, % | 2.7 | 7.1 | 3.2 | 7.2 |
| CDAI ≤ 10, % | 24.9 | 41.8 | 24.7 | 43.1 |
| ΔPhysician global VAS (0-100 mm) | −37.3 (22.5) | −45.3 (21.4) | −37.6 (22.8) | −45.7 (20.5) |
| PROs at week 24[a] | | | | |
| ΔHAQ-DI | −0.4 (0.6) | −0.6 (0.7) | −0.4 (0.6) | −0.7 (0.7) |
| ΔFACIT-Fatigue (0-52) | 8.2 (10.4) | 10.4 (10.2) | 8.4 (10.3) | 11.3 (10.0) |
| ΔPatient global VAS (0-100 mm) | −25.0 (25.2) | −33.5 (26.2) | −25.5 (24.9) | −33.8 (26.3) |
| ΔPain VAS (0-100 mm) | −27.9 (24.7) | −36.4 (26.9) | −28.0 (24.4) | −36.9 (27.0) |
| ΔSF-36 PCS | 5.5 (7.1) | 8.6 (7.7) | 5.3 (7.1) | 9.0 (7.6) |
| ΔSF-36 MCS | 7.0 (11.3) | 8.2 (10.8) | 6.9 (11.0) | 8.5 (11.3) |
| ΔMorning stiffness VAS (0-100 mm) | −27.0 (27.4) | −36.1 (27.9) | −26.7 (27.8) | −36.7 (27.3) |
| ΔRAID (0-10) | −2.1 (2.4) | −3.2 (2.4) | −2.1 (2.4) | −3.3 (2.4) |

Mean (standard deviation) unless otherwise stated.
Δ: absolute change from baseline;
ACR20/50/70: American College of Rheumatology 20/50/70% improvement criteria;
CDAI: Clinical Disease Activity Index;
DAS28-CRP: Disease Activity Score (28 joints) using C-reactive protein
DAS28-ESR: Disease Activity Score (28 joints) using erythrocyte sedimentation rate;
FACIT: Functional Assessment of Chronic Illness Therapy;
HAQ-DI: Health Assessment Questionnaire-Disability Index;
ITT: intent-to-treat;
MCS: mental component summary;
PCS: physical component summary;
PRO: patient-reported outcome;
q2w: every 2 weeks;
RAID: rheumatoid arthritis impact of disease;
SJC: swollen joint count;
TJC: tender joint count;
VAS: visual analogue scale.

Baseline serum levels of most biomarkers were similar between treatment groups, except for Lp(a), which was higher in the adalimumab than the sarilumab groups (Lp[a]: median 235.5 vs 179.0 mg/l, respectively; Wilcoxon test P-value: 0.039; Table 1).

Figure 1B:
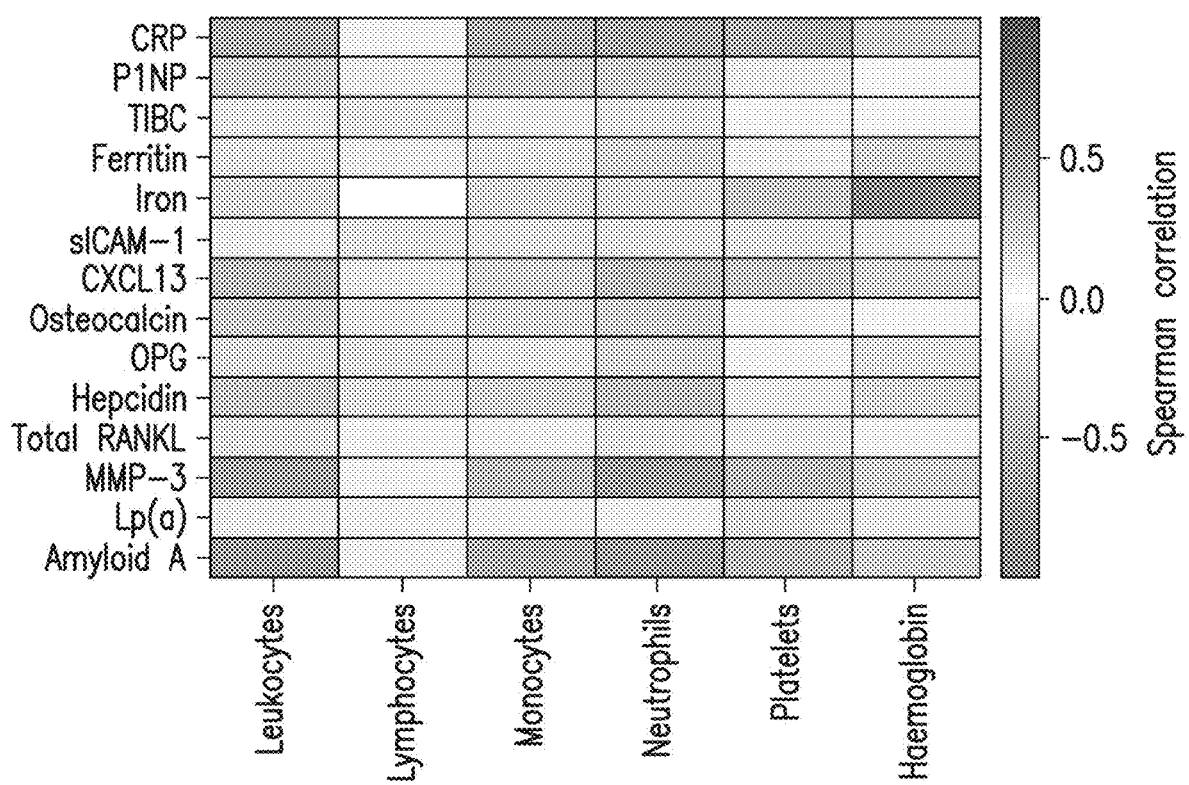

Correlations between individual biomarkers at baseline were generally low or moderate ($\rho<0.5$; FIG. 1A). Correlation coefficients above 0.7 were observed for markers of inflammation (CRP and SAA; $\rho=0.81$), bone formation (P1NP and OC; $\rho=0.82$), and anemia of chronic disease (ferritin and hepcidin; $\rho=0.74$), as expected. Moderate correlations were observed between baseline CRP, SAA or MMP-3 with differential blood counts (leucocytes and neutrophils; $\rho$ from 0.4 to 0.5), and, as expected, between iron and haemoglobin ($\rho=0.57$; FIG. 1B).

Pharmacodynamic Effects of Treatment on Biomarkers

Figure 2A:
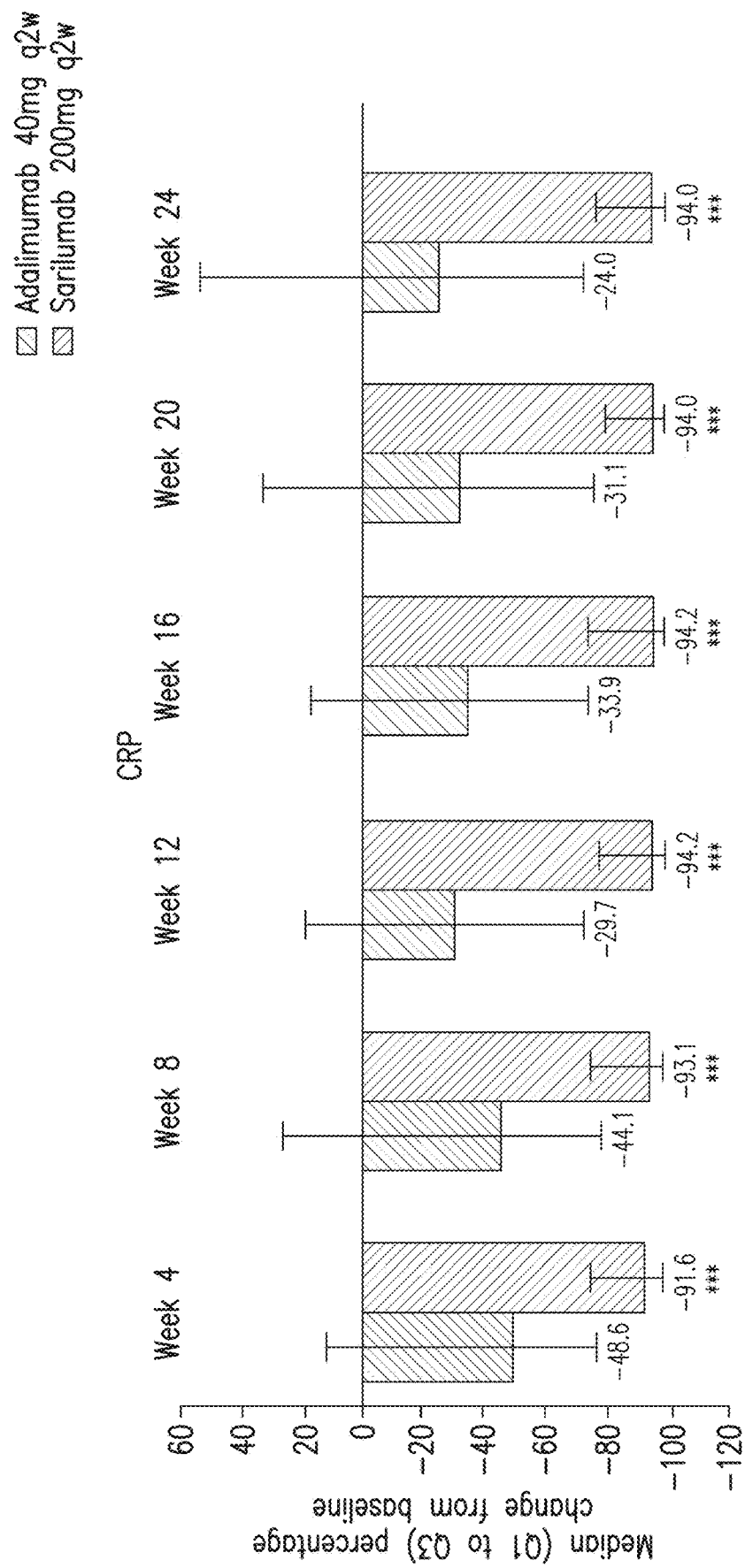
FIGS. 2A-2C depict the median percentage changes from baseline in biomarkers through week 24. Median percentage changes from baseline in biomarkers of (FIGS. 2A and 2B) the acute-phase response (CRP and SAA) and (FIG. 2C) bone remodeling (P1NP). *Adjusted P<0.05; adjusted P<0.01 vs adalimumab; *adjusted P<0.0001 vs adalimumab (Benjamini-Hochberg procedure). CRP: C-reactive protein; P1NP: procollagen type 1 N-terminal propeptide; q2w: every 2 weeks; SAA: serum amyloid A.
Figure 2C:
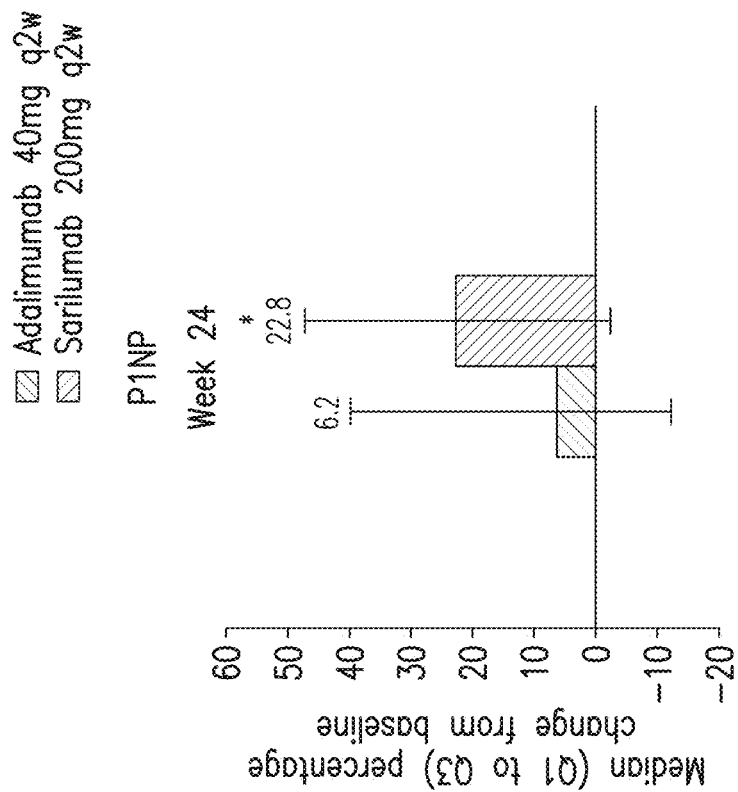
Figure 2B:
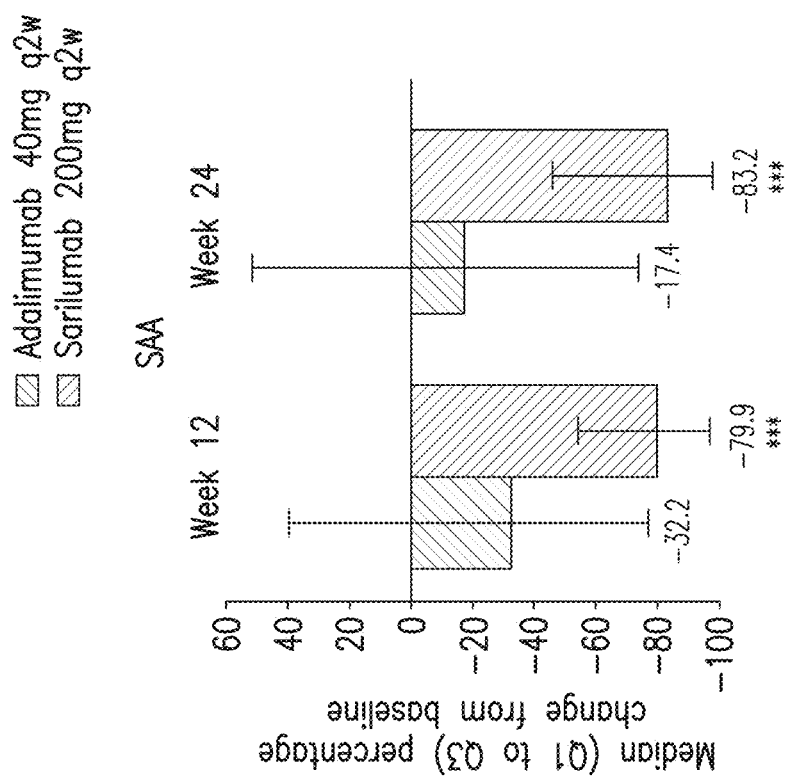

To compare the effects of sarilumab and adalimumab treatment on biomarkers over time, the absolute (Table 4) and percentage changes from baseline in biomarker concentrations were analyzed up to week 24. Greater reductions in biomarkers associated with the acute-phase response were observed at weeks 12 and 24 following treatment with sarilumab vs adalimumab (adjusted $P<0.0001$; FIGS. 2A and 2B). Reductions in CRP were observed as early as week 4 with sarilumab vs adalimumab and were sustained throughout the treatment period (FIG. 2A).

TABLE 4

Absolute change from baseline in biomarker concentrations through week 24

| Median absolute change from baseline (Q1, Q3) | | Week 2 | Week 12 | Week 24 |
|---|---|---|---|---|
| SAA, ng/ml | Adalimumab 40 mg q2w | — | −2442.7 (−22330.7, 1930.9) | −476.4 (−19654.3, 3342.1) |
| | Sarilumab 200 mg q2w | — | −9066.5 (−80132.7, −1902.8) | −9604.7 (−79255.8, −1398.0) |
| CRP, mg/l | Adalimumab 40 mg q2w | — | −1.3 (−13.7, 1.3) | −1.3 (−13.7, 3.5) |
| | Sarilumab 200 mg q2w | — | −6.8 (−22.9, −1.6) | −6.6 (−22.8, −1.3) |
| Lp(a), mg/l | Adalimumab 40 mg q2w | — | −2.0 (−54.0, 28.0) | −4.5 (−40.0, 28.0) |
| | Sarilumab 200 mg q2w | — | −59.0 (−134.0, −13.0) | −60.3 (−157.0, −21.0) |
| MMP-3, ng/ml | Adalimumab 40 mg q2w | — | — | −5.6 (−23.6, 6.3) |
| | Sarilumab 200 mg q2w | — | — | −6.8 (−33.1, 1.4) |
| Total RANKL, pmol/l | Adalimumab 40 mg q2w | 15.9 (−7.2, 129.1) | — | 31.5 (−93.5, 223.2) |
| | Sarilumab 200 mg q2w | −10.5 (−69.5, 31.0) | — | −76.8 (−438.5, 20.4) |
| P1NP, ng/ml | Adalimumab 40 mg q2w | — | — | 2.0 (−5.5, 13.5) |
| | Sarilumab 200 mg q2w | — | — | 8.6 (−0.8, 18.7) |
| OPG, pmol/l | Adalimumab 40 mg q2w | −0.2 (−0.7, 0.3) | — | 0.2 (−0.6, 0.9) |
| | Sarilumab 200 mg q2w | 0.1 (−0.5, 0.7) | — | 0.1 (−0.7, 0.7) |
| OC, ng/ml | Adalimumab 40 mg q2w | — | — | 0.9 (−1.7, 5.1) |
| | Sarilumab 200 mg q2w | — | — | 2.4 (−1.4, 5.7) |
| CXCL13, pg/ml | Adalimumab 40 mg q2w | −45.4 (−81.7, −22.9) | — | −30.5 (−65.7, −1.5) |
| | Sarilumab 200 mg q2w | −12.8 (−41.0, 5.6) | — | −35.7 (−80.5, −4.5) |
| sICAM-1 | Adalimumab 40 mg q2w | −23.2 (−37.8, −9.3) | — | −10.8 (−41.7, 14.4) |
| | Sarilumab 200 mg q2w | −0.7 (−15.6, −12.8) | — | −11.0 (−36.7, 1.9) |
| Iron, μmol/l | Adalimumab 40 mg q2w | 1.4 (−0.6, 4.5) | — | — |
| | Sarilumab 200 mg q2w | 3.7 (0.5, 8.3) | — | — |
| Ferritin, ng/ml | Adalimumab 40 mg q2w | −8.5 (−31.7, 0.5) | — | — |
| | Sarilumab 200 mg q2w | −7.7 (−26.4, 0.1) | — | — |
| TIBC, μg/dl | Adalimumab 40 mg q2w | 9.0 (−2.0, 22.0) | — | — |
| | Sarilumab 200 mg q2w | 20.0 (5.0, 35.0) | — | — |
| Hepcidin, ng/ml | Adalimumab 40 mg q2w | −5.8 (−19.1, −0.1) | — | — |
| | Sarilumab 200 mg q2w | −3.3 (−16.3, 0.4) | — | — |

Figure 3B:
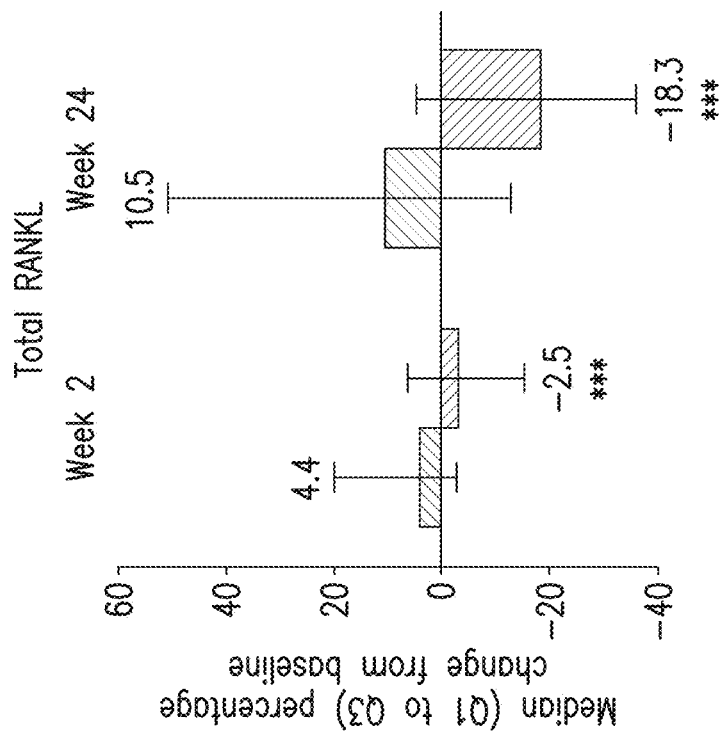
FIGS. 3A-3D depict the median percentage changes from baseline in biomarkers through week 24. Median percentage changes from baseline in biomarkers of (FIGS. 3A-3C) bone remodeling (OC, total RANKL and OPG), (FIG. 3D) synovial inflammation (MMP-3). *Adjusted P<0.05; adjusted P<0.01 vs adalimumab; *adjusted P<0.0001 vs adalimumab (Benjamin-Hochberg procedure). MMP-3: matrix metalloproteinase-3; OC: osteocalcin; OPG: osteoprotegerin; q2w: every 2 weeks; RANKL: receptor activator of nuclear factor-κB ligand.
Figure 3A:
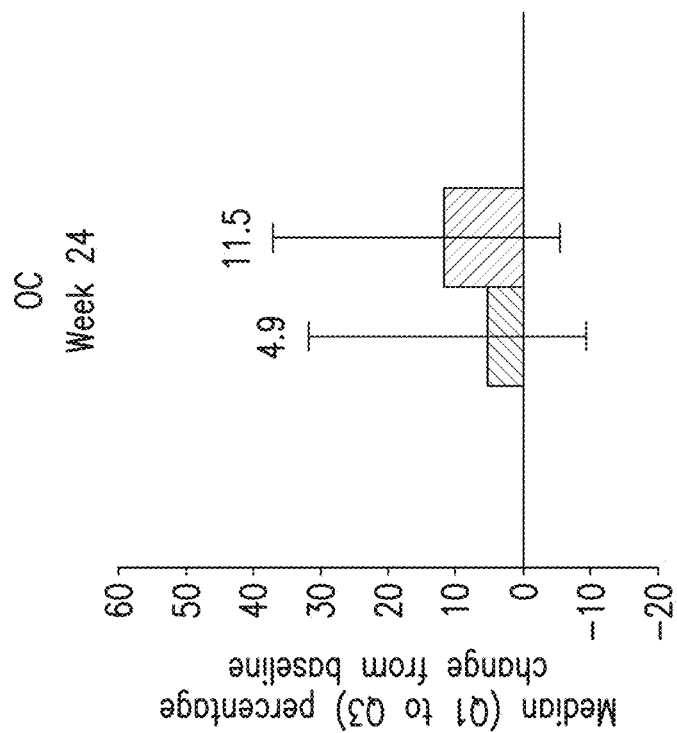
Figure 3D:
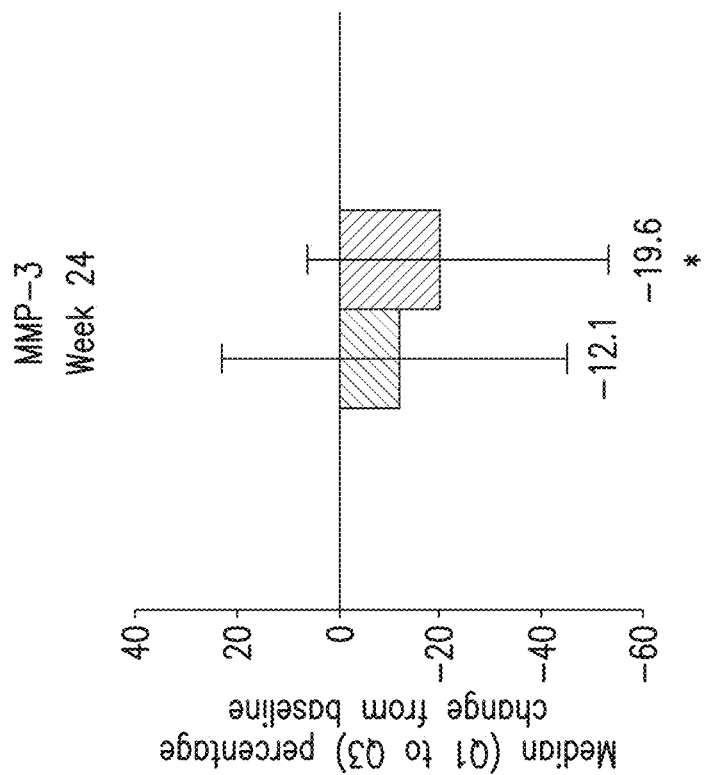
Figure 3C:
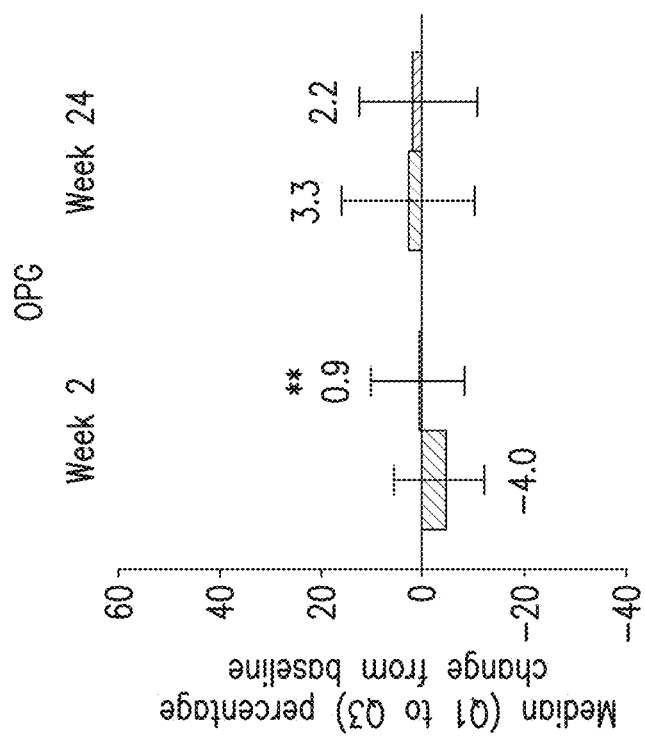

Sample size in the overall biomarker population: adalimumab 40 mg q2w: n = 154, sarilumab 200 mg q2w: n = 153.
CRP: C-reactive protein;
CXCL13: chemokine (C-X-C motif) ligand 13;
Lp(a): lipoprotein (a);
MMP 3: matrix metalloproteinase-3;
OC: osteocalcin;
OPG: osteoprotegerin;
P1NP: procollagen type 1 N-terminal propeptide;
Q: quartile;
q2w: every 2 weeks;
RANKL: receptor activator of nuclear factor-κB ligand;
SAA: serum amyloid A;
sICAM-1: soluble intercellular adhesion molecule-1;
TIBC: total iron-binding capacity At week 24, sarilumab treatment increased concentrations of P1NP, a marker of osteoblast activation, compared with adalimumab (adjusted P=0.027; FIG. 2C). A numeric increase in OC, another marker of osteoblast activity, was also observed in sarilumab- vs adalimumab-treated patients (FIG. 3A). Furthermore, reductions in total RANKL, a marker of bone resorption, were observed as early as week 2 with sarilumab compared with adalimumab and persisted through week 24 (adjusted P<0.0001; FIG. 3B); in addition, a numeric increase in total RANKL was observed after adalimumab treatment. A transient decrease in OPG, a decoy for RANKL, was observed after adalimumab treatment at week 2 but did not persist through week 24 (FIG. 3C). Additionally, greater reductions in MMP-3 were observed with sarilumab at week 24 (adjusted P=0.020; FIG. 3D).

Figure 4:
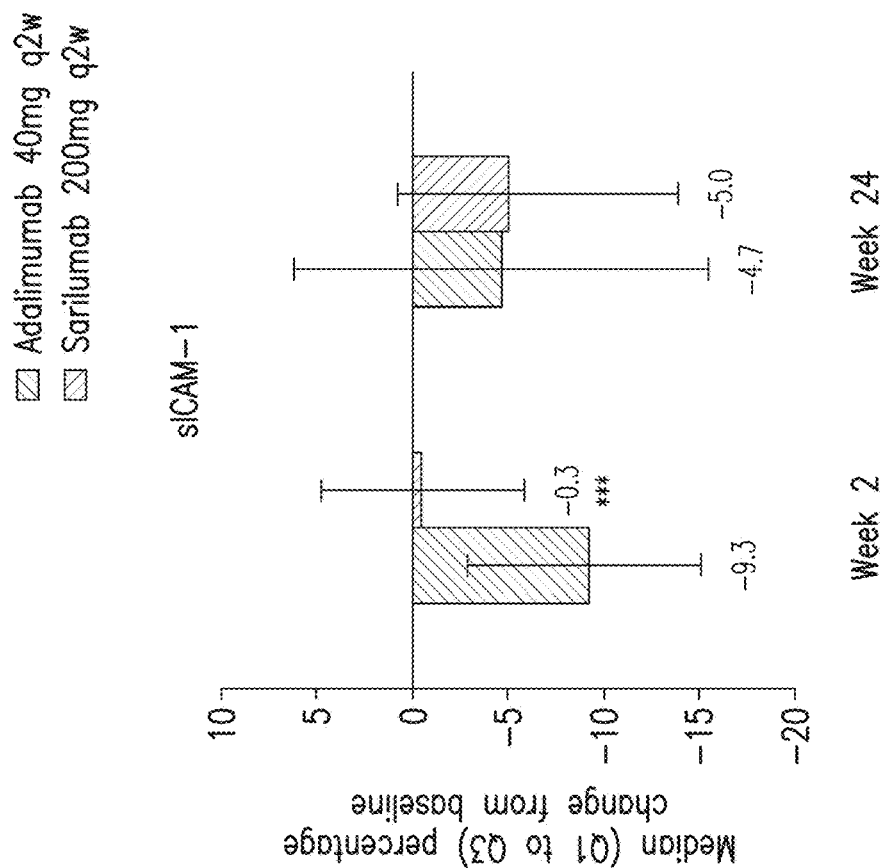
FIG. 4 depicts the median percentage changes from baseline CXCL13 and sICAM-1 through week 24. ***Adjusted P<0.0001 vs adalimumab (Benjamini-Hochberg procedure). CXCL13: chemokine (C X-C motif) ligand 13; Q: quartile; q2w: every 2 weeks; sICAM-1: soluble intercellular adhesion molecule-1.
Figure 4:
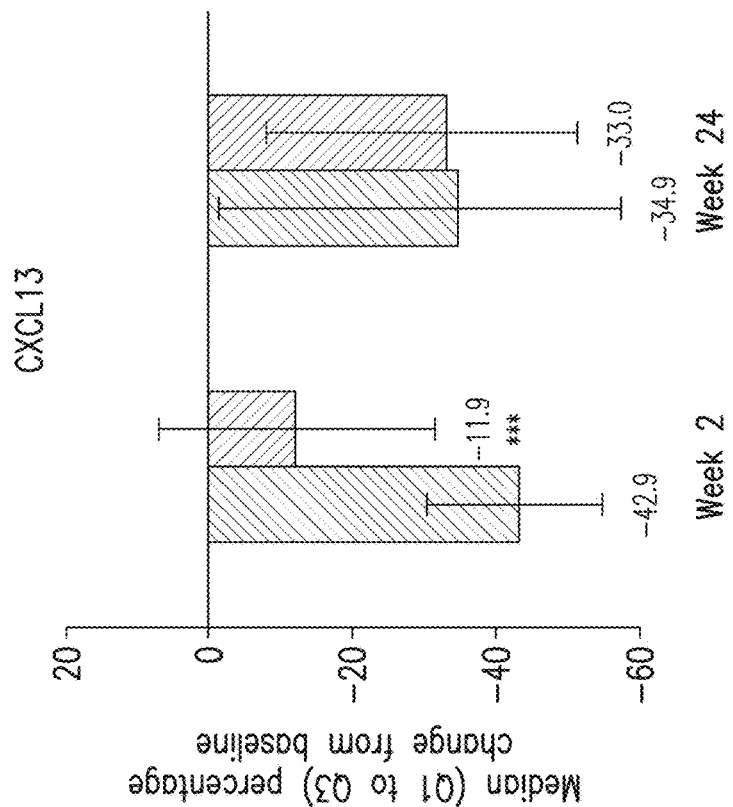
Figure 5B:
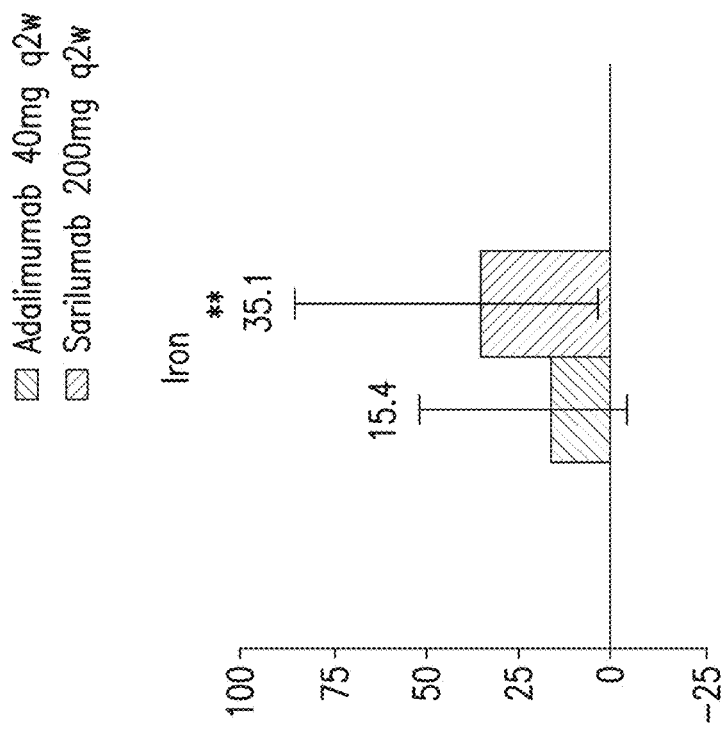
FIGS. 5A-5D depict the median percentage changes from baseline in biomarkers of anemia of chronic disease 2 weeks post-treatment. Median percentage changes from baseline in (FIG. 5A) hepcidin, (FIG. 5B) iron, (FIG. 5C) ferritin, and (FIG. 5D) TIBC at week 2 post-treatment. *Adjusted P<0.0001 vs adalimumab (Benjamini-Hochberg procedure). Adjusted P<0.01 vs adalimumab (Benjamini-Hochberg procedure). Q: quartile; q2w: every 2 weeks; TIBC: total iron-binding capacity.
Figure 5A:
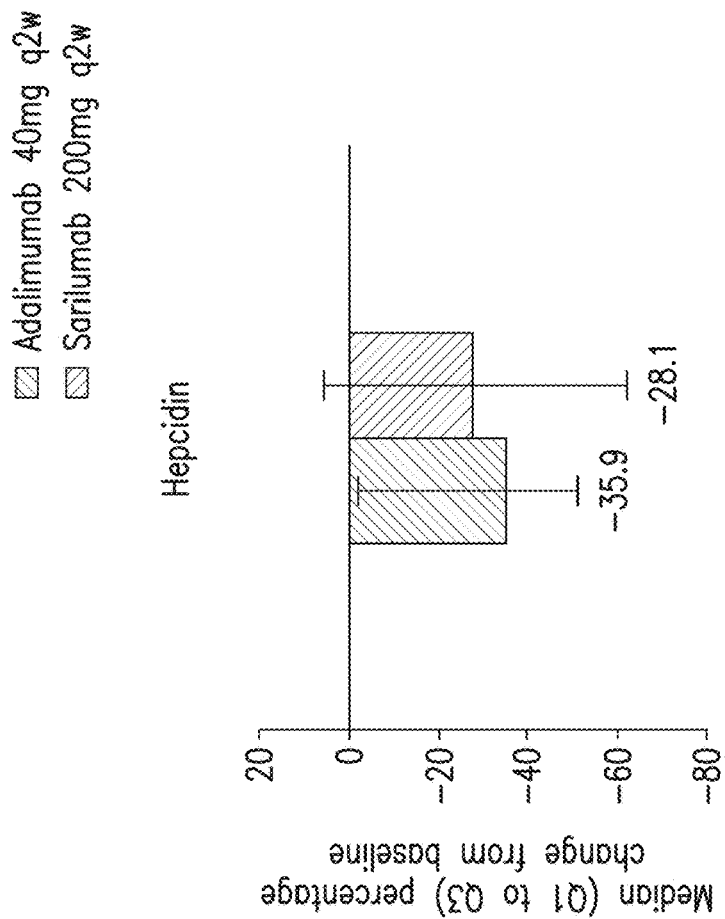
Figures 5C, 5D:
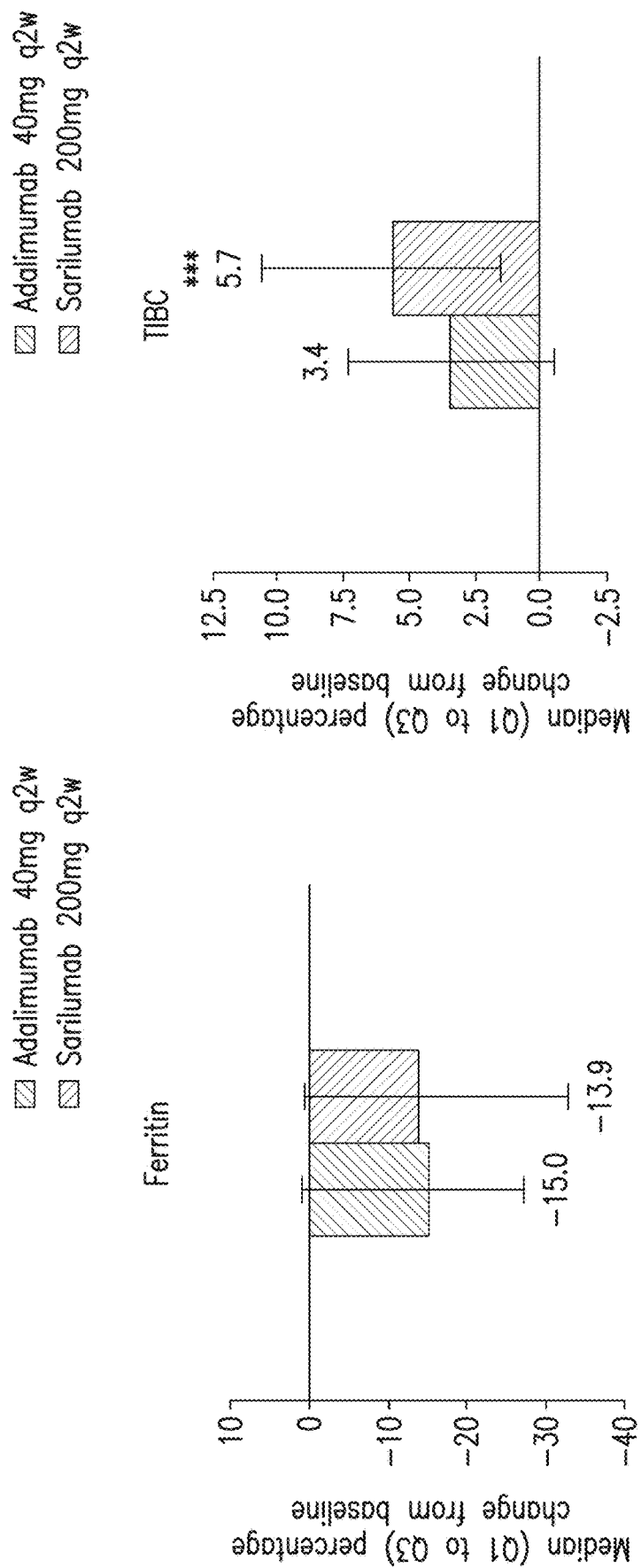

The effects of sarilumab and adalimumab on biomarkers associated with markers purported to reflect synovial lymphoid and myeloid cell infiltrates, CXCL13 and sICAM-1, respectively, were also examined. While greater reductions in these biomarkers were observed 2 weeks post-treatment with adalimumab vs sarilumab, these effects did not persist through week 24 (FIG. 4).

Figure 6A:
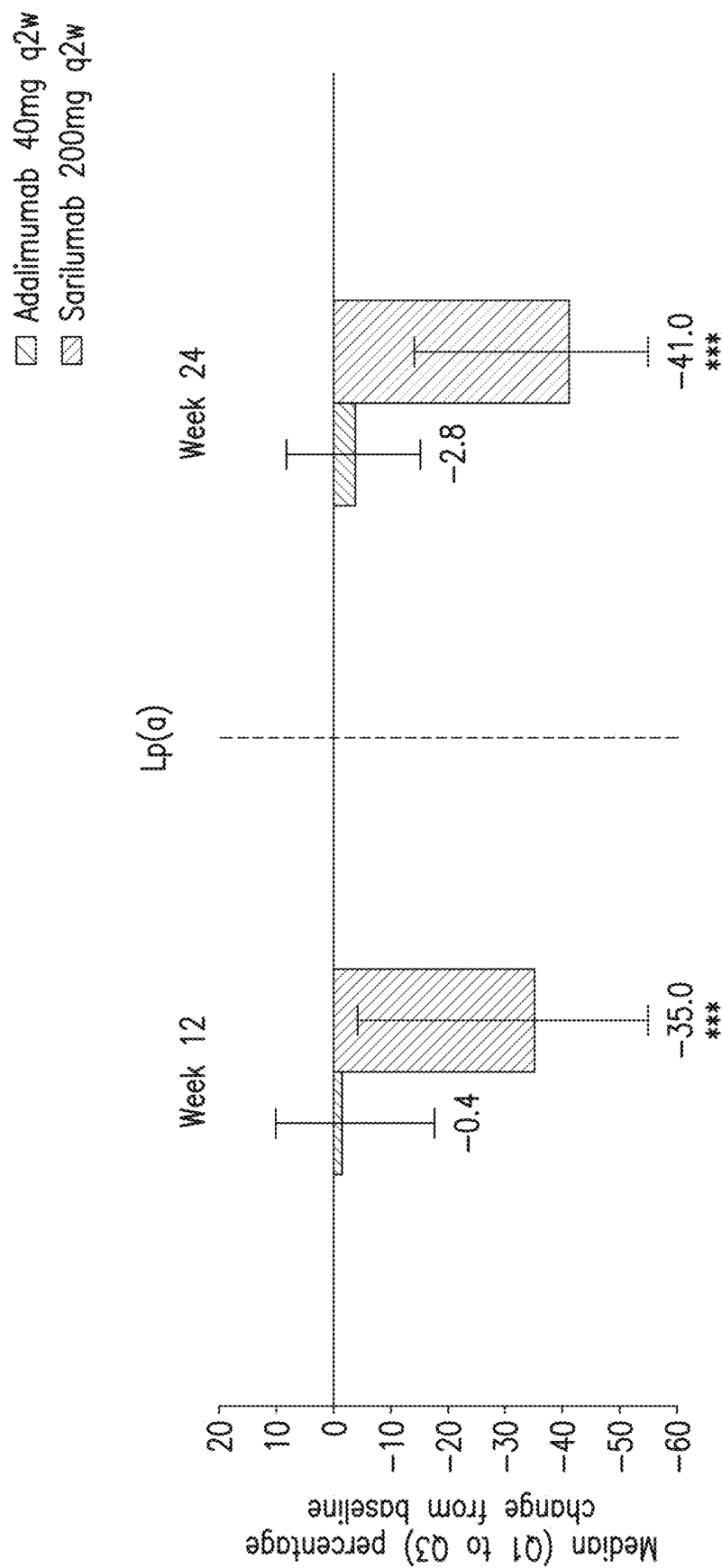
FIGS. 6A-6B depict (FIG. 6A) the median percentage changes from baseline in atherothrombosis (Lp[a]) through week 24 and (FIG. 6B) the proportions of patients whose biomarker values returned to normal reference ranges at week 24.

We also examined the effects of treatment on parameters associated with anemia of chronic disease. In the ITT population (Burmester G R, Arthritis Rheumatol 2018; 70), sarilumab resulted in larger increases in haemoglobin levels vs adalimumab at week 24 (LSM changes from baseline 0.59 vs 0.08 g/dl; LSM difference 0.52 g/dl [95% CI: 0.32, 0.71; nominal P<0.001]). In this analysis, reductions in hepcidin and ferritin were observed at week 2 with both sarilumab and adalimumab. In contrast, increases in iron and TIBC were observed with sarilumab relative to adalimumab at week 2 post-treatment (FIGS. 5A-5D). Reductions in the lipid particle Lp(a) were observed with sarilumab vs adalimumab at week 24 (adjusted P<0.0001; FIG. 6A).

Figure 6B:
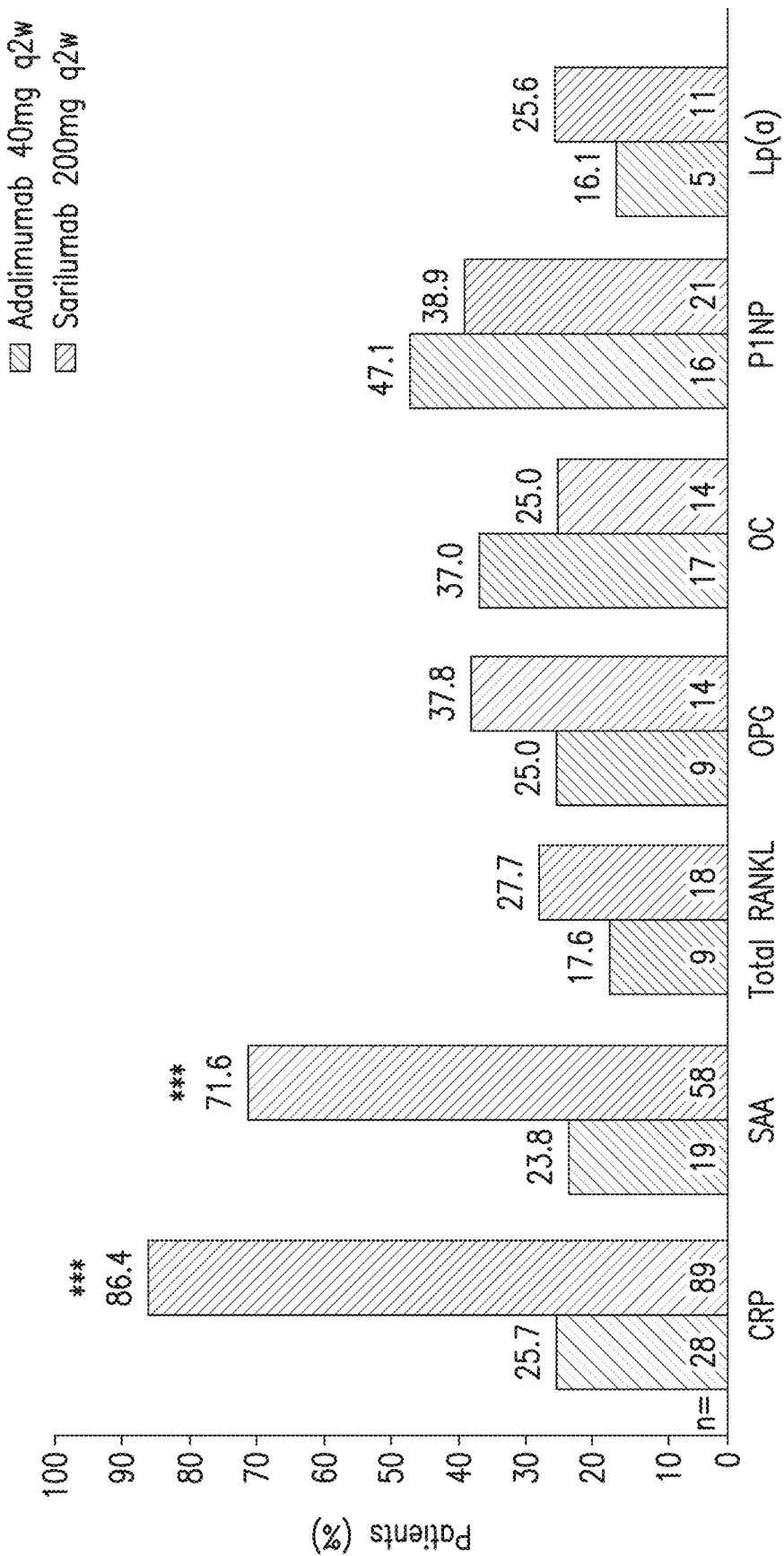

A subset of patients had abnormal baseline biomarker levels relative to reference ranges. In these patients, normalization of CRP and SAA was evident in a greater percentage treated with sarilumab than adalimumab at week 24 (unadjusted P<0.0001). Normalization of total RANKL, OPG and Lp(a) occurred in a numerically greater percentage of patients treated with sarilumab vs adalimumab at week 24 (FIG. 6B).

Relationship Between Changes in Biomarker Levels and Clinical Responses

To establish whether post-treatment changes in biomarker levels at week 24 were associated with clinical efficacy, changes were compared between sarilumab- and adalimumab-treated responders and non-responders. Median percentage changes at week 24 in total RANKL, OPG, P1NP, OC and Lp(a) did not differ greatly between responders and non-responders (data not shown). However, reductions in SAA from baseline at week 24 were greater in adalimumab ACR20 and DAS28-CRP<3.2 responders than non-responders (−33.3% vs 0.0%, respectively; nominal P=0.0038 and −39.2% vs 0.0%, respectively; nominal P=0.0061, respectively). Greater reductions in MMP-3 were also observed in adalimumab ACR20 responders vs non-responders (−23.6% vs 17.1%, respectively; nominal P<0.0001). Associations between clinical efficacy and changes from baseline in SAA and MMP-3 were not observed in sarilumab-treated patients, and although both responders and non-responders had a ≥90% reduction in CRP, the P-values for comparisons of responders vs non-responders were <0.05 across several parameters, including ACR20/50, DAS28-CRP<3.2 and DAS28-CRP<2.6 (data not shown).

Correlations Between Biomarkers and Disease Activity and PROs at Baseline

The strongest correlations between baseline biomarkers and baseline disease activity were observed for SAA and CRP with DAS28-ESR (ρ=0.26 and 0.31, respectively) and for CRP, SAA, MMP-3, hepcidin and CXCL13 with DAS28-CRP (ρ from 0.36 to 0.58). None of the biomarkers correlated with baseline PROs (all ρ<0.3).

Predictive Analysis of Baseline Biomarker Levels on Clinical Responses and PROs

Figure 7A:
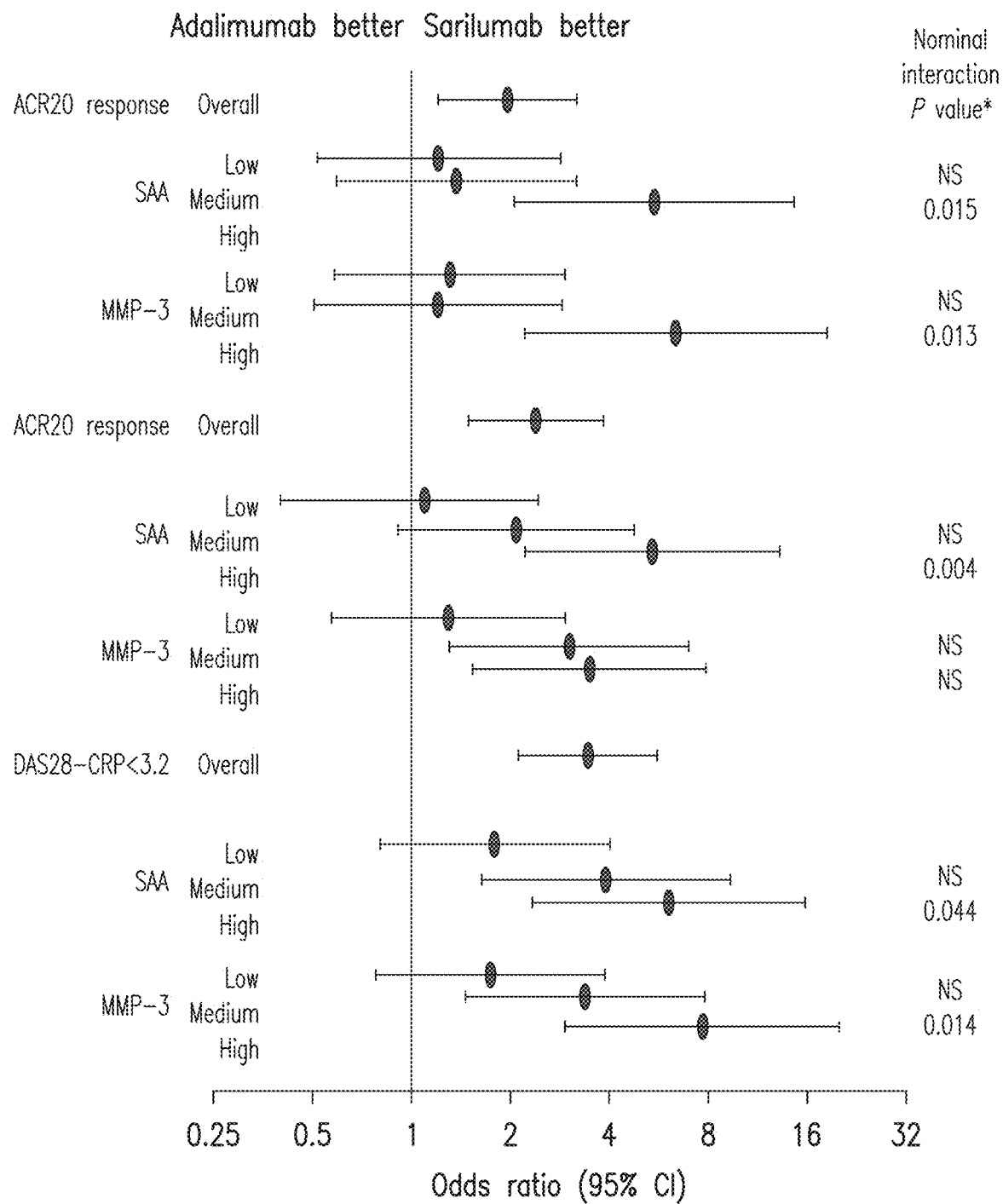
FIGS. 7A-7B depict (FIG. 7A) the odds ratios for achieving efficacy endpoints at week 24 by baseline biomarker tertiles and (FIG. 7B) the changes from baseline in patient reported outcomes (PROs) at week 24 by baseline biomarker tertiles.

Baseline biomarker levels were analyzed as continuous and categorical measures by tertiles (low, medium and high) because thresholds associated with clinical efficacy are not currently established, and treatment-by-biomarker interaction P-values were calculated to assess the predictivity of the biomarker. Treatment-by-tertile biomarker interactions for efficacy endpoints at week 24 analyzed by baseline biomarkers in tertiles are shown in FIG. 7A and Table 5. Patients with the highest baseline concentrations of SAA who received sarilumab were more likely to achieve ACR20/50/70 or DAS28-CRP<3.2 responses than with adalimumab compared with patients in the low tertile: ACR20 (OR [95% CI] 5.5 [2.1, 14.5]); ACR50 (5.4 [2.2, 13.2]); ACR70 (5.7 [1.8, 18.4]); DAS28-CRP<3.2 (6.1 [2.3, 15.7]) (FIG. 7A and Table 5). SAA was consistently predictive compared with high MMP-3 and CRP, which were only predictive of ACR20 and DAS28-CRP <3.2 response (Table 5). Baseline levels of biomarkers associated with bone remodeling, synovial lymphoid and myeloid cell infiltrates and anemia of inflammation were not predictive of efficacy at week 24, except for hepcidin and CXCL13, which were associated with ACR20 response.

TABLE 5

Treatment-by-tertile biomarker interactions for efficacy endpoints at week 24 analyzed by baseline biomarkers in tertiles

| Efficacy endpoint at week 24 | SAA | | CRP | | MMP-3 | | OPG | | OC | | CXCL13 | | Hepcidin | |
|---|---|---|---|---|---|---|---|---|---|---|---|---|---|---|
| | M/L | H/L | M/L | H/L | M/L | H/L | M/L | H/L | M/L | H/L | M/L | H/L | M/L | H/L |
| ACR20 | NS | 0.015 | NS | 0.039 | NS | 0.013 | NS | NS | 0.031 | NS | NS | 0.003 | NS | 0.021 |
| ACR50 | NS | 0.004 | NS | NS | NS | NS | NS | NS | NS | NS | NS | NS | NS | NS |
| ACR70 | NS | 0.008 | NS | NS | NS | NS | 0.032 | NS | NS | NS | NS | NS | NS | NS |
| DAS28-ESR <2.6 | NS | NS | NS | NS | NS | NS | NS | NS | NS | NS | NS | NS | NS | NS |

TABLE 5-continued

Treatment-by-tertile biomarker interactions for efficacy endpoints at week 24 analyzed by baseline biomarkers in tertiles

| Efficacy endpoint at week 24 | SAA | | CRP | | MMP-3 | | OPG | | OC | | CXCL13 | | Hepcidin | |
|---|---|---|---|---|---|---|---|---|---|---|---|---|---|---|
| | M/L | H/L | M/L | H/L | M/L | H/L | M/L | H/L | M/L | H/L | M/L | H/L | M/L | H/L |
| DAS28-ESR <3.2 | 0.004 | NS | NS | NS | NS | NS | NS | NS | NS | NS | NS | NS | NS | NS |
| DAS28-CRP <2.6 | NS | 0.041 | NS | NS | NS | NS | NS | NS | NS | NS | NS | NS | NS | NS |
| DAS28-CRP <3.2 | NS | 0.044 | NS | 0.049 | NS | 0.014 | NS | NS | NS | NS | NS | NS | NS | NS |

M/L: Nominal treatment-by-biomarker interaction P-value for Medium vs Low tertile; H/L: Nominal treatment-by-biomarker interaction P-value for High vs Low tertile. ACR20/50/70: American College of Rheumatology 20/50/70% responses; CRP: C-reactive protein; CXCL13: chemokine (C-X-C motif) ligand 13; DAS28 CRP: Disease Activity Score (28 joints) C-reactive protein; DAS28-ESR: Disease Activity Score (28 joints) erythrocyte sedimentation rate; MMP-3: matrix metalloproteinase 3; NS: not significant at 5%; OC: osteocalcin; OPG: osteoprotegerin; SAA: serum amyloid A.

Figure 7B:
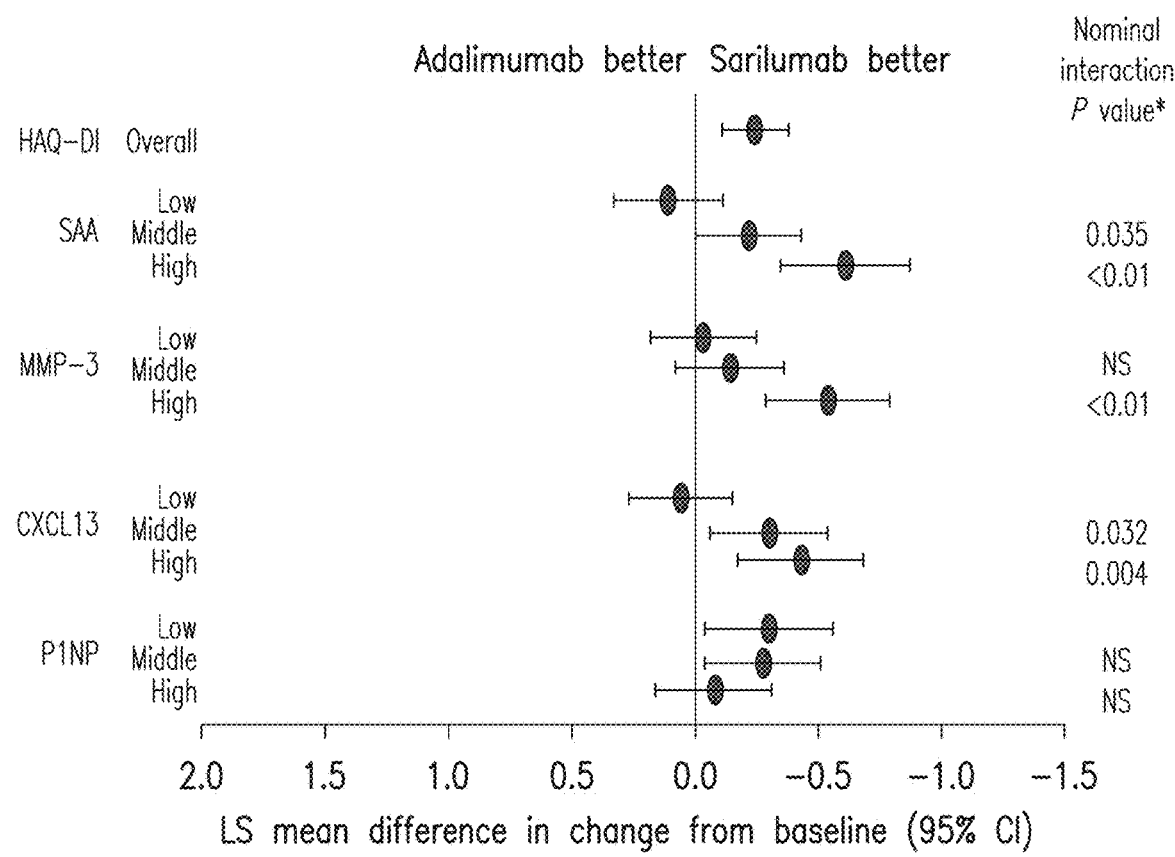
Figure 7B:
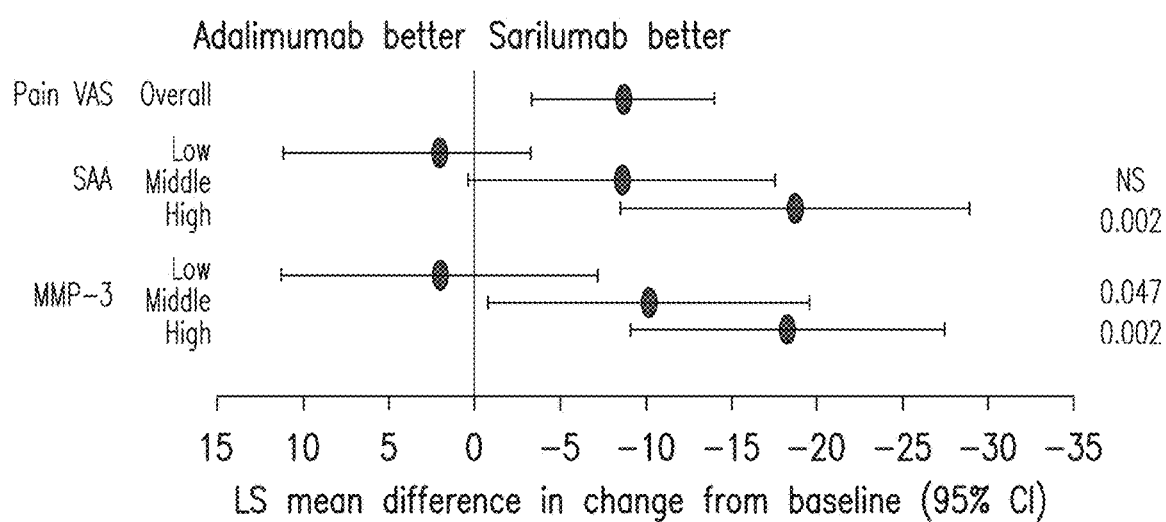

The ability of baseline biomarker levels to predict PRO responses was also analyzed by their respective tertiles and showed that sarilumab-treated patients with higher SAA, MMP-3 and hepcidin levels reported improved PRO responses including HAQ-DI (FIG. 7B top) and pain VAS (FIG. 7B bottom) scores compared with adalimumab-treated patients, as well as patient global VAS, morning stiffness VAS, SF-36 PCS and physical functioning domain and RAID. P-values for these interactions are included in FIG. 7B and Table 6 to demonstrate the differential efficacy predicted by high levels of these biomarkers compared with low levels. Baseline levels of markers associated with anemia of chronic disease (hepcidin, ferritin and iron) were also associated with PRO improvements at week 24 (Table 6). Analysis of biomarkers as continuous measures also revealed interactions for SAA, MMP-3, CRP and P1NP with HAQ-DI at week 24 (interaction nominal P-values<0.01).

TABLE 6

Treatment-by-tertile biomarker interactions for PROs at week 24 analyzed by baseline biomarkers in tertiles

| Change from baseline in PROs at Week 24 | SAA | | CRP | | MMP-3 | | OC | | CXCL13 | | Hepcidin | | s-ICAM1 | | Iron | | Ferritin | |
|---|---|---|---|---|---|---|---|---|---|---|---|---|---|---|---|---|---|---|
| | M/L | H/L | M/L | H/L | M/L | H/L | M/L | H/L | M/L | H/L | M/L | H/L | M/L | H/L | M/L | H/L | M/L | H/L |
| Patient global VAS | NS | 0.011 | 0.002 | 0.040 | NS | 0.010 | NS | NS | NS | NS | NS | 0.009 | NS | NS | NS | NS | NS | NS |
| HAQ-DI | 0.035 | <0.001 | NS | 0.005 | NS | <0.001 | NS | NS | 0.032 | 0.004 | NS | NS | NS | NS | NS | 0.032 | NS | NS |
| Pain VAS | NS | 0.002 | 0.021 | 0.029 | 0.047 | 0.002 | NS | NS | NS | NS | 0.010 | 0.002 | NS | NS | NS | NS | NS | NS |
| SF-36 - PCS score | NS | <0.001 | 0.009 | 0.016 | NS | 0.026 | NS | NS | NS | 0.031 | NS | NS | NS | NS | NS | NS | NS | NS |
| SF-36 - MCS score | NS | NS | NS | NS | NS | NS | NS | NS | NS | NS | 0.030 | 0.023 | NS | NS | NS | NS | NS | 0.050 |
| SF-36 - PF domain | NS | 0.003 | NS | NS | NS | 0.036 | NS | NS | NS | NS | 0.003 | NS | NS | NS | NS | NS | NS | NS |
| SF-36 - BP domain | NS | NS | NS | NS | NS | NS | 0.037 | NS | NS | NS | 0.002 | 0.016 | NS | NS | NS | NS | NS | NS |
| SF-36 - VT domain | NS | NS | NS | NS | NS | NS | NS | NS | NS | NS | 0.043 | 0.005 | NS | NS | NS | NS | NS | NS |
| SF-36 - RE domain | NS | NS | 0.049 | NS | NS | NS | NS | NS | NS | NS | NS | NS | NS | 0.030 | NS | NS | NS | NS |
| SF-36 - MH domain | NS | NS | NS | NS | NS | NS | NS | NS | NS | NS | 0.004 | 0.004 | NS | NS | NS | NS | 0.047 | NS |
| Morning stiffness VAS | NS | 0.004 | 0.002 | 0.017 | NS | <0.001 | NS | NS | NS | NS | 0.029 | <0.001 | NS | NS | NS | NS | NS | NS |
| RAID score | NS | 0.017 | 0.045 | NS | NS | 0.020 | NS | NS | NS | NS | NS | 0.009 | 0.032 | NS | NS | NS | NS | NS |

M/L: Nominal treatment-by-biomarker interaction P-value for Medium vs Low tertile; H/L: Nominal treatment-by-biomarker interaction P-value for High vs Low tertile. BP: bodily pain; CRP: C-reactive protein; CXCL13: chemokine (C-X-C motif) ligand 13; FACIT: Functional Assessment of Chronic Illness Therapy; HAQ-DI: Health Assessment Questionnaire-Disability Index; Lp(a): lipoprotein (a); MCS: mental component summary; MH: mental health; MMP-3: matrix metalloproteinase-3; NS: not significant at 5%; OC: osteocalcin; OPG: osteoprotegerin; P1NP: procollagen type 1 N-terminal propeptide; PCS: physical component summary; PF: physical functioning; RAID: rheumatoid arthritis impact of disease; RANKL: receptor activator of nuclear factor-κB ligand; RE: role-emotional; SAA: serum amyloid A; SF-36: Medical Outcomes Study Short-Form (36-item) Health Survey; sICAM-1: soluble intercellular adhesion molecule-1; TIBC: total iron-binding capacity; VAS: visual analogue scale; VT: vitality.

Figure 8:
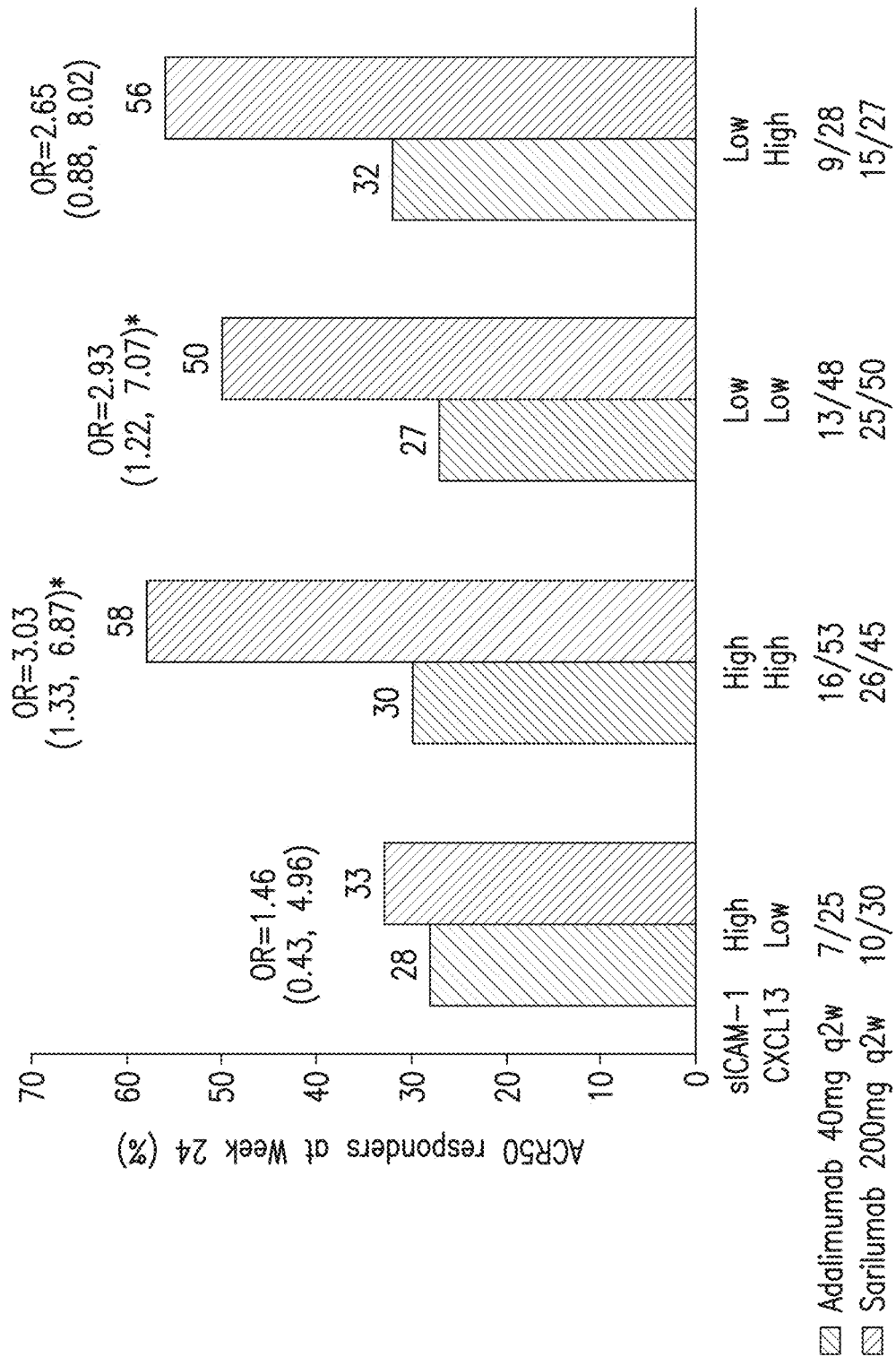
FIG. 8 depicts ACR50 responses at week 24 and corresponding ORs with differential combinations of CXCL13 and sICAM-1. *Nominal P<0.05. ORs presented with 95% CIs. ACR50: American College of Rheumatology 50% improvement criteria; CI: confidence interval; CXCL13.

Evaluation of Differential Combinations of Markers Associated With Myeloid and Lymphoid Activation For Prediction of Clinical Response Baseline levels of CXCL13 and sICAM-1 were analyzed to determine whether differential ratios of these biomarkers (high/high, high/low, low/high and low/low; using the median in the overall population as the cut-off) could predict clinical responses to sarilumab or adalimumab treatment at week 24. While CXCL13 high/sICAM-1 high and CXCL13 low/sICAM-1 low patients had greater ACR50 responses with sarilumab than adalimumab, the other combinations were not predictive (nominal P>0.05; FIG. 8). Additionally, CXCL13 high/sICAM-1 high patients had greater ACR20 responses with sarilumab than adalimumab (OR 3.8 [95% CI 1.5, 9.8]; nominal P=0.004) but other combinations were not predictive (nominal P>0.05).

REFERENCES

Karmakar S, Kay J, Gravallese E M. Bone damage in rheumatoid arthritis: mechanistic insights and approaches to prevention. Rheum Dis Clin North Am 2010; 36:385-404.

McInnes I B, Schett G. Cytokines in the pathogenesis of rheumatoid arthritis. Nat Rev Immunol 2007; 7:429-42.

Schett G, Gravallese E. Bone erosion in rheumatoid arthritis: mechanisms, diagnosis and treatment. Nature reviews. Rheumatology 2012; 8:656-64.

Choy E. Understanding the dynamics: pathways involved in the pathogenesis of rheumatoid arthritis. Rheumatology (Oxford) 2012; 51 Suppl 5:v3-11.

Smolen J S, Aletaha D. The assessment of disease activity in rheumatoid arthritis. Clin Exp Rheumatol 2010; 28 Suppl 59:S18-27.

Schett G. Physiological effects of modulating the interleukin-6 axis. Rheumatology (Oxford) 2018; 57:ii43-ii50.

Calabrese L H, Rose-John S. IL-6 biology: implications for clinical targeting in rheumatic disease. Nat Rev Rheumatol 2014; 10:720-7.

Hunter C A, Jones S A. IL-6 as a keystone cytokine in health and disease. Nat Immunol 2015; 16:448-57.

Choy E H S, Calabrese L H. Neuroendocrine and neurophysiological effects of interleukin 6 in rheumatoid arthritis. Rheumatology (Oxford) 2018; 57:1885-95.

Solomon D H, Goodson N J, Katz J N et al. Patterns of cardiovascular risk in rheumatoid arthritis. Ann Rheum Dis 2006; 65:1608-12.

Choy E, Ganeshalingam K, Semb A G, Szekanecz Z, Nurmohamed M. Cardiovascular risk in rheumatoid arthritis: recent advances in the understanding of the pivotal role of inflammation, risk predictors and the impact of treatment. Rheumatology (Oxford) 2014; 53:2143-54.

Gabay C, McInnes I B, Kavanaugh A et al. Comparison of lipid and lipid-associated cardiovascular risk marker changes after treatment with tocilizumab or adalimumab in patients with rheumatoid arthritis. Ann Rheum Dis 2016; 75:1806-12.

Genovese M C, Fleischmann R, Kivitz A J et al. Sarilumab plus methotrexate in patients with active rheumatoid arthritis and inadequate response to methotrexate: results of a phase III study. Arthritis Rheumatol 2015; 67:1424-37.

Fleischmann R, van Adelsberg J, Lin Y et al. Sarilumab and nonbiologic disease-modifying antirheumatic drugs in patients with active rheumatoid arthritis and inadequate response or intolerance to tumor necrosis factor inhibitors. Arthritis Rheumatol 2017; 69:277-90.

Burmester G R, Lin Y, Patel R et al. Efficacy and safety of sarilumab monotherapy versus adalimumab monotherapy for the treatment of patients with active rheumatoid arthritis (MONARCH): a randomised, double-blind, parallel-group phase III trial. Ann Rheum Dis 2017; 76:840-7.

AbbVie Inc. US prescribing information: HUMIRA (adalimumab) injection, solution for subcutaneous use. 2018: https://www.accessdatafda.gov/drugsatfda_docs/label/2008/125057s01101bl.pdf (8 Feb. 2019, date last accessed).

Strand V, Gossec L, Proudfoot C W J et al. Patient-reported outcomes from a randomized phase III trial of sarilumab monotherapy versus adalimumab monotherapy in patients with rheumatoid arthritis. Arthritis Res Ther 2018; 20:129.

Gabay C, Msihid J, Zilberstein M et al. Identification of sarilumab pharmacodynamic and predictive markers in patients with inadequate response to TNF inhibition: a biomarker substudy of the phase 3 TARGET study. RMD Open 2018; 4:e000607.

Boyapati A, Msihid J, Fiore S, van Adelsberg J, Graham N M, Hamilton J D. Sarilumab plus methotrexate suppresses circulating biomarkers of bone resorption and synovial damage in patients with rheumatoid arthritis and inadequate response to methotrexate: a biomarker study of MOBILITY. Arthritis Res Ther 2016; 18:225.

Song S-N J, Iwahashi M, Tomosugi N et al. Comparative evaluation of the effects of treatment with tocilizumab and TNF-α inhibitors on serum hepcidin, anemia response and disease activity in rheumatoid arthritis patients. Arthritis Res Ther 2013; 15:R141.

Gavrilă B I, Ciofu C, Stoica V. Biomarkers in rheumatoid arthritis, what is new? J Med Life 2016; 9:144-8.

Sechidis K, Papangelou K, Metcalfe P D, Svensson D, Weatherall J, Brown G. Distinguishing prognostic and predictive biomarkers: an information theoretic approach. Bioinformatics 2018; 34:3365-76.

Kringelbach T M, Glintborg B, Hogdall E V, Johansen J S, Hetland M L. Identification of new biomarkers to promote personalised treatment of patients with inflammatory rheumatic disease: protocol for an open cohort study. BMJ Open 2018; 8:e019325.

Fleischmann R, Connolly S E, Maldonado M A, Schiff M. Brief report: estimating disease activity using multi-biomarker disease activity scores in rheumatoid arthritis patients treated with abatacept or adalimumab. Arthritis Rheumatol. 2016; 68:2083-9.

Curtis J R, Wright G C, Strand V, Davis C S, Hitraya E, Sasso E H. Reanalysis of the multi-biomarker disease activity score for assessing disease activity in the abatacept versus adalimumab comparison in biologic-naive rheumatoid arthritis subjects with background methotrexate study: comment on the article by Fleischmann et al. Arthritis Rheumatol. 2017; 69:863-5.

Dennis G, Jr., Holweg C T, Kummerfeld S K et al. Synovial phenotypes in rheumatoid arthritis correlate with response to biologic therapeutics. Arthritis Res Ther 2014; 16:R90.

Burmester G R, Hagino O, Dong Q et al. Unique changes in hemoglobin with sarilumab versus adalimumab are independent of better disease control in patients with rheumatoid arthritis (RA). Arthritis Rheumatol 2018; 70 (Suppl. 10):Abstract 1528.

The invention claimed is:

1. A method of treating rheumatoid arthritis in a subject comprising:
   A) (a) identifying a subject with rheumatoid arthritis whose serum sample is determined to have a pre-dose (baseline) serum concentration of serum amyloid A (SAA) greater than 105.2 ng/ml and less than 256.0 ng/ml,
   (b) identifying a subject with rheumatoid arthritis whose serum sample is determined to have a pre-dose (baseline) serum concentration of matrix metalloproteinase-3 (MMP-3) greater than 77.0 ng/ml and less than 154.3 ng/ml, or
   (c) identifying a subject with rheumatoid arthritis whose serum sample is determined to have a pre-dose (baseline) serum concentration of chemokine C-X-C motif ligand 13 (CXCL13) less than 72.0 pg/mL and a pre-dose (baseline) serum concentration of soluble intracellular adhesion molecule-1 (sICAM-1) less than 212.1 ng/ml; and
   B) administering to the subject identified in any of (a)-(c) about 150 mg to about 200 mg of an anti-interleukin 6 receptor (anti-IL-6R) antibody once every two weeks, wherein the antibody comprises a heavy chain variable region comprising the sequence of SEQ ID NO: 1 and a light chain variable region comprising the sequence of SEQ ID NO: 2, and wherein the antibody is administered subcutaneously.

2. The method of claim 1, wherein the subject has moderate to severe rheumatoid arthritis, or wherein the subject has had an inadequate response or is intolerant to one or more disease-modifying antirheumatic drugs (DMARDs) other than the antibody.

3. The method of claim 2, wherein the one or more DMARDs comprise methotrexate.

4. The method of claim 1, wherein the subject achieves an American College of Rheumatology 20 (ACR20), ACR50, or ACR70 after 24 weeks of treatment with the antibody.

5. The method of claim 1, wherein the subject achieves a Disease Activity Score (28 joints) using C-reactive protein (DAS28-CRP) score of less than 3.2 after 24 weeks of treatment with the antibody.

6. The method of claim 1, wherein the subject achieves an improvement in patient global VAS, HAQ-DI, Pain VAS, SF-36-PCS score, SF-36-PF domain or morning stiffness VAS or RAID score after 24 weeks of treatment with the antibody.

7. The method of claim 1, comprising identifying a subject with rheumatoid arthritis whose serum sample is determined to have a pre-dose (baseline) serum concentration of SAA greater than 105.2 ng/ml and less than 256.0 ng/ml.

8. The method of claim 1, comprising identifying a subject with rheumatoid arthritis whose serum sample is determined to have a pre-dose (baseline) serum concentration of MMP-3 greater than 77.0 ng/ml and less than 154.3 ng/ml.

9. The method of claim 1, comprising identifying a subject with rheumatoid arthritis whose serum sample is determined to have a pre-dose (baseline) serum concentration of CXCL13 less than 72.0 pg/mL and a pre-dose (baseline) serum concentration of sICAM-1 less than 212.1 ng/ml.

10. The method of claim 1, wherein the antibody is sarilumab.

11. The method of claim 1, wherein the antibody is administered subcutaneously at about 150 mg once every two weeks to the subject.

12. The method of claim 1, wherein the antibody is administered subcutaneously at about 200 mg once every two weeks to the subject.

13. The method of claim 1, wherein the antibody is administered with a prefilled syringe or with an auto-injector.

14. The method of claim 1, wherein the antibody is administered as an aqueous buffered solution at about pH 6.0 containing about 21 mM histidine, about 45 mM arginine, about 0.2% (w/v) polysorbate 20, and about 5% (w/v) sucrose.

15. The method of claim 14, wherein the solution comprises at least about 130 mg/mL of the antibody, or wherein the solution comprises about 131.6 mg/ml of the antibody, or wherein the solution comprises about 175 mg/ml of the antibody.

16. The method of claim 1, further comprising administering to the subject, methotrexate at about 6 mg to about 25 mg every week.

17. A method of treating a subject with rheumatoid arthritis (RA) that has an increased propensity for effective treatment, comprising:
   A) (a) measuring a pre-dose (baseline) serum concentration of SAA in a serum sample from a subject with rheumatoid arthritis, wherein if the serum sample has a pre-dose (baseline) serum concentration of SAA greater than 105.2 ng/ml and less than 256.0 ng/ml, the subject has an increased propensity for effective treatment of RA with an anti-IL-6R antibody, or
   (b) measuring a pre-dose (baseline) serum concentration of MMP-3 in a serum sample from a subject with rheumatoid arthritis, wherein if the serum sample has a pre-dose (baseline) serum concentration of MMP-3 greater than 77.0 ng/ml and less than 154.3 ng/ml, the subject has an increased propensity for effective treatment of RA with an anti-IL-6R antibody, or
   (c) measuring a pre-dose (baseline) serum concentration of CXCL13 and a pre-dose (baseline) serum concentration of sICAM-1 in a serum sample from a subject with rheumatoid arthritis, wherein if the serum sample has a pre-dose (baseline) serum concentration of CXCL13 less than 72.0 pg/mL and a pre-dose (baseline) serum concentration of sICAM-1 less than 212.1 ng/ml, the subject has an increased propensity for effective treatment of RA with an anti-IL-6R antibody; and B) administering an anti-IL-6R antibody to the subject who is determined in any of (a)-(c) to have an increased propensity for effective treatment of RA with an anti-IL-6R antibody, wherein the anti-IL-6R antibody comprises a heavy chain variable region comprising the sequence SEQ ID NO: 1 and a light chain variable region comprising the sequence SEQ ID NO: 2, wherein the antibody is administered at about 150 mg to about 200 mg once every two weeks, and wherein the antibody is administered subcutaneously.

18. The method of claim 17, wherein the subject who is determined to have an increased propensity for effective treatment of RA with the anti-IL-6R antibody has an increased propensity of achieving
  (a) ACR20, ACR50 or ACR70 after 24 weeks of treatment with the antibody;
  (b) DAS28-CRP score of less than 3.2 after 24 weeks of treatment with the antibody; or
  (c) an improvement in patient global VAS, HAQ-DI, Pain VAS, SF-36-PCS score, SF-36-RE domain, morning stiffness VAS or RAID score after 24 weeks of treatment with the antibody.

19. The method of claim 17, wherein the subject has moderate to severe rheumatoid arthritis.

20. The method of claim 17, wherein the subject is intolerant to one or more DMARDs other than the antibody.

21. The method of claim 20, wherein the one or more DMARDs comprise methotrexate.

22. The method of claim 17, wherein the subject has moderate to severe rheumatoid arthritis and has had an inadequate response or is intolerant to one or more DMARDs.

23. The method of claim 22, wherein the one or more DMARDs comprise methotrexate.

24. The method of claim 17, wherein the antibody is sarilumab.

25. The method of claim 17, comprising measuring a pre-dose (baseline) serum concentration of SAA in a serum sample from a subject with rheumatoid arthritis, wherein if the serum sample has a pre-dose (baseline) serum concentration of SAA greater than 105.2 ng/ml and less than 256.0 ng/ml, the subject has an increased propensity for effective treatment of RA with the anti-IL-6R antibody.

26. The method of claim 17, comprising measuring a pre-dose (baseline) serum concentration of MMP-3 in a serum sample from a subject with rheumatoid arthritis, wherein if the serum sample has a pre-dose (baseline) serum concentration of MMP-3 greater than 77.0 ng/ml and less than 154.3 ng/ml, the subject has an increased propensity for effective treatment of RA with the anti-IL-6R antibody.

27. The method of claim 17, comprising measuring a pre-dose (baseline) serum concentration of CXCL13 and a pre-dose (baseline) serum concentration of sICAM-1 in a serum sample from a subject with rheumatoid arthritis, wherein if the serum sample has a pre-dose (baseline) serum concentration of CXCL13 less than 72.0 pg/mL and a pre-dose (baseline) serum concentration of sICAM-1 less than 212.1 ng/ml, the subject has an increased propensity for effective treatment of RA with the anti-IL-6R antibody.

* * * * *

SEQUENCE LISTING

<160> NUMBER OF SEQ ID NOS: 25

<210> SEQ ID NO 1
<211> LENGTH: 116
<212> TYPE: PRT
<213> ORGANISM: Artificial Sequence
<220> FEATURE:
<223> OTHER INFORMATION: heavy chain variable region

<400> SEQUENCE: 1

Glu Val Gln Leu Val Glu Ser Gly Gly Gly Leu Val Gln Pro Gly Arg
1               5                   10                  15

Ser Leu Arg Leu Ser Cys Ala Ala Ser Arg Phe Thr Phe Asp Asp Tyr
            20                  25                  30

Ala Met His Trp Val Arg Gln Ala Pro Gly Lys Gly Leu Glu Trp Val
        35                  40                  45

Ser Gly Ile Ser Trp Asn Ser Gly Arg Ile Gly Tyr Ala Asp Ser Val
    50                  55                  60

Lys Gly Arg Phe Thr Ile Ser Arg Asp Asn Ala Glu Asn Ser Leu Phe
65                  70                  75                  80

Leu Gln Met Asn Gly Leu Arg Ala Glu Asp Thr Ala Leu Tyr Tyr Cys
                85                  90                  95

Ala Lys Gly Arg Asp Ser Phe Asp Ile Trp Gly Gln Gly Thr Met Val
            100                 105                 110

Thr Val Ser Ser
        115

<210> SEQ ID NO 2
<211> LENGTH: 107
<212> TYPE: PRT
<213> ORGANISM: Artificial Sequence
<220> FEATURE:
<223> OTHER INFORMATION: light chain variable region

<400> SEQUENCE: 2

Asp Ile Gln Met Thr Gln Ser Pro Ser Ser Val Ser Ala Ser Val Gly
1               5                   10                  15

Asp Arg Val Thr Ile Thr Cys Arg Ala Ser Gln Gly Ile Ser Ser Trp
            20                  25                  30

Leu Ala Trp Tyr Gln Gln Lys Pro Gly Lys Ala Pro Lys Leu Leu Ile
        35                  40                  45

Tyr Gly Ala Ser Ser Leu Glu Ser Gly Val Pro Ser Arg Phe Ser Gly
    50                  55                  60

Ser Gly Ser Gly Thr Asp Phe Thr Leu Thr Ile Ser Ser Leu Gln Pro
65                  70                  75                  80

Glu Asp Phe Ala Ser Tyr Tyr Cys Gln Gln Ala Asn Ser Phe Pro Tyr
                85                  90                  95

Thr Phe Gly Gln Gly Thr Lys Leu Glu Ile Lys
            100                 105

<210> SEQ ID NO 3
<211> LENGTH: 8
<212> TYPE: PRT
<213> ORGANISM: Artificial Sequence
<220> FEATURE:
<223> OTHER INFORMATION: Heavy chain complementarity determining region
    1

<400> SEQUENCE: 3

Arg Phe Thr Phe Asp Asp Tyr Ala

```
<210> SEQ ID NO 4
<211> LENGTH: 8
<212> TYPE: PRT
<213> ORGANISM: Artificial Sequence
<220> FEATURE:
<223> OTHER INFORMATION: Heavy chain complementarity determining region
      2

<400> SEQUENCE: 4

Ile Ser Trp Asn Ser Gly Arg Ile
1               5

<210> SEQ ID NO 5
<211> LENGTH: 9
<212> TYPE: PRT
<213> ORGANISM: Artificial Sequence
<220> FEATURE:
<223> OTHER INFORMATION: Heavy chain complementarity determining region
      3

<400> SEQUENCE: 5

Ala Lys Gly Arg Asp Ser Phe Asp Ile
1               5

<210> SEQ ID NO 6
<211> LENGTH: 6
<212> TYPE: PRT
<213> ORGANISM: Artificial Sequence
<220> FEATURE:
<223> OTHER INFORMATION: Light chain complementarity determining region
      1

<400> SEQUENCE: 6

Gln Gly Ile Ser Ser Trp
1               5

<210> SEQ ID NO 7
<211> LENGTH: 3
<212> TYPE: PRT
<213> ORGANISM: Artificial Sequence
<220> FEATURE:
<223> OTHER INFORMATION: Light chain complementarity determining region
      2

<400> SEQUENCE: 7

Gly Ala Ser
1

<210> SEQ ID NO 8
<211> LENGTH: 9
<212> TYPE: PRT
<213> ORGANISM: Artificial Sequence
<220> FEATURE:
<223> OTHER INFORMATION: Light chain complementarity determining region
      3

<400> SEQUENCE: 8

Gln Gln Ala Asn Ser Phe Pro Tyr Thr
1               5

<210> SEQ ID NO 9
<211> LENGTH: 446
<212> TYPE: PRT
<213> ORGANISM: Artificial Sequence
<220> FEATURE:
<223> OTHER INFORMATION: Heavy chain
```

<400> SEQUENCE: 9

Glu Val Gln Leu Val Glu Ser Gly Gly Gly Leu Val Gln Pro Gly Arg
1               5                   10                  15

Ser Leu Arg Leu Ser Cys Ala Ala Ser Arg Phe Thr Phe Asp Asp Tyr
            20                  25                  30

Ala Met His Trp Val Arg Gln Ala Pro Gly Lys Gly Leu Glu Trp Val
        35                  40                  45

Ser Gly Ile Ser Trp Asn Ser Gly Arg Ile Gly Tyr Ala Asp Ser Val
50                  55                  60

Lys Gly Arg Phe Thr Ile Ser Arg Asp Asn Ala Glu Asn Ser Leu Phe
65                  70                  75                  80

Leu Gln Met Asn Gly Leu Arg Ala Glu Asp Thr Ala Leu Tyr Tyr Cys
                85                  90                  95

Ala Lys Gly Arg Asp Ser Phe Asp Ile Trp Gly Gln Gly Thr Met Val
            100                 105                 110

Thr Val Ser Ser Ala Ser Thr Lys Gly Pro Ser Val Phe Pro Leu Ala
        115                 120                 125

Pro Ser Ser Lys Ser Thr Ser Gly Gly Thr Ala Ala Leu Gly Cys Leu
130                 135                 140

Val Lys Asp Tyr Phe Pro Glu Pro Val Thr Val Ser Trp Asn Ser Gly
145                 150                 155                 160

Ala Leu Thr Ser Gly Val His Thr Phe Pro Ala Val Leu Gln Ser Ser
                165                 170                 175

Gly Leu Tyr Ser Leu Ser Ser Val Val Thr Val Pro Ser Ser Ser Leu
            180                 185                 190

Gly Thr Gln Thr Tyr Ile Cys Asn Val Asn His Lys Pro Ser Asn Thr
        195                 200                 205

Lys Val Asp Lys Lys Val Glu Pro Lys Ser Cys Asp Lys Thr His Thr
210                 215                 220

Cys Pro Pro Cys Pro Ala Pro Glu Leu Leu Gly Gly Pro Ser Val Phe
225                 230                 235                 240

Leu Phe Pro Pro Lys Pro Lys Asp Thr Leu Met Ile Ser Arg Thr Pro
                245                 250                 255

Glu Val Thr Cys Val Val Val Asp Val Ser His Glu Asp Pro Glu Val
            260                 265                 270

Lys Phe Asn Trp Tyr Val Asp Gly Val Glu Val His Asn Ala Lys Thr
        275                 280                 285

Lys Pro Arg Glu Glu Gln Tyr Asn Ser Thr Tyr Arg Val Val Ser Val
290                 295                 300

Leu Thr Val Leu His Gln Asp Trp Leu Asn Gly Lys Glu Tyr Lys Cys
305                 310                 315                 320

Lys Val Ser Asn Lys Ala Leu Pro Ala Pro Ile Glu Lys Thr Ile Ser
                325                 330                 335

Lys Ala Lys Gly Gln Pro Arg Glu Pro Gln Val Tyr Thr Leu Pro Pro
            340                 345                 350

Ser Arg Asp Glu Leu Thr Lys Asn Gln Val Ser Leu Thr Cys Leu Val
        355                 360                 365

Lys Gly Phe Tyr Pro Ser Asp Ile Ala Val Glu Trp Glu Ser Asn Gly
370                 375                 380

Gln Pro Glu Asn Asn Tyr Lys Thr Thr Pro Pro Val Leu Asp Ser Asp
385                 390                 395                 400

Gly Ser Phe Phe Leu Tyr Ser Lys Leu Thr Val Asp Lys Ser Arg Trp

```
                  405                 410                 415
Gln Gln Gly Asn Val Phe Ser Cys Ser Val Met His Glu Ala Leu His
            420                 425                 430

Asn His Tyr Thr Gln Lys Ser Leu Ser Leu Ser Pro Gly Lys
            435                 440                 445

<210> SEQ ID NO 10
<211> LENGTH: 214
<212> TYPE: PRT
<213> ORGANISM: Artificial Sequence
<220> FEATURE:
<223> OTHER INFORMATION: Light chain

<400> SEQUENCE: 10

Asp Ile Gln Met Thr Gln Ser Pro Ser Ser Val Ser Ala Ser Val Gly
1               5                   10                  15

Asp Arg Val Thr Ile Thr Cys Arg Ala Ser Gln Gly Ile Ser Ser Trp
            20                  25                  30

Leu Ala Trp Tyr Gln Gln Lys Pro Gly Lys Ala Pro Lys Leu Leu Ile
        35                  40                  45

Tyr Gly Ala Ser Ser Leu Glu Ser Gly Val Pro Ser Arg Phe Ser Gly
    50                  55                  60

Ser Gly Ser Gly Thr Asp Phe Thr Leu Thr Ile Ser Ser Leu Gln Pro
65                  70                  75                  80

Glu Asp Phe Ala Ser Tyr Tyr Cys Gln Gln Ala Asn Ser Phe Pro Tyr
                85                  90                  95

Thr Phe Gly Gln Gly Thr Lys Leu Glu Ile Lys Arg Thr Val Ala Ala
            100                 105                 110

Pro Ser Val Phe Ile Phe Pro Pro Ser Asp Glu Gln Leu Lys Ser Gly
        115                 120                 125

Thr Ala Ser Val Val Cys Leu Leu Asn Asn Phe Tyr Pro Arg Glu Ala
    130                 135                 140

Lys Val Gln Trp Lys Val Asp Asn Ala Leu Gln Ser Gly Asn Ser Gln
145                 150                 155                 160

Glu Ser Val Thr Glu Gln Asp Ser Lys Asp Ser Thr Tyr Ser Leu Ser
                165                 170                 175

Ser Thr Leu Thr Leu Ser Lys Ala Asp Tyr Glu Lys His Lys Val Tyr
            180                 185                 190

Ala Cys Glu Val Thr His Gln Gly Leu Ser Ser Pro Val Thr Lys Ser
        195                 200                 205

Phe Asn Arg Gly Glu Cys
    210

<210> SEQ ID NO 11
<211> LENGTH: 675
<212> TYPE: DNA
<213> ORGANISM: Artificial Sequence
<220> FEATURE:
<223> OTHER INFORMATION: CRP transcript variant 2 cDNA sequence (GenBank
      reference: NP_001315986.1)

<400> SEQUENCE: 11
atggagaagc tgttgtgttt cttggtcttg accagcctct ctcatgcttt tggccagaca    60
gacatgtcga ggaaggcttt tgtgtttccc aaagagtcgg atacttccta tgtatccctc   120
aaagcaccgt taacgaagcc tctcaaagcc ttcactgtgt gcctccactt ctacacggaa   180
ctgtcctcga cccgtgggta cagtattttc tcgtatgcca ccaagagaca agacaatgag   240
```

```
attctcatat tttggtctaa ggatatagga tacagtttta cagtgggtgg gtctgaaata    300
ttattcgagg ttcctgaagt cacagtagct ccagtacaca tttgtacaag ctgggagtcc    360
gcctcaggga tcgtggagtt ctgggtagat gggaagccca gggtgaggaa gagtctgaag    420
aagggataca ctgtgggggc agaagcaagc atcatcttgg ggcaggagca ggattccttc    480
ggtgggaact ttgaaggaag ccagtccctg gtgggagaca ttggaaatgt gaacatgtgg    540
gactttgtgc tgtcaccaga tgagattaac accatctatc ttggcgggcc cttcagtcct    600
aatgtcctga actggcgggc actgaagtat gaagtgcaag gcgaagtgtt caccaaaccc    660
cagctgtggc cctga                                                    675
```

<210> SEQ ID NO 12
<211> LENGTH: 224
<212> TYPE: PRT
<213> ORGANISM: Artificial Sequence
<220> FEATURE:
<223> OTHER INFORMATION: CRP peptide sequence

<400> SEQUENCE: 12

```
Met Glu Lys Leu Leu Cys Phe Leu Val Leu Thr Ser Leu Ser His Ala
1               5                   10                  15

Phe Gly Gln Thr Asp Met Ser Arg Lys Ala Phe Val Phe Pro Lys Glu
            20                  25                  30

Ser Asp Thr Ser Tyr Val Ser Leu Lys Ala Pro Leu Thr Lys Pro Leu
        35                  40                  45

Lys Ala Phe Thr Val Cys Leu His Phe Tyr Thr Glu Leu Ser Ser Thr
    50                  55                  60

Arg Gly Tyr Ser Ile Phe Ser Tyr Ala Thr Lys Arg Gln Asp Asn Glu
65                  70                  75                  80

Ile Leu Ile Phe Trp Ser Lys Asp Ile Gly Tyr Ser Phe Thr Val Gly
                85                  90                  95

Gly Ser Glu Ile Leu Phe Glu Val Pro Glu Val Thr Val Ala Pro Val
            100                 105                 110

His Ile Cys Thr Ser Trp Glu Ser Ala Ser Gly Ile Val Glu Phe Trp
        115                 120                 125

Val Asp Gly Lys Pro Arg Val Arg Lys Ser Leu Lys Lys Gly Tyr Thr
    130                 135                 140

Val Gly Ala Glu Ala Ser Ile Ile Leu Gly Gln Glu Gln Asp Ser Phe
145                 150                 155                 160

Gly Gly Asn Phe Glu Gly Ser Gln Ser Leu Val Gly Asp Ile Gly Asn
                165                 170                 175

Val Asn Met Trp Asp Phe Val Leu Ser Pro Asp Glu Ile Asn Thr Ile
            180                 185                 190

Tyr Leu Gly Gly Pro Phe Ser Pro Asn Val Leu Asn Trp Arg Ala Leu
        195                 200                 205

Lys Tyr Glu Val Gln Gly Glu Val Phe Thr Lys Pro Gln Leu Trp Pro
    210                 215                 220
```

<210> SEQ ID NO 13
<211> LENGTH: 2020
<212> TYPE: DNA
<213> ORGANISM: Artificial Sequence
<220> FEATURE:
<223> OTHER INFORMATION: CRP genomic DNA sequence (GenBank reference:
      NG_013007.1)

<400> SEQUENCE: 13

| | |
|---|---|
| gactggattc agagactcaa acaatgttat tgaggcatgg tctatctctc agctctactc | 60 |
| gtgagtcaag gatggtgtat tagttggttt tcacactgct gtaaagaact acctgagtat | 120 |
| gggtaattta taaacaaaag aaattttaaa tgaacttaca gttccacatg tttggggagg | 180 |
| actcatgaaa cttacaatca tggtggaagg tgaaggggaa gcaggcattt tcttcacaag | 240 |
| gcagcaggag agagacagtg tgagtggggg actgccaagc acttttattt aaatcatcag | 300 |
| acctagtgag aactcattat catgagcaca gcatgggcaa aactacctcc acgatccaat | 360 |
| cttctcccac catgtccctc cctcaactca tggggattac aatttgagat gacatttggg | 420 |
| tgggaacaca gaaccaaacc atatcattcc acctctggct cctccaaaat atcatgttct | 480 |
| tttcacattt caaaccaat catccttcc caacagtcac ccaaacttaa ctcatttcag | 540 |
| cattaactca aaagtccaag tctaaagttc catctgagaa aaggcaagtc acttctgcct | 600 |
| attagcctag taaaataaaa aacaagttag ttacttccaa gatacagtgg gggtataggc | 660 |
| attgggtaaa tggtcctgtt tgaaatggga gaaattggcc aaaacaaagg ggccacaggc | 720 |
| cccatgtaaa tccaaaatct ggcaggacac tcatgaaatc ttaaagctcc aaaataatct | 780 |
| cctttgattc tttgtctcac atccagggca tgctgatgca agcggtaggc ttccatggcc | 840 |
| ttgggtagct ccatacttgt ggctcttcag ggtacagccc ctgtggctgc tttcacaggc | 900 |
| tggcattgaa cacttgcaag cttttctaag cacaaggtgc aaactgtcag tggttctacc | 960 |
| attctgggat ctggaggaca gtggccctct tctcacagat ccactaggca gtgccccagt | 1020 |
| ggggactctg tgtggagact ccaaccccac atttccctgc tgcattgccc tagtagaggt | 1080 |
| tttctgtgag ggctccatgc ctgcagaaga cttctgcctg aacatccagg tgtttccata | 1140 |
| catcttctga aatctagaca gaaactccca agctcaact cttgtcttct gtgcatctgc | 1200 |
| accctcaaca ctacttggaa gccaccaagg cttggggctt gtgccctctg aagcaatggc | 1260 |
| ctgagctata tacattgccc ccttttagcc atggctggag ccgcagcagc tggcacacag | 1320 |
| ggtgccatgt tcctgggctg cacagagcag cggggccctg ggcctggccc atgataccat | 1380 |
| tttttcctcc taggcttttg gacctctgat gggagggct gccatgaaga tcttctgaaa | 1440 |
| tgacctgaag acatttttcct cattgtttg gctatcaaca ttcatctcct cattacttat | 1500 |
| gcaaatttct gcagccagct tgaatttttc cccagaaaat gggttttct tttctaccac | 1560 |
| atggtcaggc tgcacatttt ccaaacttt tgctcccctt tccctttaa acataagttc | 1620 |
| caatttcaga tcatctcttt gtgaacacat atgattgtat gttttcagaa aaagccaggt | 1680 |
| cacttcttga atgctttggt gcttagaaat ttcttaagca ccaaagcatt caagaaatca | 1740 |
| tgtctcttaa gttaaaagtt ccacagatct ctagggcatg ggcaaaatgc caccattgtc | 1800 |
| tttgctaaaa catagaaaga gtgacccttta ctcccgtttc caataagttc ctcatctcca | 1860 |
| tctaaggaca cctctgcatg aacttcattt tccatatcac tatcagcatt ttggtcaaaa | 1920 |
| ccattcaaca aaactcagga agttccaagc ttttccacat cttcctgtct tctcctgagc | 1980 |
| cctccaaact cttccagcct ctgccctag ttggttccaa | 2020 |

<210> SEQ ID NO 14
<211> LENGTH: 477
<212> TYPE: PRT
<213> ORGANISM: Artificial Sequence
<220> FEATURE:
<223> OTHER INFORMATION: MMP-3 peptide sequence

<400> SEQUENCE: 14

Met Lys Ser Leu Pro Ile Leu Leu Leu Leu Cys Val Ala Val Cys Ser

-continued

```
1               5                   10                  15
Ala Tyr Pro Leu Asp Gly Ala Ala Arg Gly Glu Asp Thr Ser Met Asn
                20                  25                  30
Leu Val Gln Lys Tyr Leu Glu Asn Tyr Tyr Asp Leu Lys Lys Asp Val
                35                  40                  45
Lys Gln Phe Val Arg Arg Lys Asp Ser Gly Pro Val Lys Lys Ile
                50                  55                  60
Arg Glu Met Gln Lys Phe Leu Gly Leu Glu Val Thr Gly Lys Leu Asp
65                  70                  75                  80
Ser Asp Thr Leu Glu Val Met Arg Lys Pro Arg Cys Gly Val Pro Asp
                85                  90                  95
Val Gly His Phe Arg Thr Phe Pro Gly Ile Pro Lys Trp Arg Lys Thr
                100                 105                 110
His Leu Thr Tyr Arg Ile Val Asn Tyr Thr Pro Asp Leu Pro Lys Asp
                115                 120                 125
Ala Val Asp Ser Ala Val Glu Lys Ala Leu Lys Val Trp Glu Glu Val
                130                 135                 140
Thr Pro Leu Thr Phe Ser Arg Leu Tyr Glu Gly Glu Ala Asp Ile Met
145                 150                 155                 160
Ile Ser Phe Ala Val Arg Glu His Gly Asp Phe Tyr Pro Phe Asp Gly
                165                 170                 175
Pro Gly Asn Val Leu Ala His Ala Tyr Ala Pro Gly Pro Gly Ile Asn
                180                 185                 190
Gly Asp Ala His Phe Asp Asp Glu Gln Trp Thr Lys Asp Thr Thr
                195                 200                 205
Gly Thr Asn Leu Phe Leu Val Ala Ala His Glu Ile Gly His Ser Leu
                210                 215                 220
Gly Leu Phe His Ser Ala Asn Thr Glu Ala Leu Met Tyr Pro Leu Tyr
225                 230                 235                 240
His Ser Leu Thr Asp Leu Thr Arg Phe Arg Leu Ser Gln Asp Asp Ile
                245                 250                 255
Asn Gly Ile Gln Ser Leu Tyr Gly Pro Pro Pro Asp Ser Pro Glu Thr
                260                 265                 270
Pro Leu Val Pro Thr Glu Pro Val Pro Glu Pro Gly Thr Pro Ala
                275                 280                 285
Asn Cys Asp Pro Ala Leu Ser Phe Asp Ala Val Ser Thr Leu Arg Gly
                290                 295                 300
Glu Ile Leu Ile Phe Lys Asp Arg His Phe Trp Arg Lys Ser Leu Arg
305                 310                 315                 320
Lys Leu Glu Pro Glu Leu His Leu Ile Ser Ser Phe Trp Pro Ser Leu
                325                 330                 335
Pro Ser Gly Val Asp Ala Ala Tyr Glu Val Thr Ser Lys Asp Leu Val
                340                 345                 350
Phe Ile Phe Lys Gly Asn Gln Phe Trp Ala Ile Arg Gly Asn Glu Val
                355                 360                 365
Arg Ala Gly Tyr Pro Arg Gly Ile His Thr Leu Gly Phe Pro Pro Thr
                370                 375                 380
Val Arg Lys Ile Asp Ala Ala Ile Ser Asp Lys Glu Lys Asn Lys Thr
385                 390                 395                 400
Tyr Phe Phe Val Glu Asp Lys Tyr Trp Arg Phe Asp Glu Lys Arg Asn
                405                 410                 415
Ser Met Glu Pro Gly Phe Pro Lys Gln Ile Ala Glu Asp Phe Pro Gly
                420                 425                 430
```

Ile Asp Ser Lys Ile Asp Ala Val Phe Glu Glu Phe Gly Phe Phe Tyr
         435                 440                 445

Phe Phe Thr Gly Ser Ser Gln Leu Glu Phe Asp Pro Asn Ala Lys Lys
        450                 455                 460

Val Thr His Thr Leu Lys Ser Asn Ser Trp Leu Asn Cys
465                 470                 475

<210> SEQ ID NO 15
<211> LENGTH: 1434
<212> TYPE: DNA
<213> ORGANISM: Artificial Sequence
<220> FEATURE:
<223> OTHER INFORMATION: MMP-3 cDNA sequence

<400> SEQUENCE: 15

```
atgaagagtc ttccaatcct actgttgctg tgcgtggcag tttgctcagc ctatccattg     60
gatggagctg caaggggtga ggacaccagc atgaaccttg ttcagaaata tctagaaaac    120
tactacgacc tcaaaaaaga tgtgaaacag tttgttagga gaaaggacag tggtcctgtt    180
gttaaaaaaa tccgagaaat gcagaagttc cttggattgg aggtgacggg aagctggac    240
tccgacactc tggaggtgat gcgcaagccc aggtgtggaa ttcctgatgt tggtcacttc    300
agaacctttc ctggcatccc gaagtggagg aaaacccacc ttacatacag gattgtgaat    360
tatacaccag atttgccaaa agatgctgtt gattctgctg ttgagaaagc tctgaaagtc    420
tgggaagagg tgactccact cacattctcc aggctgtatg aaggagaggc tgatataatg    480
atctcttttg cagttagaga acatggagac ttttaccctt ttgatggacc tggaaatgtt    540
ttggcccatg cctatgcccc tgggccaggg attaatggag atgcccactt tgatgatgat    600
gaacaatgga caaaggatac aacagggacc aatttatttc tcgttgctgc tcatgaaatt    660
ggccactccc tgggtctctt tcactcagcc aacactgaag ctttgatgta cccactctat    720
cactcactca cagacctgac tcggttccgc ctgtctcaag atgatataaa tggcattcag    780
tccctctatg acctcccccc tgactcccct gagacccccc tggtacccac ggaacctgtc    840
cctccagaac ctgggacgcc agccaactgt gatcctgctt gtcctttga tgctgtcagc    900
actctgaggg gagaaatcct gatctttaaa gacaggcact tttggcgcaa atccctcagg    960
aagcttgaac tgaattgca tttgatctct tcatttttggc catctcttcc ttcaggcgtg   1020
gatgccgcat atgaagttac tagcaaggac ctcgttttca tttttaaagg aaatcaattc   1080
tgggctatca gaggaaatga ggtacgagct ggatacccaa gaggcatcca caccctaggt   1140
ttccctccaa ccgtgaggaa aatcgatgca gccatttctg ataaggaaaa gaacaaaaca   1200
tatttctttg tagaggacaa atactggaga tttgatgaga agagaaattc catggagcca   1260
ggctttccca gcaaatagc tgaagacttt ccagggattg actcaaagat tgatgctgtt   1320
tttgaagaat tgggttcctt ttattcttt actggatctt cacagttgga gtttgaccca   1380
aatgcaaaga aagtgacaca cactttgaag agtaacagct ggcttaattg ttga         1434
```

<210> SEQ ID NO 16
<211> LENGTH: 1822
<212> TYPE: DNA
<213> ORGANISM: Artificial Sequence
<220> FEATURE:
<223> OTHER INFORMATION: MMP-3 mRNA sequence (GenBank reference: NM_002422.5)

<400> SEQUENCE: 16

| acaaggaggc aggcaagaca gcaaggcata gagacaacat agagctaagt aaagccagtg | 60 |
| --- | --- |
| gaaatgaaga gtcttccaat cctactgttg ctgtgcgtgg cagtttgctc agcctatcca | 120 |
| ttggatggag ctgcaagggg tgaggacacc agcatgaacc ttgttcagaa atatctagaa | 180 |
| aactactacg acctcaaaaa agatgtgaaa cagtttgtta ggagaaagga cagtggtcct | 240 |
| gttgttaaaa aaatccgaga aatgcagaag ttccttggat tggaggtgac ggggaagctg | 300 |
| gactccgaca ctctggaggt gatgcgcaag cccaggtgtg agttcctga tgttggtcac | 360 |
| ttcagaacct ttcctggcat cccgaagtgg aggaaaaccc accttacata caggattgtg | 420 |
| aattatacac cagatttgcc aaaagatgct gttgattctg ctgttgagaa agctctgaaa | 480 |
| gtctgggaag aggtgactcc actcacattc tccaggctgt atgaaggaga ggctgatata | 540 |
| atgatctctt ttgcagttag agaacatgga gacttttacc cttttgatgg acctggaaat | 600 |
| gttttggccc atgcctatgc ccctgggcca gggattaatg agatgccca ctttgatgat | 660 |
| gatgaacaat ggacaaagga tacaacaggg accaatttat ttctcgttgc tgctcatgaa | 720 |
| attggccact ccctgggtct ctttcactca gccaacactg aagctttgat gtacccactc | 780 |
| tatcactcac tcacagacct gactcggttc cgcctgtctc aagatgatat aaatggcatt | 840 |
| cagtccctct atggacctcc ccctgactcc cctgagaccc cctggtacc cacggaacct | 900 |
| gtccctccag aacctgggac gccagccaac tgtgatcctg ctttgtcctt tgatgctgtc | 960 |
| agcactctga ggggagaaat cctgatcttt aaagacaggc acttttggcg caaatccctc | 1020 |
| aggaagcttg aacctgaatt gcatttgatc tcttcatttt ggccatctct tccttcaggc | 1080 |
| gtggatgccg catatgaagt tactagcaag gacctcgttt tcattttta aggaaatcaa | 1140 |
| ttctgggcta tcagaggaaa tgaggtacga gctggatacc caagaggcat ccacacccta | 1200 |
| ggtttccctc caaccgtgag gaaaatcgat gcagccattt ctgataagga aaagaacaaa | 1260 |
| acatatttct ttgtagagga caaatactgg agatttgatg agaagagaaa ttccatggag | 1320 |
| ccaggctttc ccaagcaaat agctgaagac tttccaggga ttgactcaaa gattgatgct | 1380 |
| gttttttgaag aatttgggtt ctttttatttc tttactggat cttcacagtt ggagtttgac | 1440 |
| ccaaatgcaa agaaagtgac acacactttg aagagtaaca gctggcttaa ttgttgaaag | 1500 |
| agatatgtag aaggcacaat atgggcactt taaatgaagc taataattct tcacctaagt | 1560 |
| ctctgtgaat tgaaatgttc gttttctcct gcctgtgctg tgactcgagt cacactcaag | 1620 |
| ggaacttgag cgtgaatctg tatcttgccg gtcattttta tgttattaca gggcattcaa | 1680 |
| atgggctgct gcttagcttg caccttgtca catagagtga tctttcccaa gagaagggga | 1740 |
| agcactcgtg tgcaacagac aagtgactgt atctgtgtag actatttgct tatttaataa | 1800 |
| agacgatttg tcagttattt ta | 1822 |

<210> SEQ ID NO 17
<211> LENGTH: 109
<212> TYPE: PRT
<213> ORGANISM: Artificial Sequence
<220> FEATURE:
<223> OTHER INFORMATION: CXCL13 peptide sequence (GenBank reference: NP_006410.1)

<400> SEQUENCE: 17

Met Lys Phe Ile Ser Thr Ser Leu Leu Leu Met Leu Leu Val Ser Ser
1               5                   10                  15

Leu Ser Pro Val Gln Gly Val Leu Glu Val Tyr Tyr Thr Ser Leu Arg
            20                  25                  30

```
Cys Arg Cys Val Gln Glu Ser Ser Val Phe Ile Pro Arg Arg Phe Ile
             35                  40                  45
Asp Arg Ile Gln Ile Leu Pro Arg Gly Asn Gly Cys Pro Arg Lys Glu
 50                  55                  60
Ile Ile Val Trp Lys Lys Asn Lys Ser Ile Val Cys Val Asp Pro Gln
 65                  70                  75                  80
Ala Glu Trp Ile Gln Arg Met Met Glu Val Leu Arg Lys Arg Ser Ser
                 85                  90                  95
Ser Thr Leu Pro Val Pro Val Phe Lys Arg Lys Ile Pro
            100                 105
```

```
<210> SEQ ID NO 18
<211> LENGTH: 330
<212> TYPE: DNA
<213> ORGANISM: Artificial Sequence
<220> FEATURE:
<223> OTHER INFORMATION: CXCL13 cDNA sequence (GenBank reference:
      NP_006410.1)

<400> SEQUENCE: 18
atgaagttca tctcgacatc tctgcttctc atgctgctgg tcagcagcct ctctccagtc     60
caaggtgttc tggaggtcta ttacacaagc ttgaggtgta gatgtgtcca agagagctca    120
gtctttatcc ctagacgctt cattgatcga attcaaatct gccccgtgg gaatggttgt     180 ccaagaaaag aaatcatagt ctggaagaag aacaagtcaa ttgtgtgtgt ggaccctcaa    240
gctgaatgga tacaaagaat gatggaagta ttgagaaaaa gaagttcttc aactctacca    300
gttccagtgt ttaagagaaa gattccctga                                     330
```

```
<210> SEQ ID NO 19
<211> LENGTH: 1219
<212> TYPE: DNA
<213> ORGANISM: Artificial Sequence
<220> FEATURE:
<223> OTHER INFORMATION: CXCL13 genomic DNA sequence (GenBank reference:
      NM_006419.2)

<400> SEQUENCE: 19
gagaagatgt ttgaaaaaac tgactctgct aatgagcctg gactcagagc tcaagtctga     60
actctacctc cagacagaat gaagttcatc tcgacatctc tgcttctcat gctgctggtc    120
agcagcctct ctccagtcca aggtgttctg gaggtctatt acacaagctt gaggtgtaga    180
tgtgtccaag agagctcagt ctttatccct agacgcttca ttgatcgaat tcaaatcttg    240
ccccgtggga atggttgtcc aagaaaagaa atcatagtct ggaagaagaa caagtcaatt    300
gtgtgtgtgg accctcaagc tgaatggata caaagaatga tggaagtatt gagaaaaaga    360
agttcttcaa ctctaccagt tccagtgttt aagagaaaga ttccctgatg ctgatatttc    420
cactaagaac acctgcattc ttcccttatc cctgctctgg attttagttt tgtgcttagt    480
taaatctttt ccaggaaaaa gaacttcccc atacaaataa gcatgagact atgtaaaaat    540
aaccttgcag aagctgatgg ggcaaactca agcttcttca ctcacagcac cctatataca    600
cttggagttt gcattcttat tcatcaggga ggaaagtttc tttgaaaata gttattcagt    660
tataagtaat acaggattat tttgattata tacttgttgt ttaatgttta aaatttctta    720
gaaaacaatg gaatgagaat ttaagcctca aatttgaaca tgtggcttga attaagaaga    780
aaattatggc atatattaaa agcaggcttc tatgaaagac tcaaaagct gcctgggagg    840 cagatggaac ttgagcctgt caagaggcaa aggaatccat gtagtagata tcctctgctt    900
```

```
aaaaactcac tacggaggag aattaagtcc tacttttaaa gaatttcttt ataaaattta      960
ctgtctaaga ttaatagcat tcgaagatcc ccagacttca tagaatactc agggaaagca     1020
tttaaagggt gatgtacaca tgtatccttt cacacatttg ccttgacaaa cttctttcac     1080
tcacatcttt ttcactgact ttttttgtgg gggcggggc cgggggact ctggtatcta      1140 attctttaat gattcctata aatctaatga cattcaataa agttgagcaa acattttact     1200
taaaaaaaaa aaaaaaaaa                                                  1219
```

```
<210> SEQ ID NO 20
<211> LENGTH: 130
<212> TYPE: PRT
<213> ORGANISM: Artificial Sequence
<220> FEATURE:
<223> OTHER INFORMATION: Serum amyloid A peptide sequence (GenBank
      reference: AAB24060.1)

<400> SEQUENCE: 20

Met Arg Leu Phe Thr Gly Ile Val Phe Cys Ser Leu Val Met Gly Val
1               5                   10                  15

Thr Ser Glu Ser Trp Arg Ser Phe Phe Lys Glu Ala Leu Gln Gly Val
            20                  25                  30

Gly Asp Met Gly Arg Ala Tyr Trp Asp Ile Met Ile Ser Asn His Gln
        35                  40                  45

Asn Ser Asn Arg Tyr Leu Tyr Ala Arg Gly Asn Tyr Asp Ala Ala Gln
    50                  55                  60

Arg Gly Pro Gly Gly Val Trp Ala Ala Lys Leu Ile Ser Arg Ser Arg
65                  70                  75                  80

Val Tyr Leu Gln Gly Leu Ile Asp Tyr Tyr Leu Phe Gly Asn Ser Ser
                85                  90                  95

Thr Val Leu Glu Asp Ser Lys Ser Asn Glu Lys Ala Glu Glu Trp Gly
            100                 105                 110

Arg Ser Gly Lys Asp Pro Asp Arg Phe Arg Pro Asp Gly Leu Pro Lys
        115                 120                 125

Lys Tyr
    130
```

```
<210> SEQ ID NO 21
<211> LENGTH: 393
<212> TYPE: DNA
<213> ORGANISM: Artificial Sequence
<220> FEATURE:
<223> OTHER INFORMATION: Serum amyloid A cDNA sequence (GenBank
      reference: AAB24060.1)

<400> SEQUENCE: 21
atgaggcttt tcacaggcat tgttttctgc tccttggtca tgggagtcac cagtgaaagc       60
tggcgttcgt ttttcaagga ggctctccaa ggggttgggg acatgggcag agcctattgg      120
gacataatga tatccaatca ccaaaattca aacagatatc tctatgctcg ggaaactat       180 gatgctgccc aaagaggacc tggggggtgtc tgggctgcta aactcatcag ccgttccagg     240
gtctatcttc agggattaat agactactat ttatttggaa acagcagcac tgtattggag     300
gactcgaagt ccaacgagaa agctgaggaa tgggccgga gtggcaaaga ccccgaccgc      360
ttcagacctg acggcctgcc taagaaatac tga                                  393
```

```
<210> SEQ ID NO 22
<211> LENGTH: 614
<212> TYPE: DNA
```

<213> ORGANISM: Artificial Sequence
<220> FEATURE:
<223> OTHER INFORMATION: Serum amyloid A mRNA sequence (GenBank
      reference: M81349.1)

<400> SEQUENCE: 22

```
tatagctcca cggccagaag ataccagcag ctctgccttt actgaaattt cagctggaga    60
aaggtccaca gcacaatgag gcttttcaca ggcattgttt tctgctcctt ggtcatggga   120
gtcaccagtg aaagctggcg ttcgtttttc aaggaggctc tccaagggg tggggacatg    180
ggcagagcct attgggacat aatgatatcc aatcaccaaa attcaaacag atatctctat   240
gctcggggaa actatgatgc tgcccaaaga ggacctgggg gtgtctgggc tgctaaactc   300
atcagccgtt ccagggtcta tcttcaggga ttaatagact actatttatt tggaaacagc   360
agcactgtat tggaggactc gaagtccaac gagaaagctg aggaatgggg ccggagtggc   420
aaagaccccg accgcttcag acctgacggc ctgcctaaga atactgagc ttcctgctcc    480
tctgctctca gggaaactgg gctgtgagcc acacacttct cccccagac agggacacag    540
ggtcactgag ctttgtgtcc ccaggaactg gtataggca cctagaggtg ttcaataaat    600
gtttgtcaaa ttga                                                      614
```

<210> SEQ ID NO 23
<211> LENGTH: 532
<212> TYPE: PRT
<213> ORGANISM: Artificial Sequence
<220> FEATURE:
<223> OTHER INFORMATION: sICAM-1 peptide sequence (GenBank reference:
      NP_000192.2)

<400> SEQUENCE: 23

```
Met Ala Pro Ser Ser Pro Arg Pro Ala Leu Pro Ala Leu Leu Val Leu
  1               5                  10                  15

Leu Gly Ala Leu Phe Pro Gly Pro Gly Asn Ala Gln Thr Ser Val Ser
                 20                  25                  30

Pro Ser Lys Val Ile Leu Pro Arg Gly Gly Ser Val Leu Val Thr Cys
             35                  40                  45

Ser Thr Ser Cys Asp Gln Pro Lys Leu Leu Gly Ile Glu Thr Pro Leu
         50                  55                  60

Pro Lys Lys Glu Leu Leu Leu Pro Gly Asn Asn Arg Lys Val Tyr Glu
 65                  70                  75                  80

Leu Ser Asn Val Gln Glu Asp Ser Gln Pro Met Cys Tyr Ser Asn Cys
                 85                  90                  95

Pro Asp Gly Gln Ser Thr Ala Lys Thr Phe Leu Thr Val Tyr Trp Thr
            100                 105                 110

Pro Glu Arg Val Glu Leu Ala Pro Leu Pro Ser Trp Gln Pro Val Gly
            115                 120                 125

Lys Asn Leu Thr Leu Arg Cys Gln Val Glu Gly Gly Ala Pro Arg Ala
        130                 135                 140

Asn Leu Thr Val Val Leu Leu Arg Gly Glu Lys Glu Leu Lys Arg Glu
145                 150                 155                 160

Pro Ala Val Gly Glu Pro Ala Glu Val Thr Thr Thr Val Leu Val Arg
                165                 170                 175

Arg Asp His His Gly Ala Asn Phe Ser Cys Arg Thr Glu Leu Asp Leu
            180                 185                 190

Arg Pro Gln Gly Leu Glu Leu Phe Glu Asn Thr Ser Ala Pro Tyr Gln
        195                 200                 205
```

| | | | | | | | | | | | | |
|---|---|---|---|---|---|---|---|---|---|---|---|---|
| Leu | Gln | Thr | Phe | Val | Leu | Pro | Ala | Thr | Pro | Gln | Leu | Val | Ser | Pro |
| 210 | | | | | 215 | | | | | 220 | | |

Arg Val Leu Glu Val Asp Thr Gln Gly Thr Val Val Cys Ser Leu Asp
225                 230                 235                 240

Gly Leu Phe Pro Val Ser Glu Ala Gln Val His Leu Ala Leu Gly Asp
                245                 250                 255

Gln Arg Leu Asn Pro Thr Val Thr Tyr Gly Asn Asp Ser Phe Ser Ala
        260                 265                 270

Lys Ala Ser Val Ser Val Thr Ala Glu Asp Glu Gly Thr Gln Arg Leu
    275                 280                 285

Thr Cys Ala Val Ile Leu Gly Asn Gln Ser Gln Glu Thr Leu Gln Thr
290                 295                 300

Val Thr Ile Tyr Ser Phe Pro Ala Pro Asn Val Ile Leu Thr Lys Pro
305                 310                 315                 320

Glu Val Ser Glu Gly Thr Glu Val Thr Val Lys Cys Glu Ala His Pro
                325                 330                 335

Arg Ala Lys Val Thr Leu Asn Gly Val Pro Ala Gln Pro Leu Gly Pro
            340                 345                 350

Arg Ala Gln Leu Leu Leu Lys Ala Thr Pro Glu Asp Asn Gly Arg Ser
        355                 360                 365

Phe Ser Cys Ser Ala Thr Leu Glu Val Ala Gly Gln Leu Ile His Lys
370                 375                 380

Asn Gln Thr Arg Glu Leu Arg Val Leu Tyr Gly Pro Arg Leu Asp Glu
385                 390                 395                 400

Arg Asp Cys Pro Gly Asn Trp Thr Trp Pro Glu Asn Ser Gln Gln Thr
                405                 410                 415

Pro Met Cys Gln Ala Trp Gly Asn Pro Leu Pro Glu Leu Lys Cys Leu
            420                 425                 430

Lys Asp Gly Thr Phe Pro Leu Pro Ile Gly Glu Ser Val Thr Val Thr
        435                 440                 445

Arg Asp Leu Glu Gly Thr Tyr Leu Cys Arg Ala Arg Ser Thr Gln Gly
450                 455                 460

Glu Val Thr Arg Lys Val Thr Val Asn Val Leu Ser Pro Arg Tyr Glu
465                 470                 475                 480

Ile Val Ile Ile Thr Val Val Ala Ala Val Ile Met Gly Thr Ala
                485                 490                 495

Gly Leu Ser Thr Tyr Leu Tyr Asn Arg Gln Arg Lys Ile Lys Lys Tyr
            500                 505                 510

Arg Leu Gln Gln Ala Gln Lys Gly Thr Pro Met Lys Pro Asn Thr Gln
        515                 520                 525

Ala Thr Pro Pro
    530

<210> SEQ ID NO 24
<211> LENGTH: 1598
<212> TYPE: DNA
<213> ORGANISM: Artificial Sequence
<220> FEATURE:
<223> OTHER INFORMATION: sICAM-1 cDNA sequence (GenBank reference:
      NP_000192.2)

<400> SEQUENCE: 24
atggctccca gcagccccg gcccgcgctg cccgcactcc tggtcctgct cggggctctg    60
ttcccaggac ctggcaatgc ccagacatct gtgtccccct caaaagtcat cctgccccgg   120
ggaggctccg tgctggtgac tgcagcacct cctgtgacca gcccaagttg ttgggcatag   180

```
agaccccgtt gcctaaaaag gagttgctcc tgcctgggaa caaccggaag gtgtatgaac    240
tgagcaatgt gcaagaagat agccaaccaa tgtgctattc aaactgccct gatgggcagt    300
caacagctaa aaccttcctc accgtgtact ggactccaga acgggtggaa ctggcacccc    360
tcccctcttg gcagccagtg ggcaagaacc ttaccctacg ctgccaggtg gagggtgggg    420
caccccgggc caacctcacc gtggtgctgc tccgtgggga aaggagctg aaacgggagc    480 cagctgtggg ggagcccgct gaggtcacga ccacggtgct ggtgaggaga gatcaccatg    540
gagccaattt ctcgtgccgc actgaactgg acctgcggcc ccaagggctg gagctgtttg    600
agaacacctc ggcccctac cagctccaga ccttttgtcct gccagcgact cccccacaac    660
ttgtcagccc ccgggtccta gaggtggaca cgcagggac cgtggtctgt ccctggacg      720 ggctgttccc agtctcggag gcccaggtcc acctggcact gggggaccag aggttgaacc    780
ccacagtcac ctatggcaac gactccttct cggccaaggc ctcagtcagt gtgaccgcag    840
aggacgaggg cacccagcgg ctgacgtgtg cagtaatact ggggaaccag agccaggaga    900
cactgcagac agtgaccatc tacagctttc ggcgcccaa cgtgattctg acgaagccag     960
aggtctcaga agggaccgag gtgacagtga agtgtgaggc caccctaga gccaaggtga    1020 cgctgaatgg ggttccagcc cagccactgg gcccgagggc ccagctcctg ctgaaggcca   1080
ccccagagga caacgggcgc agcttctcct gctctgcaac cctggaggtg gccggccagc   1140
ttatacacaa gaaccagacc cgggagcttc gtgtcctgta tgggcccga ctggacgaga     1200 gggattgtcc gggaaactgg acgtggcag aaaattccca gcagactcca atgtgccagg     1260 cttggggaa cccattgccc gagctcaagt gtctaaagga tggcactttc ccactgccca    1320
tcggggaatc agtgactgtc actcgagatc ttgaggcac ctacctctgt cgggccagga     1380
gcactcaagg ggaggtcacc cgcaaggtga ccgtgaatgt gctctcccc cggtatgaga     1440 ttgtcatcat cactgtggta gcagccgcag tcataatggg cactgcaggc ctcagcacgt   1500
acctctataa ccgccagcgg aagatcaaga atacagact acaacaggcc caaaagggga   1560
cccccatgaa accgaacaca caagccacgc ctccctga                          1598
```

<210> SEQ ID NO 25
<211> LENGTH: 2967
<212> TYPE: DNA
<213> ORGANISM: Artificial Sequence
<220> FEATURE:
<223> OTHER INFORMATION: sICAM-1 mRNA sequence (GenBank reference: NM_000201.3)

<400> SEQUENCE: 25

```
gagctcctct gctactcaga gttgcaacct cagcctcgct atggctccca gcagcccccg     60
gcccgcgctg cccgcactcc tggtcctgct cggggctctg ttcccaggac ctggcaatgc    120
ccagacatct gtgtcccct caaaagtcat cctgccccgg ggaggctccg tgctggtgac    180
atgcagcacc tcctgtgacc agcccaagtt gttgggcata gagaccccgt tgcctaaaaa    240
ggagttgctc ctgcctggga acaaccggaa ggtgtatgaa ctgagcaatg tgcaagaaga    300
tagccaacca atgtgctatt caaactgccc tgatgggcag tcaacagcta aaaccttcct    360
caccgtgtac tggactccag aacgggtgga actggcaccc ctcccctctt ggcagccagt    420
gggcaagaac cttaccctac gctgccaggt ggagggtggg gcaccccggg ccaacctcac    480
cgtggtgctg ctccgtgggg agaagagct gaaacgggag ccagctgtgg gggagcccgc    540
tgaggtcacg accacggtgc tggtgaggag agatcaccat ggagccaatt tctcgtgccg    600
```

```
cactgaactg gacctgcggc cccaagggct ggagctgttt gagaacacct cggcccccta    660
ccagctccag acctttgtcc tgccagcgac tcccccacaa cttgtcagcc cccgggtcct    720
agaggtggac acgcagggga ccgtggtctg ttccctggac gggctgttcc cagtctcgga    780
ggcccaggtc cacctggcac tgggggacca gaggttgaac cccacagtca cctatggcaa    840
cgactccttc tcggccaagg cctcagtcag tgtgaccgca gaggacgagg gcacccagcg    900
gctgacgtgt gcagtaatac tggggaacca gagccaggag acactgcaga cagtgaccat    960
ctacagcttt ccgcgcccca cgtgattct gacgaagcca gaggtctcag aagggaccga   1020
ggtgacagtg aagtgtgagg cccaccctag agccaaggtg acgctgaatg gggttccagc   1080
ccagccactg ggcccgaggg cccagctcct gctgaaggcc acccagagg acaacgggcg    1140 cagcttctcc tgtctgcaa ccctggaggt ggccggccag cttatacaca gaaccagac    1200 ccgggagctt cgtgtcctgt atggcccccg actggacgag agggattgtc cgggaaactg   1260
gacgtggcca gaaaattccc agcagactcc aatgtgccag gcttggggga acccattgcc   1320
cgagctcaag tgtctaaagg atggcacttt cccactgccc atcggggaat cagtgactgt   1380
cactcgagat cttgagggca cctacctctg tcgggccagg agcactcaag gggaggtcac   1440
ccgcaaggtg accgtgaatg tgctctcccc ccggtatgag attgtcatca tcactgtggt   1500
agcagccgca gtcataatgg gcactgcagg cctcagcacg tacctctata ccgccagcg   1560 gaagatcaag aaatacagac tacaacaggc ccaaaaaggg accccatga aaccgaacac    1620 acaagccacg cctccctgaa cctatcccgg acagggcct cttcctcggc cttcccatat    1680
tggtggcagt ggtgccacac tgaacagagt ggaagacata tgccatgcag ctacacctac   1740
cggccctggg acgccggagg acagggcatt gtcctcagtc agatacaaca gcatttgggg   1800
ccatggtacc tgcacaccta aaacactagg ccacgcatct gatctgtagt cacatgacta   1860
agccaagagg aaggagcaag actcaagaca tgattgatgg atgttaaagt ctagcctgat   1920
gagaggggaa gtggtggggg agacatagcc ccaccatgag gacatacaac tgggaaatac   1980
tgaaacttgc tgcctattgg gtatgctgag gccccacaga cttacagaag aagtggccct   2040
ccatagacat gtgtagcatc aaaacacaaa ggcccacact tcctgacgga tgccagcttg   2100
ggcactgctg tctactgacc ccaaccccttg atgatatgta tttattcatt tgttattta   2160 ccagctattt attgagtgtc ttttatgtag gctaaatgaa cataggtctc tggcctcacg   2220
gagctcccag tcctaatcac attcaaggtc accaggtaca gttgtacagg ttgtacactg   2280
caggagagtg cctggcaaaa agatcaaatg gggctgggac ttctcattgg ccaacctgcc   2340
tttccccaga aggagtgatt tttctatcgg cacaaaagca ctatatggac tggtaatggt   2400
tacaggttca gagattaccc agtgaggcct tattcctccc ttcccccaa aactgacacc    2460 tttgttagcc acctccccac ccacatacat ttctgccagt gttcacaatg acactcagcg   2520
gtcatgtctg gacatgagtg cccagggaat atgcccaagc tatgccttgt cctcttgtcc   2580
tgtttgcatt tcactgggag cttgcactat gcagctccag tttcctgcag tgatcagggt   2640
cctgcaagca gtggggaagg gggccaaggt attggaggac tccctcccag ctttggaagc   2700
ctcatccgcg tgtgtgtgtg tgtgtatgtg tagacaagct ctcgctctgt cacccaggct   2760
```

```
ggagtgcagt ggtgcaatca tggttcactg cagtcttgac cttttgggct caagtgatcc    2820
tcccacctca gcctcctgag tagctgggac cataggctca caacaccaca cctggcaaat    2880 ttgattttt  tttttttcc  agagacgggg tctcgcaaca ttgcccagac ttcctttgtg    2940
ttagttaata aagctttctc aactgcc                                        2967
```